US012385581B2

(12) United States Patent
Barra Ruiz et al.

(10) Patent No.: US 12,385,581 B2
(45) Date of Patent: Aug. 12, 2025

(54) FASTENING ASSEMBLY

(71) Applicant: General Electric Company, Schenectady, NY (US)

(72) Inventors: Apolinario Barra Ruiz, Querétaro (MX); Hugo González Arenas, Querétaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/812,034

(22) Filed: Jul. 12, 2022

(65) Prior Publication Data

US 2024/0019049 A1 Jan. 18, 2024

(51) Int. Cl.
*F16L 3/237* (2006.01)
*F01D 25/28* (2006.01)
*F16L 3/22* (2006.01)

(52) U.S. Cl.
CPC .............. *F16L 3/237* (2013.01); *F01D 25/28* (2013.01); *F16L 3/222* (2013.01)

(58) Field of Classification Search
CPC ......... F16L 3/237; F16L 3/222; F16L 3/1075; F16L 5/027; F16L 25/009; F16L 27/1273; F16L 37/006; F16L 37/02; F16L 37/025; F16L 37/04
USPC ..... 248/68.1; 285/332.3, 334.1, 334.2, 334.5
See application file for complete search history.

(56) References Cited

U.S. PATENT DOCUMENTS

| | | | | |
|---|---|---|---|---|
| 2,440,469 | A * | 4/1948 | Goddard | F16L 3/1233 248/68.1 |
| 3,068,924 | A * | 12/1962 | Summers | F16B 37/044 411/113 |
| 3,376,004 | A * | 4/1968 | Goldman | F16L 3/123 248/62 |
| 3,982,304 | A * | 9/1976 | Menshen | F16L 3/237 248/68.1 |
| 4,707,001 | A * | 11/1987 | Johnson | F16L 15/003 285/332.3 |
| 6,038,852 | A | 3/2000 | Celi | |
| 6,883,761 | B2 | 4/2005 | Boon et al. | |
| 6,902,138 | B2 | 6/2005 | Vantouroux | |
| 7,467,767 | B2 | 12/2008 | Miles et al. | |
| 7,653,987 | B2 * | 2/2010 | Tokuda | B60R 16/0215 29/748 |

(Continued)

FOREIGN PATENT DOCUMENTS

CN 112413237 A 2/2021
DE 2504222 A1 8/1976

(Continued)

*Primary Examiner* — Christopher Garft
(74) *Attorney, Agent, or Firm* — Wood Herron & Evans LLP

(57) ABSTRACT

A fastening assembly for a plurality of tubular structures. The fastening assembly includes a positioning fitting member and a clamping element. The positioning fitting member is coupled to a first tubular structure of the plurality of tubular structures such that the positioning fitting member forms a part of the first tubular structure. The positioning fitting member includes a plurality of ribs. The clamping element extends around the plurality of tubular structures and around at least a portion of the positioning fitting member to bundle and to secure the plurality of tubular structures together. The clamping element is positioned between the plurality of ribs.

20 Claims, 40 Drawing Sheets

(56) References Cited

U.S. PATENT DOCUMENTS

| | | | |
|---|---|---|---|
| 7,762,502 B2 | 7/2010 | Mesing et al. | |
| 7,770,848 B2* | 8/2010 | Johnson | F16L 3/1207 |
| | | | 248/65 |
| 8,342,474 B2 | 1/2013 | Gilbreath | |
| 8,541,681 B2* | 9/2013 | Eshima | B60R 16/0215 |
| | | | 248/68.1 |
| 8,950,538 B2* | 2/2015 | Kurauchi | E02F 9/08 |
| | | | 172/813 |
| 8,985,533 B2 | 3/2015 | Edmond et al. | |
| 9,033,290 B2 | 5/2015 | Shepard | |
| 9,062,813 B2* | 6/2015 | Army | F16M 13/00 |
| 9,112,341 B2* | 8/2015 | Eshima | B60R 16/0215 |
| 10,274,109 B2 | 4/2019 | Kozan et al. | |
| 10,309,553 B1 | 6/2019 | Schwalbe et al. | |
| 10,539,168 B2 | 1/2020 | Gallien et al. | |
| 10,663,353 B2* | 5/2020 | Newlin | F16M 13/02 |
| 10,871,077 B2 | 12/2020 | Stoliaroff-Pepin | |
| 11,067,202 B2* | 7/2021 | Ortega Gomez | F16L 3/1211 |
| 11,092,079 B2* | 8/2021 | Patil | B64C 1/406 |
| 11,656,130 B2* | 5/2023 | Patil | A62C 37/04 |
| | | | 374/208 |
| 2012/0097443 A1* | 4/2012 | Mazelle | F02C 7/00 |
| | | | 248/74.2 |
| 2015/0214702 A1* | 7/2015 | Langlade | H02G 3/32 |
| | | | 138/104 |
| 2016/0178090 A1* | 6/2016 | Schilling | F16L 3/237 |
| | | | 248/316.1 |
| 2017/0204994 A1 | 7/2017 | Reed | |
| 2019/0226357 A1 | 7/2019 | Beauquin | |
| 2020/0109799 A1 | 4/2020 | Hung | |
| 2021/0095791 A1* | 4/2021 | Jokinen | F16L 3/18 |
| 2022/0025993 A1 | 1/2022 | Kesler | |
| 2022/0094148 A1 | 3/2022 | Hüppi-Ziegler et al. | |

FOREIGN PATENT DOCUMENTS

| | | |
|---|---|---|
| DE | 102005011131 B4 | 7/2007 |
| EP | 0245223 A1 | 11/1987 |
| FR | 2730549 A1 | 8/1996 |
| FR | 3103245 A1 | 5/2021 |
| GB | 2588825 A | 5/2021 |

\* cited by examiner

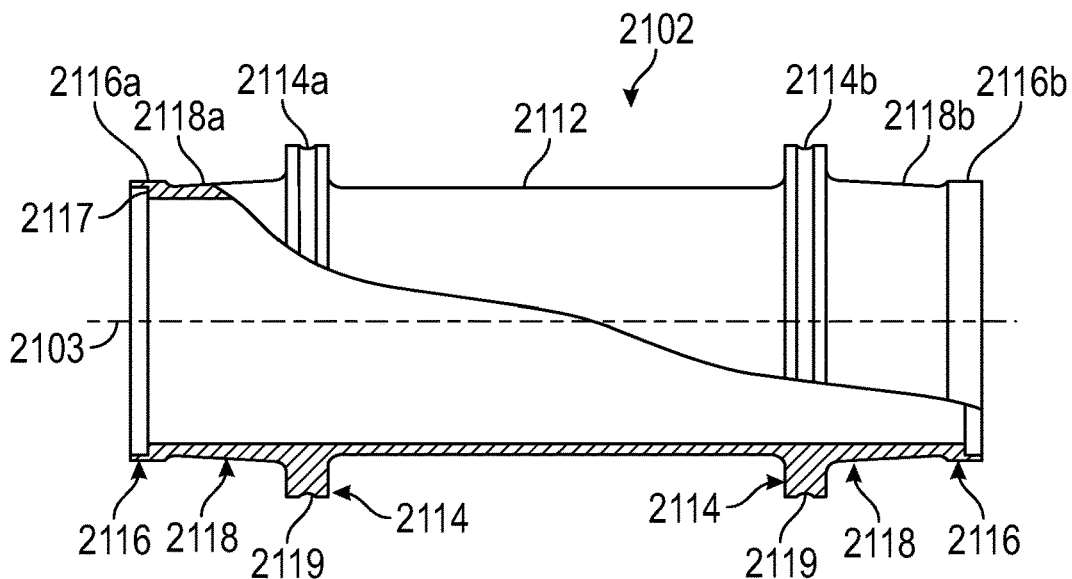

2205 Providing a plurality of tubular structures

↓

2210 Providing a positioning fitting member on at least one tubular structure of the plurality of tubular structures

↓

2215 Bundling the tubular structures together

↓

2220 Extending a clamping element around a portion of an outer surface of the tubular structures and around a portion of the positioning fitting member

↓

2225 Fastening the clamping element with a removable fastening mechanism

FIG. 22

FASTENING ASSEMBLY

TECHNICAL FIELD

The present disclosure relates generally to fastening assemblies for turbine engines and other engineering assemblies.

BACKGROUND

Turbine engines and other engineering assemblies include arrays or banks of tubes, pipes, conduits, rods, bars, or the like, deployed in several locations for transport of liquids and gaseous products or to house cables or similar components of the turbine engine or engineering assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 21 is a schematic, partial cut away, cross-sectional view of another positioning fitting member, taken along a longitudinal centerline of the positioning fitting member, according to another embodiment of the present disclosure.

FIG. 22 is a flow diagram of a method of bundling and fastening tubular structures, according to an embodiment of the present disclosure.

DETAILED DESCRIPTION

Figure 1:
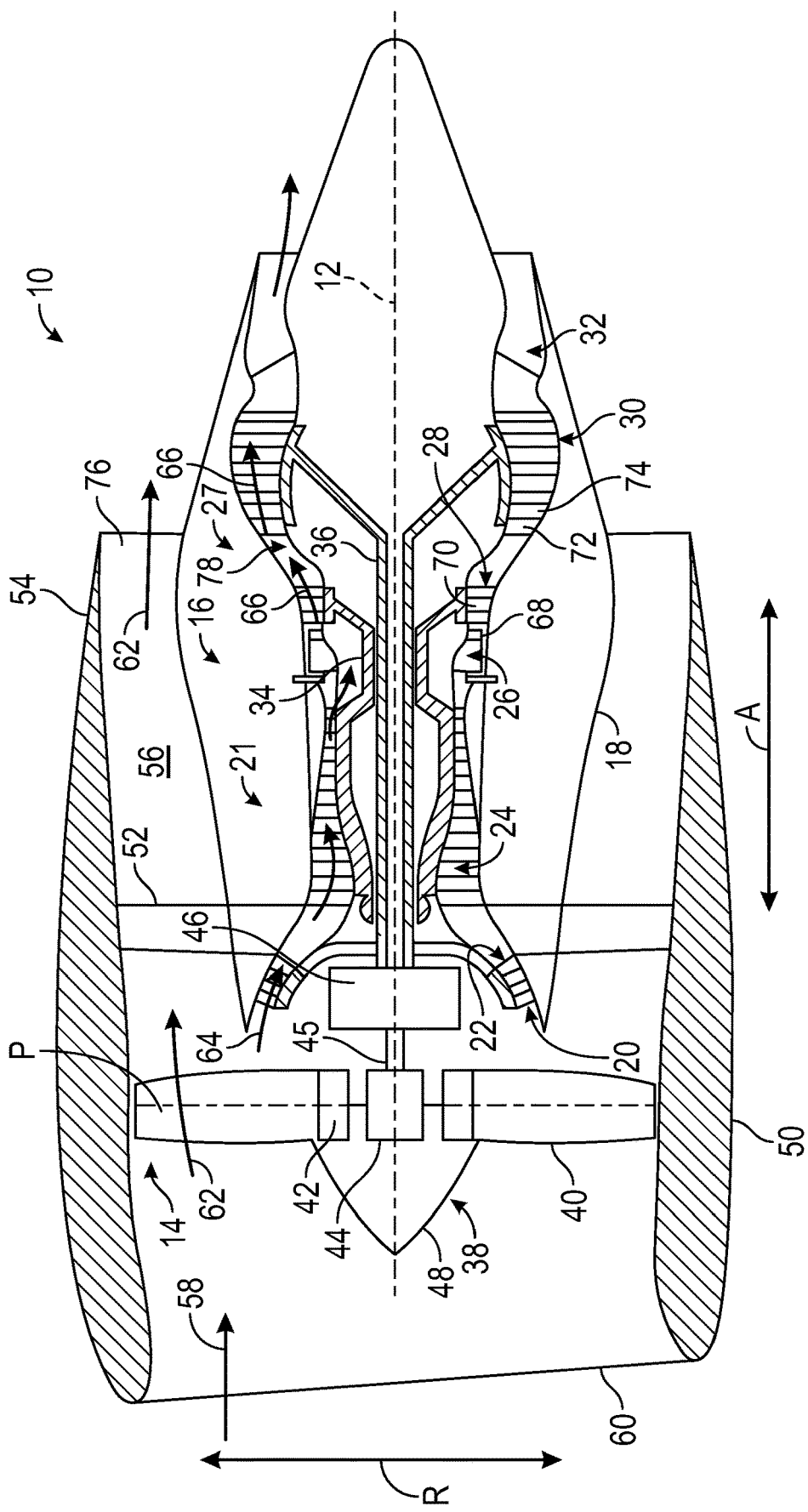
FIG. 1 is a schematic cross-sectional diagram of a turbine engine, taken along a longitudinal centerline of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "tubular structure" includes any type of long, hollow or solid, generally cylindrical structure for holding or transporting liquids, gases, or other solids. For example, tubular structures include tubes or conduits for carrying fuel, oil, hydraulic fluids, pressurized air, cables, hoses, wires or the like. Tubular structures can also include the cables, wires, hoses, or the like. The terms "tube" or "tubes" are used interchangeably with "tubular structure" or "tubular structures" herein.

As used herein, "fastening assembly" refers to a group of interacting or interrelated elements that act according to a set of rules to form a unified whole deployed to spatially separate tubes or its equivalents, such as pipes, rods, bars or any tubular structure and at the same time, to fasten them together.

As used herein, "spacer element" refers to a device or piece used to create or maintain a desired amount of space between two or more objects.

As used herein, "clamping element" refers to a device or component that structurally joins or affixes two or more objects together. In general, clamping elements are used to create non-permanent joints, that is, joints that can be removed or dismantled without damaging the joining components.

As used herein, "top end" refers to the highest or uppermost point, portion, or surface of a spacer element.

As used herein, "bottom end" refers to the lowest or lowermost point, portion, or surface of a spacer element.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Turbine engine installations include tubular structures, such as, for example, tubes or conduits, for carrying fuel, oil, hydraulic fluids, pressurized air, cables, hoses, etc. The tubes or conduits can be bundled together to carry the fluid within or across several compartments and components (such as a fan, a compressor, a turbine) of the engine under a nacelle or to discharge the fluid overboard. Tube or pipe assemblies deployed in engineering assemblies found in aircraft engines, heat exchangers, and nuclear power structures typically bundle the tubes where space and support availability is insufficient to fit multiple individual tubes. Typically, blocks, clamps, tabs and straps, or spacers are permanently joined to the tubes to bundle the tubes, for example, with brazed or welded joints. The brazed or welded joints include low reliability and may fail due to stress concentrations on the joints under operational loads on the bundle of tubes. For example, brazed or welded joints may fail due to the following reasons: (i) high stress concentrations at the joint, (ii) difficult to control the braze or weld quality (e.g., due to manufacturing defects), (iii) low high cycle fatigue capabilities of the braze or weld, (iv) geometric stress concentrations at the joint, and (v) rapid transition from flexible tube to stiff constraint. The manufacturing defects may result in reduced life and low reliability of the brazed joints or the welded joints. Variations in the surface preparation, the part setup, the cleaning process, the heat input, etc., can affect the manufacturing process outcomes during brazing operations or during welding operations, resulting in voids and lack of braze coverage at the brazed joints or resulting in lack of penetration and lack of fusion at the welded joints. Voids are material discontinuities and generate geometrical stress concentrators. Lack of coverage occurs when there is an unbonded area (e.g., an area within a brazed joint in which the braze filler flows but does not bond to one or more of the fraying surfaces). Further, braze witness may be difficult to include in tube cluster or in tube bundle applications due to a lack of space between tubes to access the brazed joint. The braze witness is a feature used to verify braze coverage and braze flow.

Alternatively, loop clamps or similar clamping devices can be used to bundle the tubes together. The clamps, however, slide or move along the tubes, which results in wear on the tubes and maintainability issues due to a lack of position control. Additionally, brazed or welded tube bundles are difficult to manufacture, inspect, install, and repair as it is difficult to separate a brazed or welded joint without damaging the tubes. Thus, the present disclosure provides for a fastening assembly for bundling and fastening tubes together to enable a non-permanent tube bundling.

Embodiments of the present disclosure provide a positioning fitting and a separate removable clamping device. The fastening assembly provides for a non-brazed and a non-welded tube bundle design using a removable bundling device. The fastening assembly allows for a reduced footprint of a tube bundle with added ease of manufacturing, inspection, and installation due to the removable clamping device and the positioning fitting. Thus, the present disclosure improves reliability, assembly, and maintainability of a tube bundle assembly as compared to assemblies that are bundled with brazed or welded joints. The fastening assembly does not include a brazed or a welded joint between individual tubes, thus reducing stress concentration compared to brazed or welded joints. The fastening assembly provides for a low stress tube bundling through the positioning fitting and the clamping device provides for added friction damping. The fastening assembly also eliminates inspection access and quality control needed for brazed or welded joints. The positioning fitting can be adapted to fit standard cushioned or un-cushioned loop clamps, saddle clamps, rubber blocks, or specialty clamping devices in order to adapt to operational and space requirements for a particular use. The fastening assembly improves vibration damping by using different materials for added damping and wear capability while providing retaining capabilities to locate and to maintain the tube assembly in the correct or intended position. The fastening assembly allows for on-site or off-site assembly, thus allowing for improved maintainability compared to assemblies without the benefit of the present disclosure.

The fastening assembly provides vibration damping, thus increasing system stiffness as needed and reducing the number of supports required for a particular application. Accordingly, the fastening assembly reduces associated failure risks (e.g., high cycle fatigue, wear, low cycle fatigue, etc.) while providing retaining capabilities to locate and to maintain the assembly in the correct position and the positioning fitting prevents the displacement of the clamping device along the tube. The embodiments of the present disclosure allow for better packaging of tubes in clusters or bundles compared to assemblies without the benefit of the present disclosure. The present disclosure provides for a compact tube bundle for improved tube packaging to save space in applications in which space is limited, thus, saving space, cost, and weight. In turbine engine applications, the present disclosure improves time on wing compared to assemblies without the benefit of the present disclosure, thus, eliminating field issues related to brazed or welded joints in tube bundles and reduces fatigue or durability issues.

Embodiments of the present disclosure provide for a non-permanent or a removable tube bundling and fastening assembly using a low stress concentration positioning fitting and a removable clamping device. Two or more tubes can be bundled using a removable clamping device. The clamping device may include, for example, loop clamps, custom clamps, metal straps, rubber blocks, metal blocks, composite blocks, or combinations thereof. The clamping device generates a high radial compressive force to maintain the tube bundling under operational loads, while the positioning fitting keeps the clamping device in the intended position or location for error-proofing of the assembly. For example, the positioning fitting includes ribs that prevent the clamping device or a respective tube from sliding or moving axially beyond the ribs. The positioning fitting can be coupled to a respective tube. Additionally, the clamping device provides friction damping while allowing slippage between bundled tubes, which allows for tubes in a bundle having different temperatures in the same bundle while minimizing thermal mismatch between the tubes.

The positioning fitting is a machined or a formed part that provides a gradual transition to the tube to reduce the stress concentration. The positioning fitting is permanently coupled to the tube through thermal, mechanical, or chemical bonding methods. For example, the positioning fitting member may be chemically bonded (e.g., epoxy or composite), coupled by a thermal joint (e.g., brazing or welding), or threaded to a respective tube. In some embodiments, the positioning fitting may be integral with other fittings or connectors and may be used for manifold attachment to brackets or support systems. In some embodiments, the fastening assembly of the present disclosure includes spacer blocks to provide separation between the tubes in the bundle while providing a compact arrangement of the tubes in the bundle. The spacer blocks may be made of metal, rubber, composite, or combinations thereof. The materials of the spacer blocks and the clamping device may be selected based on requirements of vibration damping, stiffness, temperature conditions, etc., for a particular application. For example, metals may provide greater stiffness and may be used in higher temperature applications, but metals provide less friction damping compared to non-metals. Thus, rubbers, composites, ceramics, or the like, may be used in lower temperature conditions to provide greater vibration damping. In some embodiments, the blocks or straps may be coupled to a support bracket or structure and the blocks or straps may be stacked as desired.

Referring now to the drawings, FIG. 1 is a schematic cross-sectional diagram of a turbine engine 10, taken along a centerline axis of the turbine engine 10, according to an embodiment of the present disclosure. FIG. 1 shows the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46, also referred to as a gearbox assembly 46. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2A:
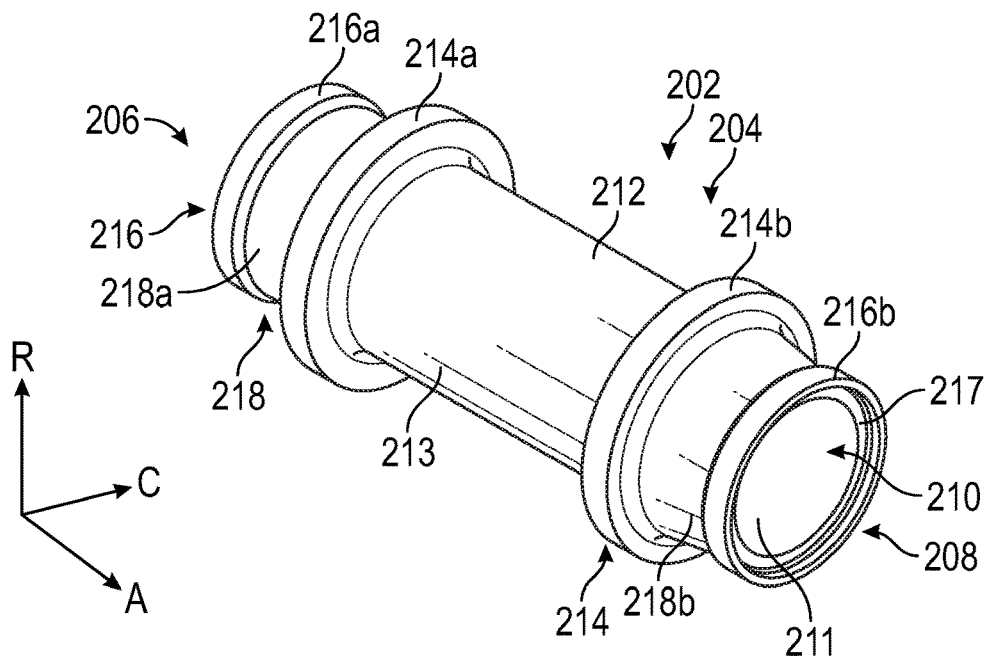
FIG. 2A is a schematic view of a positioning fitting member of a fastening assembly for the turbine engine of FIG. 1, according to an embodiment of the present disclosure.
Figure 2B:
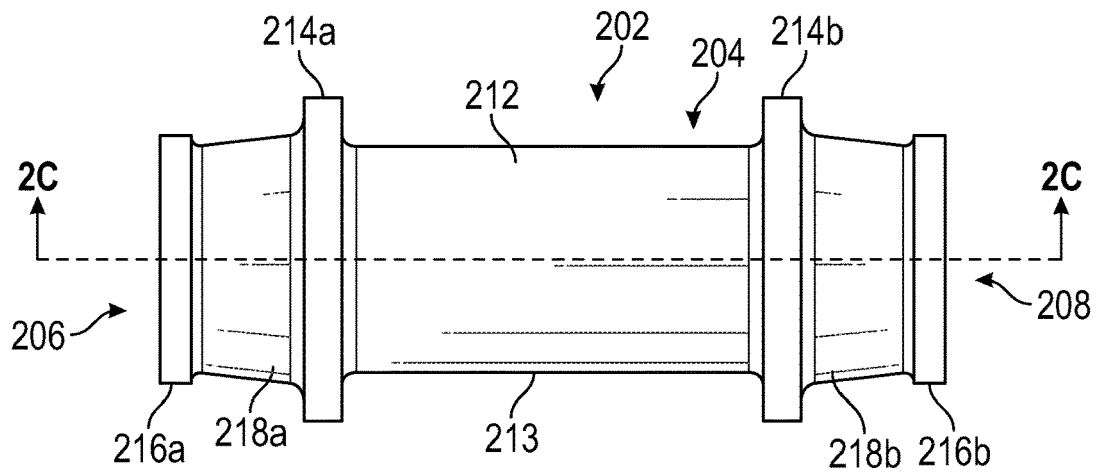
FIG. 2B is a schematic side view of the positioning fitting member of FIG. 2A, according to an embodiment of the present disclosure.
Figure 2C:
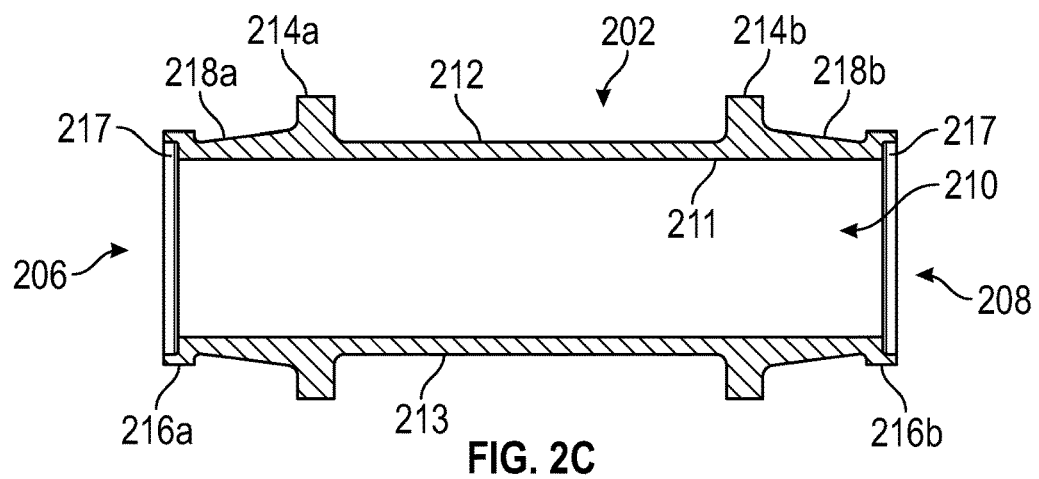
FIG. 2C is a schematic cross-sectional view, taken along detail 2C-2C in FIG. 2B, of the positioning fitting member, according to an embodiment of the present disclosure.

FIG. 2A is a schematic view of a positioning fitting member 202 for a fastening assembly, according to an embodiment of the present disclosure. FIG. 2B is a schematic side view of the positioning fitting member 202, according to an embodiment of the present disclosure. FIG. 2C is a schematic cross-sectional view, taken along detail 2C-2C in FIG. 2B, of the positioning fitting member 202, according to an embodiment of the present disclosure. The positioning fitting member 202 may be used in any of the fastening assemblies detailed herein. The positioning fitting member 202 defines an axial direction (A), a radial direction (R), and a circumferential direction (C). The axial direction, the radial direction, and the circumferential direction of the positioning fitting member 202 may be the same or may be different as the axial direction and the radial direction of the turbine engine 10, depending on an orientation of the positioning fitting member 202 when the positioning fitting member 202 is mounted in the turbine engine 10.

With reference to FIGS. 2A to 2C, the positioning fitting member 202 includes a positioning fitting body 204 extending between a proximal end 206 and a distal end 208. The positioning fitting body 204 includes a diameter and a shape that generally corresponds to a diameter and to a shape of a respective tube. The positioning fitting body 204 includes a generally cylindrical shape. The positioning fitting body 204 is hollow such that the positioning fitting member 202 includes a bore 210 extending therethrough. The bore 210 is sized and is shaped to receive a corresponding tube such that the positioning fitting member 202 is placed on the corresponding tube and the tube is disposed within the bore 210, as detailed further below. In this way, the positioning fitting member 202 includes an inner surface 211 defining an inner diameter of the positioning fitting member 202 and an outer surface 213 defining an outer diameter of the positioning fitting member 202. The inner surface 211 extends substantially axially such that the internal diameter of the positioning fitting member 202 is substantially the same along an axial direction of the positioning fitting member 202. The outer surface 213 extends in the axial direction and includes a varying outer diameter that varies along the axial direction, as detailed further below. The positioning fitting member 202 is the same material as a material of the tubes, as detailed below. For example, the positioning fitting member 202 may be made of metals (e.g., steel, titanium, etc.), alloys, composites, ceramics, or the like. In some examples, the positioning fitting member 202 may be a different material than the material of the tubes. In some examples, the positioning fitting member 202 is a combination of materials.

The positioning fitting body 204 includes a clamping surface 212 extending between a plurality of ribs 214 and forms a portion of the outer surface 213. The clamping surface 212 is sized such that a corresponding clamp may be coupled thereto, as detailed further below. In the embodiment of FIGS. 2A to 2C, the plurality of ribs 214 includes a pair of ribs including a first rib 214a and a second rib 214b that form a portion of the outer surface 213. The first rib 214a is located at a proximal end of the clamping surface 212 and the second rib 214b is located at a distal end of the clamping surface 212. The plurality of ribs 214 extend radially outward from the positioning fitting body 204 such that an outer diameter of the plurality of ribs 214 is greater than an outer diameter of the clamping surface 212. The plurality of ribs 214 are sized such that the pair of ribs 214 prevent a corresponding clamp from moving or from sliding axially beyond the pair of ribs 214, as detailed further below. In some examples, the plurality of ribs 214 each includes a different size. In some examples, the plurality of ribs 214 may include any number of ribs, as desired, for preventing axial movement of a corresponding clamping element.

The positioning fitting member 202 includes a pair of weld notches 216 located at respective ends of the positioning fitting body 204. For example, the pair of weld notches 216 includes a first weld notch 216a located at the proximal end 206 of the positioning fitting body 204 and includes a second weld notch 216b located at the distal end 208 of the positioning fitting body 204. The pair of weld notches 216 provides additional material for welding the positioning fitting member 202 to a corresponding tube, as detailed further below. For example, the pair of weld notches 216 provides for a stronger welded joint between the positioning fitting member 202 and the corresponding tube as compared to welded joints without the benefit of the present disclosure. The weld notch 216 includes an inner radial surface 217 that is disposed within the bore 210 and forms a portion of the inner surface 211. The inner radial surface 217 extends radially inwardly and includes a greater inner diameter than the inner diameter of the inner surface 211. The inner radial surface 217 provides a surface such that a corresponding tube contacts and abuts the inner radial surface 217. Thus, the inner radial surface 217 helps to position the corresponding tube when the positioning fitting member 202 is being coupled to the corresponding tube. In some examples, the positioning fitting member 202 is coupled to a corresponding tube by means other than welding such that the positioning fitting member 202 does not include weld notches, as detailed further below.

The positioning fitting member 202 includes a plurality of tapered surfaces 218 defining a portion of the outer surface of the positioning fitting body 204. The plurality of tapered surfaces 218 reduce stress on a coupling between the positioning fitting member 202 and a corresponding tube, as detailed further below. For example, the plurality of tapered surfaces 218 provide a smooth transition step from the positioning fitting member 202 to the corresponding tube such that stresses between the positioning fitting member 202 and the corresponding tube are reduced.

In FIGS. 2A to 2C, the plurality of tapered surfaces 218 include a pair of tapered surfaces including a first tapered surface 218a and a second tapered surface 218b. The first tapered surface 218a extends axially from the first rib 214a to the proximal end 206 of the positioning fitting body 204. For example, the first tapered surface 218a extends to the first weld notch 216a. The first tapered surface 218a is tapered from the first rib 214a to the proximal end 206 such that a diameter of the first tapered surface 218a at the first rib 214a is greater than a diameter of the first tapered surface 218a at the proximal end 206. The second tapered surface 218b extends axially from the second rib 214b to the distal end 208 of the positioning fitting body 204. For example, the second tapered surface 218b extends to the second weld notch 216b. The second tapered surface 218b is tapered from the second rib 214b to the distal end 208 such that a diameter of the second tapered surface 218b at the second rib 214b is greater than a diameter of the second tapered surface 218b at the distal end 208. A diameter of the plurality of tapered surfaces 218 at the plurality of ribs 214 is greater than a diameter of the clamping surface 212. In some examples, the diameter of the plurality of tapered surfaces 218 at the plurality of ribs 214 is equal to or less than the diameter of the clamping surface 212, as detailed further below.

Figure 3A:
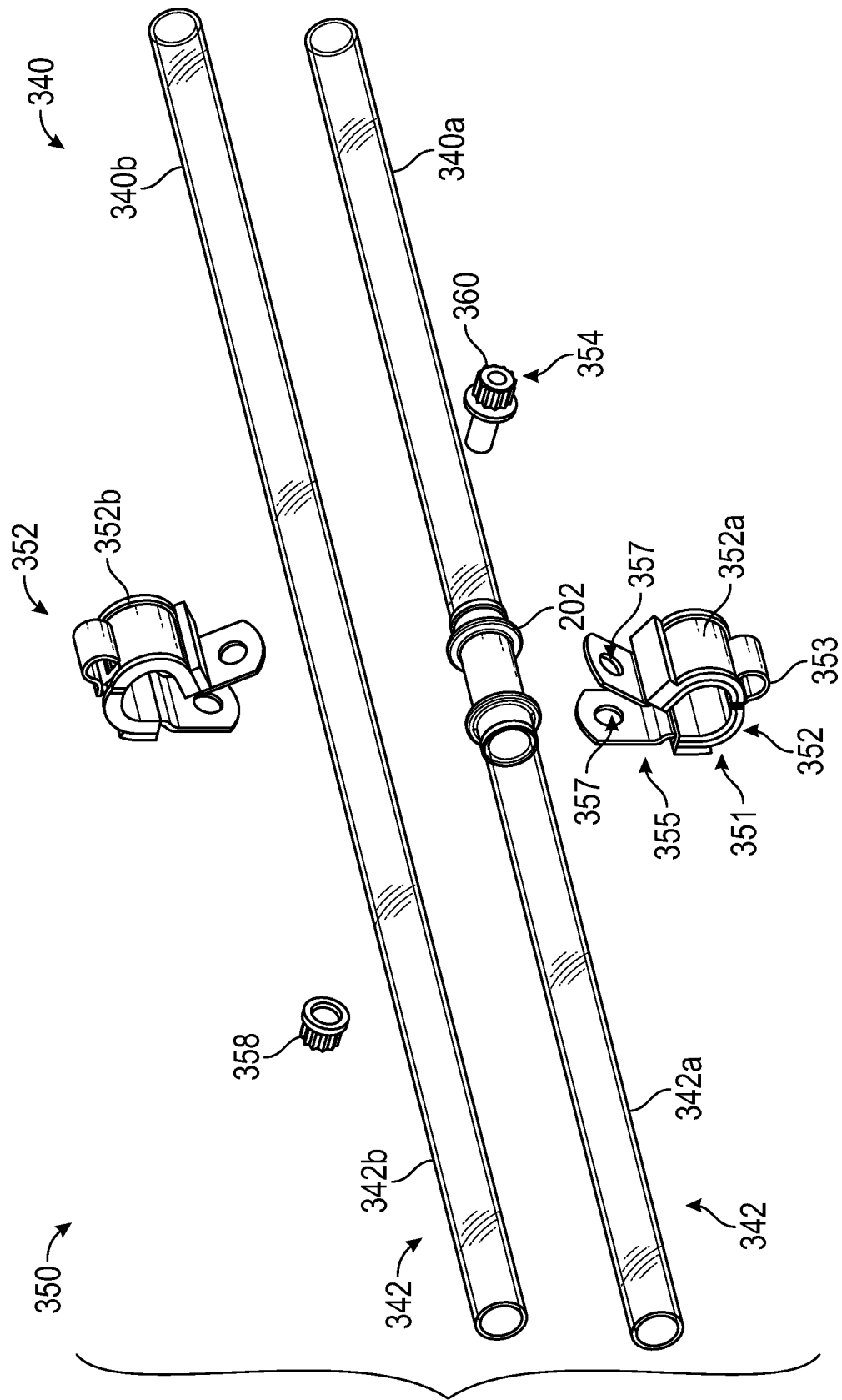
FIG. 3A is an exploded view of a fastening assembly for tubular structures, according to an embodiment of the present disclosure.

FIG. 3A is an exploded view of a fastening assembly for tubular structures, such as tubes, pipes, conduits, rods, and bars, according to an embodiment of the present disclosure, typically found in engineering assemblies associated with turbine engines, such as the turbine engine 10 (FIG. 1). FIG. 3A shows a plurality of tubes 340 and a fastening assembly 350. The fastening assembly 350 includes a positioning fitting member 202, one or more clamping elements 352, and a removable fastening mechanism 354. The plurality of tubes 340 is a bank of tubes and includes a first tube 340a and a second tube 340b. The plurality of tubes 340 may include any number of tubes as desired. The plurality of tubes 340 may be made of any material, as desired. For example, the plurality of tubes 340 may be made of metal (e.g., steel, titanium, etc.), alloys, composites, ceramics, or the like. Each tube 340 defines a tube outer surface 342 defining an outer diameter of the tube 340. The tube outer surface 342 is an outermost or an uppermost or an exterior boundary or a layer or an area of a tube. For example, the first tube 340a includes a first tube outer surface 342a and the second tube 340b includes a second tube outer surface 342b. The outer diameter of each tube 340 is between point two five inches and two inches. The outer diameter of each tube 340 may, however, include any size, as desired. The positioning fitting member 202 is coupled to the first tube 340a such that the positioning fitting member 202 forms a part of the first tube 340a. In some examples, the positioning fitting member 202 is formed integral with the first tube 340a, as detailed further below. In some examples, both the first tube 340a and the second tube 340b include a respective positioning fitting member. While FIG. 3A shows a single fastening assembly 350, the plurality of tubes 340 may include any number of fastening assemblies positioned at various axial locations along the plurality of tubes 340, as desired.

Figure 3B:
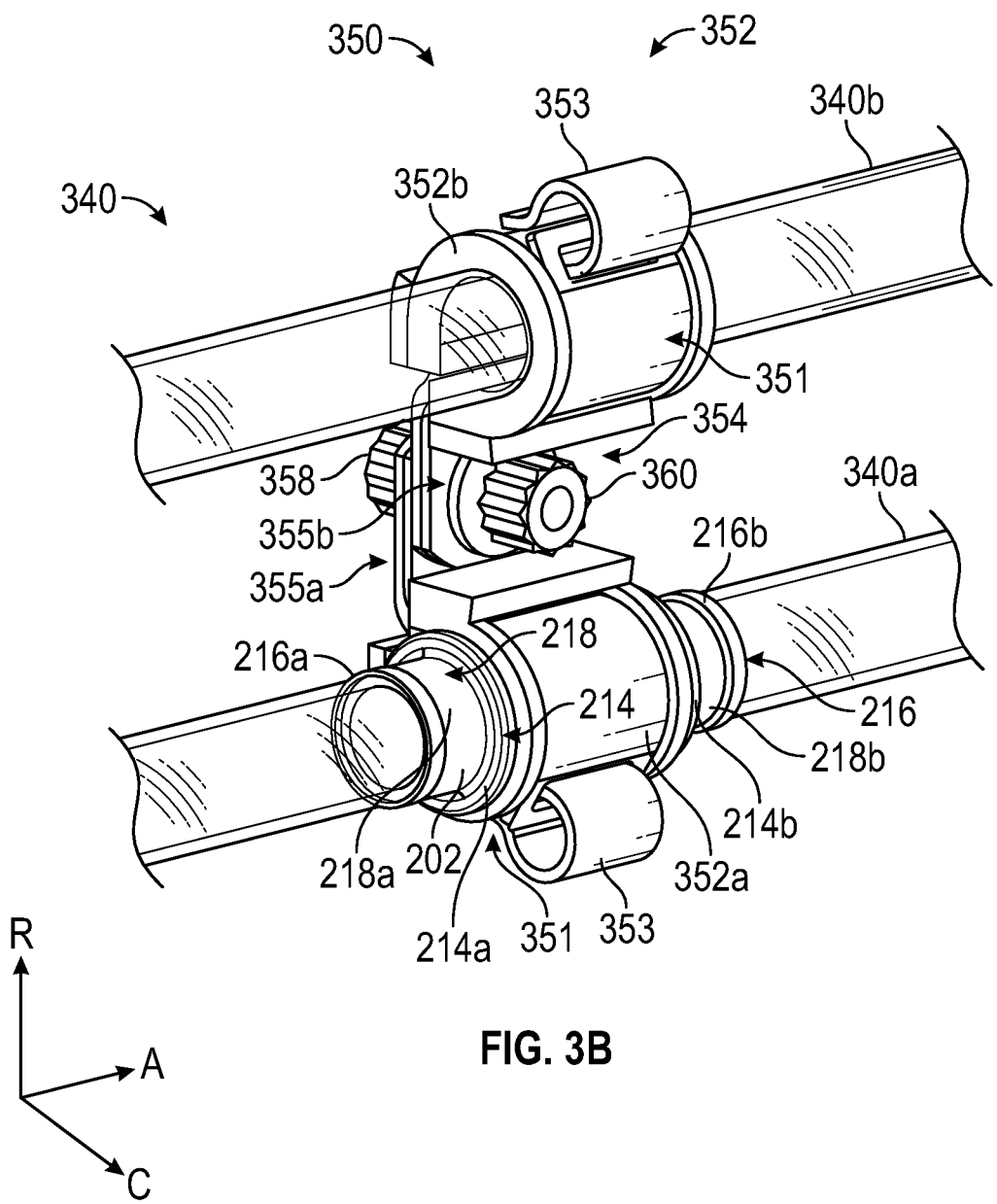
FIG. 3B is an enlarged schematic view of the fastening assembly of FIG. 3A in an assembled state, according to an embodiment of the present disclosure.

In FIG. 3A, the one or more clamping elements 352 includes a pair of clamping elements that includes a first clamping element 352a and a second clamping element 352b. The one or more clamping elements 352 may include any number of clamping elements 352, as desired. The one or more clamping elements 352 each includes loop clamps that form a looped section 351. The looped section 351 includes a hinge 353 such that looped section 351 can be opened (FIG. 3A) and closed (FIG. 3B). In some examples, the one or more clamping elements 352 do not include a hinge and may be opened and closed by means other than a hinge. The looped section includes a size and a shape that generally corresponds to a size and a shape of the tubes 340. In this way, the clamping elements 352 can be closed to clamp around a respective tube 340, as detailed further below. Each clamping element 352 includes a plurality of clamp arms 355 disposed at, and extending from, opposing ends of the looped section 351. FIG. 3A shows each clamping element 352 includes two clamp arms 355, but the clamping element 352 may include any number of clamp arms 355 as desired. Each of the plurality of clamp arms 355 includes an aperture 357 disposed therein for receiving the removable fastening mechanism 354. When the clamping element 352 is closed, the first clamp arm 355a and the second clamp arm 355b contact each other, and the aperture 357 of the first clamp arm 355a aligns with a corresponding aperture 357 of the second clamp arm 355b such that the removable fastening mechanism 354 can be inserted therethrough.

The removable fastening mechanism 354 includes a nut 358 and a bolt 360. Thus, the removable fastening mechanism 354 is removable such that the fastening assembly 350 may be disassembled and re-assembled as needed, as detailed further below. The removable fastening mechanism 354 may include any type of removable fastening mechanism such as, for example, studs, bolts, screws, nuts, or the like.

FIG. 3B shows an enlarged schematic side view of the fastening assembly 350 of FIG. 3A in an assembled state, according to an embodiment of the present disclosure. FIG. 3B shows the first clamping element 352a is clamped to the positioning fitting member 202 of the first tube 340a such that the first clamping element 352a extends around at least a portion of the positioning fitting member 202, as detailed further below. The second clamping element 352b is clamped to the second tube 340b such that the second clamping element 352b extends around at least a portion of the second tube outer surface 342b of the second tube 340b. The first clamping element 352a includes first clamp arms 355a and the second clamping element 352b includes second clamp arms 355b. When the fastening assembly 350 is assembled, the first clamp arms 355a contact the second clamp arms 355b. The removable fastening mechanism 354 is inserted into the respective apertures of each clamping element 352 to fasten and to secure the clamping elements 352 together. Thus, the fastening assembly 350 extends around at least a portion of the positioning fitting member 202 and around at least a portion of the tube outer surface 342 of the tubes 340 to bundle and to fasten the tubes 340 together. The positioning fitting member 202 prevents the clamping elements 352 from sliding or from moving axially beyond the ribs 214 of the positioning fitting member 202. The clamping elements 352 provide friction damping while allowing slippage between the tubes 340, thus allowing tubes 340 with different temperatures in the same bundle while minimizing thermal mismatch, as detailed further below. For example, the second tube 340b does not include a positioning fitting member. Thus, the second tube 340b can slide or move axially with respect to the first tube 340a. In this way, the fastening assembly 350 provides friction damping to the bundle of tubes 340 such that the tubes 340 can vibrate and move independently with respect to each other while the clamping elements 352 remain in place without sliding.

Figure 3C:
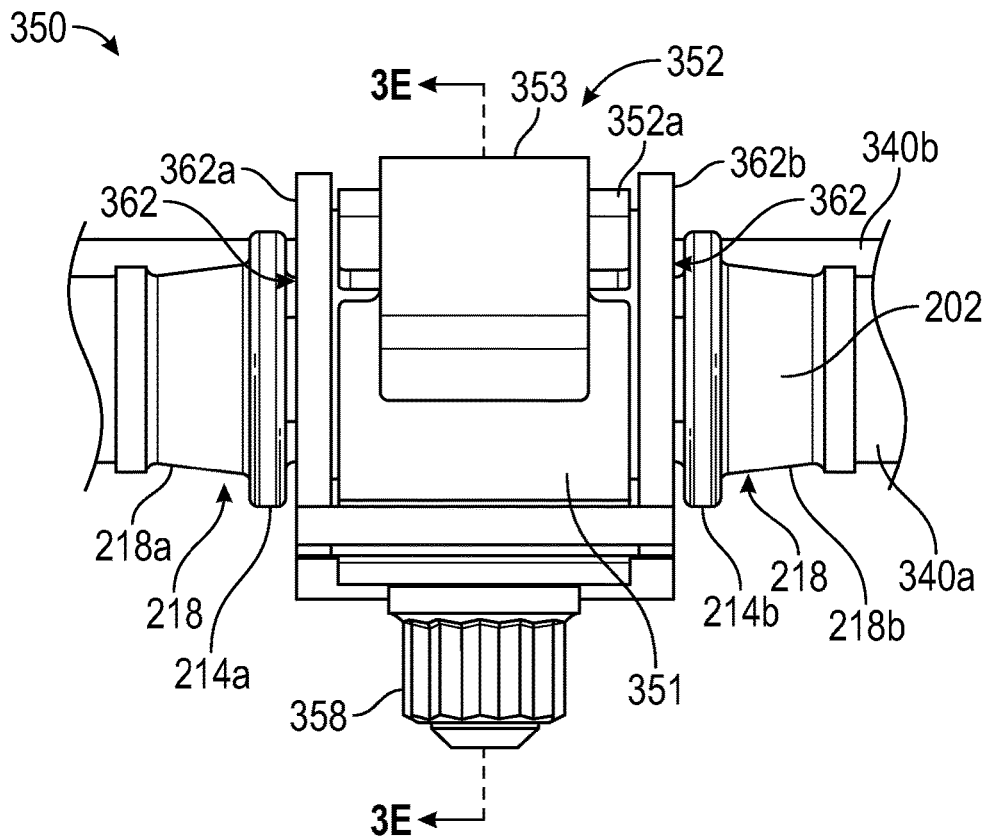
FIG. 3C is a schematic bottom view of the fastening assembly of FIG. 3B, according to an embodiment of the present disclosure.

FIG. 3C shows a schematic bottom view of the fastening assembly 350, according to an embodiment of the present disclosure. FIG. 3C shows that each of the clamping elements 352 includes a plurality of radial faces 362 including a first radial face 362a and a second radial face 362b. The radial faces 362 extend radially and define a portion of an outer surface of the clamping elements 352. When the first clamping element 352a is clamped to the positioning fitting member 202 of the first tube 340a, the radial faces 362 are spaced from the ribs 214 of the positioning fitting member 202. During operation of the turbine engine or of the engineering assembly, the tubes 340 may move axially, circumferentially, or radially due to vibrations and relative motion of the various tubes and other assemblies. The positioning fitting member 202 prevents the clamping elements 352 from sliding or moving axially with respect to the tubes 340. When the clamping elements 352 begin to slide or to move axially, the radial faces 362 contact the ribs 214 of the positioning fitting member 202 such that the clamping elements 352 are prevented from sliding or moving axially beyond the ribs 214. For example, the first radial face 362a may contact the first rib 214a if the clamping elements 352 or the first tube 340a slide or move in a first axial direction, and the second radial face 362b may contact the second rib 214b if the clamping elements 352 or the first tube 340a slide or move in a second axial direction opposite the first axial direction.

Figure 3D:
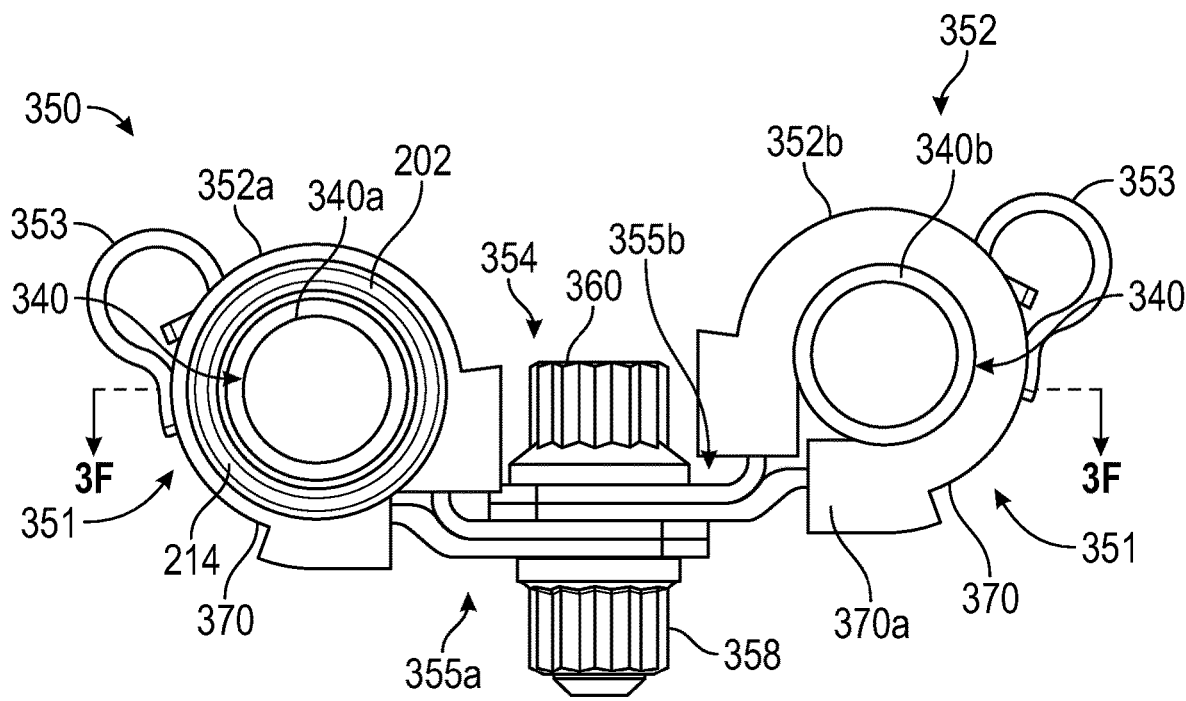
FIG. 3D is a schematic rear view of the fastening assembly of FIG. 3B, according to an embodiment of the present disclosure.

FIG. 3D shows a schematic rear view of the fastening assembly 350, according to an embodiment of the present disclosure. In FIG. 3D, the fastening assembly 350 is rotated ninety degrees about the axial direction from the view in FIG. 3B. The clamping elements 352 include a cushion 370 disposed about the clamping element 352 that includes an outer cushion portion 370a and an inner cushion portion 370b (shown in FIG. 3E). FIG. 3D shows the outer cushion portion 370a is disposed about an outer surface of the clamping element 352. The inner cushion portion 370b (FIG. 3E) of the cushion 370 is disposed within a respective clamping element 352 such that the cushion 370 extends around and contacts a respective tube 340, as detailed further below. The cushion 370 provides friction damping between the clamping element 352 and a respective tube 340. The cushion 370 is made from a polymer composite material such as, for example, a polybenzimidazole (PBI) fiber, polytetrafluoroethylene, rubber, or the like, for providing friction damping. The cushion 370 provides improved friction damping compared to a metal-to-metal contact between the clamping element 352 and the tube 340 or the positioning fitting member 202.

Figure 3E:
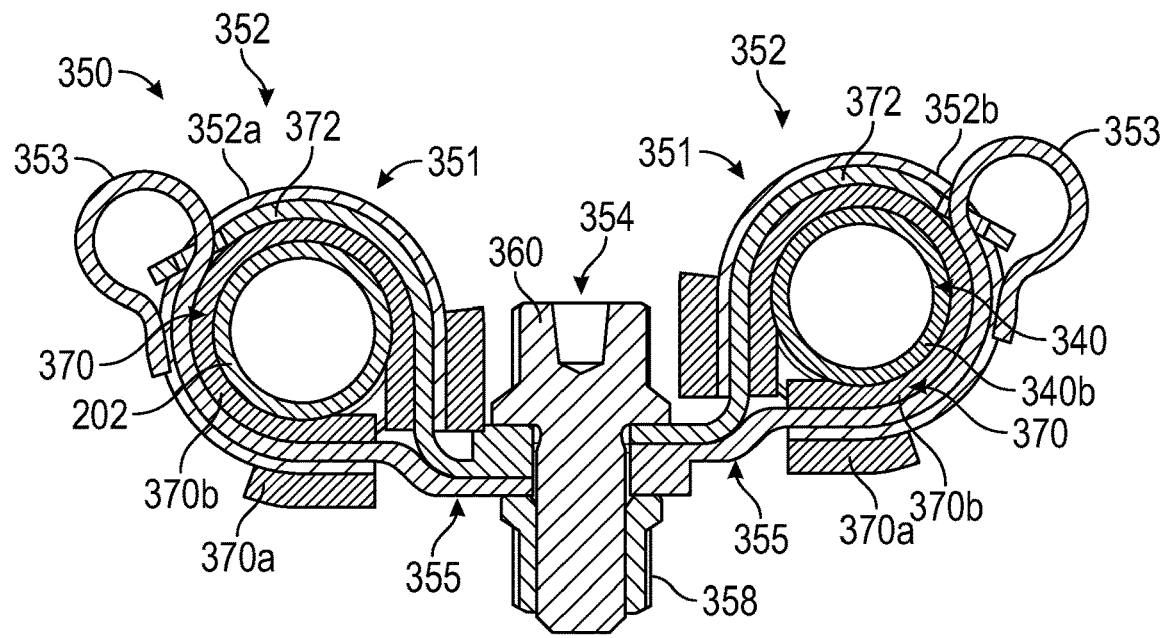
FIG. 3E is a cross-sectional view of the fastening assembly, taken at detail 3E-3E in FIG. 3C, according to an embodiment of the present disclosure.

FIG. 3E shows a cross-sectional view of the fastening assembly 350, taken at detail 3E-3E in FIG. 3C, according to an embodiment of the present disclosure. FIG. 3E shows each of the clamping elements 352 includes a clamp body 372. The clamp body 372 defines a size and a shape of the clamping element 352. For example, the clamp body 372 defines the looped section 351 and the clamp arms 355 of each clamping element 352. The looped section 351 and the clamp arms 355 are integrally formed such that the looped section 351 and the clamp arms 355 together form a single unitary structure. In some examples, the looped section 351 and the clamp arms 355 are formed of separate structures and coupled together to form the clamp body 372. The clamp body 372 is made of any material such as, for example, metal, alloys, composites, polymers, ceramics, or combinations thereof. The clamp body 372 also defines the hinge 353. The cushion 370 is coupled to, and disposed within, the clamp body 372 and forms a shape corresponding to the shape of the clamp body 372. For example, the cushion includes the outer cushion portion 370a and the inner cushion portion 370b. The clamp body 372 can be inserted between the outer cushion portion 370a and the inner cushion portion 370b such that the cushion 370 is coupled to the clamp body 372. Thus, the inner cushion portion 370b of the cushion 370 defines an interior surface of the clamping element 352 and engages with a respective tube 340 or with a positioning fitting member 202 to bundle and to secure the tubes 340 together.

Figure 3F:
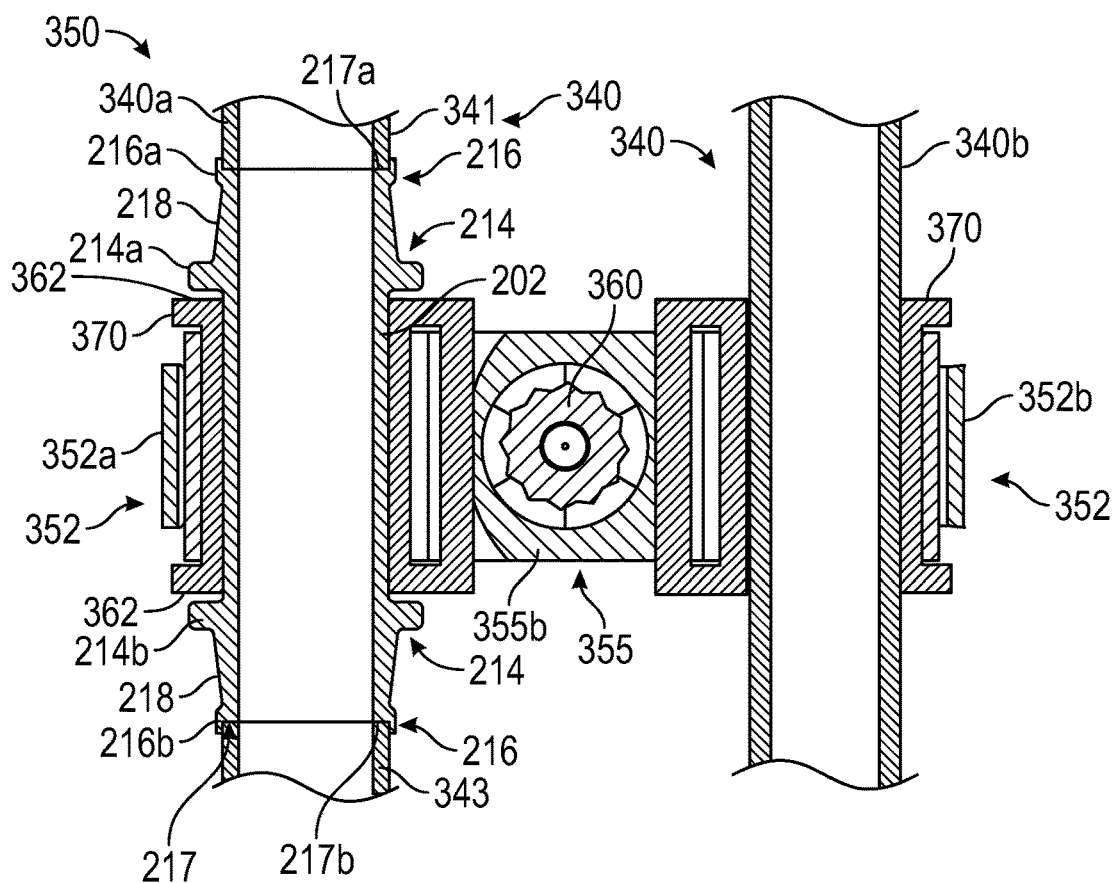
FIG. 3F is a cross-sectional view of the fastening assembly, taken at detail 3F-3F in FIG. 3D, according to an embodiment of the present disclosure.

FIG. 3F shows a cross-sectional view of the fastening assembly 350, taken at detail 3F-3F in FIG. 3D, according to an embodiment of the present disclosure. FIG. 3F shows the clamping elements 352 engage with respective tubes 340. For example, the first clamping element 352a engages with the positioning fitting member 202 of the first tube 340a and the second clamping element 352b engages with the second tube 340b. When the clamping elements 352 are engaged with the tubes 340, the clamping elements 352 generate high radial compressive force on the tubes 340 to maintain the bundle of tubes 340 under operational loads while the positioning fitting member 202 maintains the clamping elements 352 in the intended location and position. For example, the ribs 214 of the positioning fitting member 202 prevent the clamping elements 352 from sliding or moving axially about the tubes 340.

FIG. 3F shows the weld notch 216 of the positioning fitting member 202. The inner radial surface 217 of the weld notch 216 contacts a corresponding surface of the first tube 340a. For example, the first tube 340a includes a first tube portion 341 and a second tube portion 343. The first tube portion 341 contacts and abuts a first inner radial surface 217a and the second tube portion 343 contacts and abuts a second inner radial surface 217b. The positioning fitting member 202 is then welded to each of the first tube portion 341 and the second tube portion 343 such that the first tube portion 341, the positioning fitting member 202, and the second tube portion 343 form a single integral structure. In some examples, the first tube 340a includes a single tube portion and the first tube 340a may extend through the positioning fitting member 202. When the positioning fitting member 202 is coupled to the first tube 340a, the tapered surfaces 218 provide a smooth transition between the positioning fitting member 202 and the first tube 340a to reduce the stress concentration on the coupling between the positioning fitting member 202 and the first tube 340a under operational loads on the tubes 340 during operation of the turbine engine 10 or the engineering assembly.

Figure 4A:
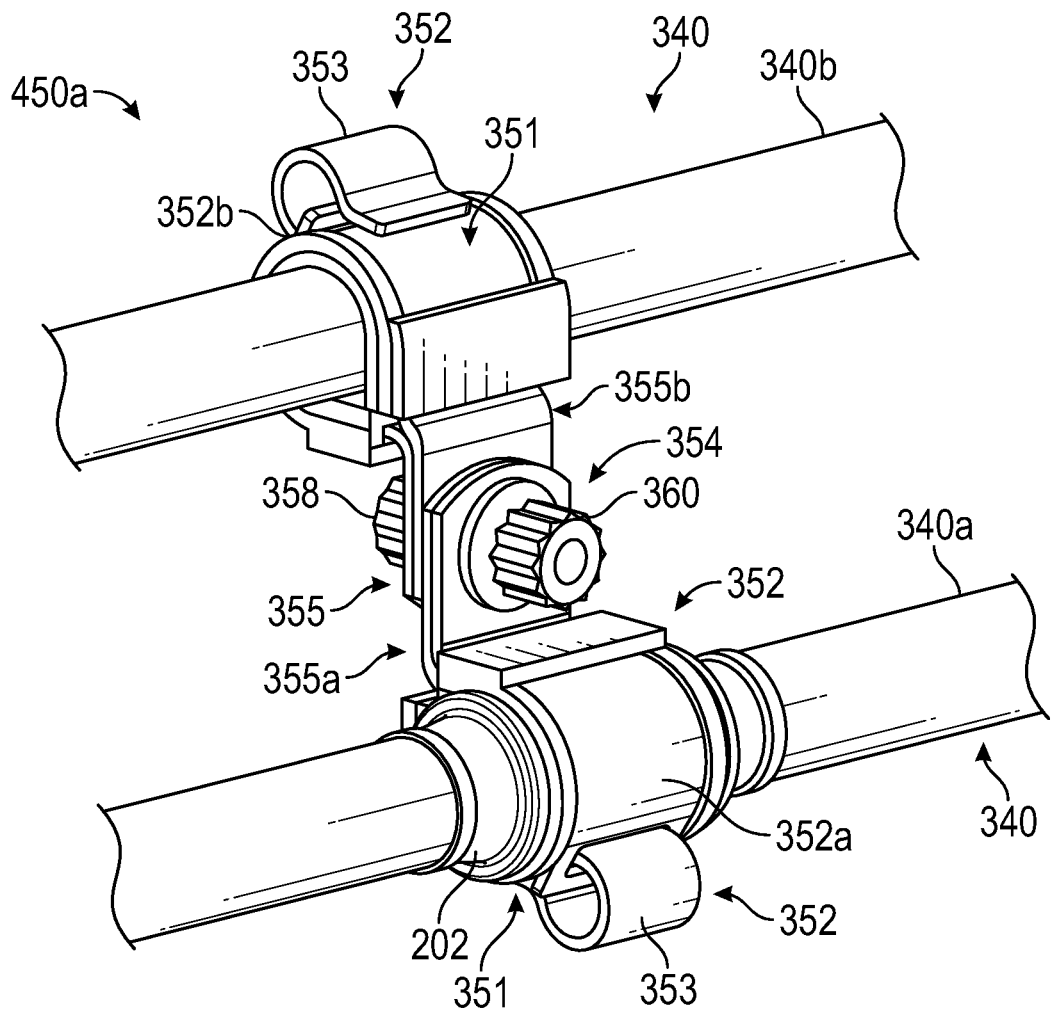
FIG. 4A is an enlarged schematic view of another fastening assembly in an assembled state, according to another embodiment of the present disclosure.

FIG. 4A shows an enlarged schematic side view of another fastening assembly 450a in an assembled state, according to another embodiment of the present disclosure. The fastening assembly 450a includes many of the same components as the fastening assembly 350 (FIG. 3B). The second clamping element 352b, however, is oriented in a different direction in the fastening assembly 450a than in the fastening assembly 350. The clamping elements 352 may be oriented in any orientation for bundling and securing the tubes 340 together.

Figure 4B:
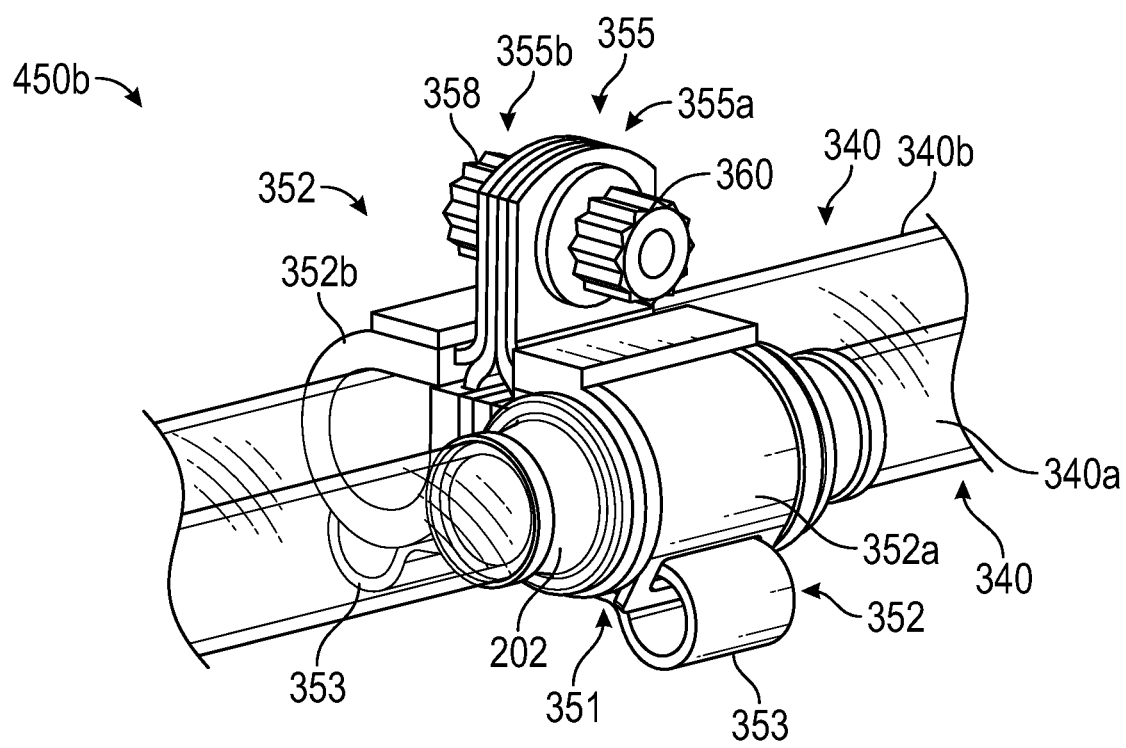
FIG. 4B is an enlarged schematic view of another fastening assembly in an assembled state, according to another embodiment of the present disclosure.

FIG. 4B shows an enlarged schematic side view of another fastening assembly 450b in an assembled state, according to another embodiment of the present disclosure. The fastening assembly 450b includes many of the same components as the fastening assembly 350 (FIG. 3B). The second clamping element 352b, however, is oriented in a different direction in the fastening assembly 450b than in the fastening assembly 350. The clamping elements 352 may be oriented in any orientation for bundling and securing the tubes 340 together.

Figure 5A:
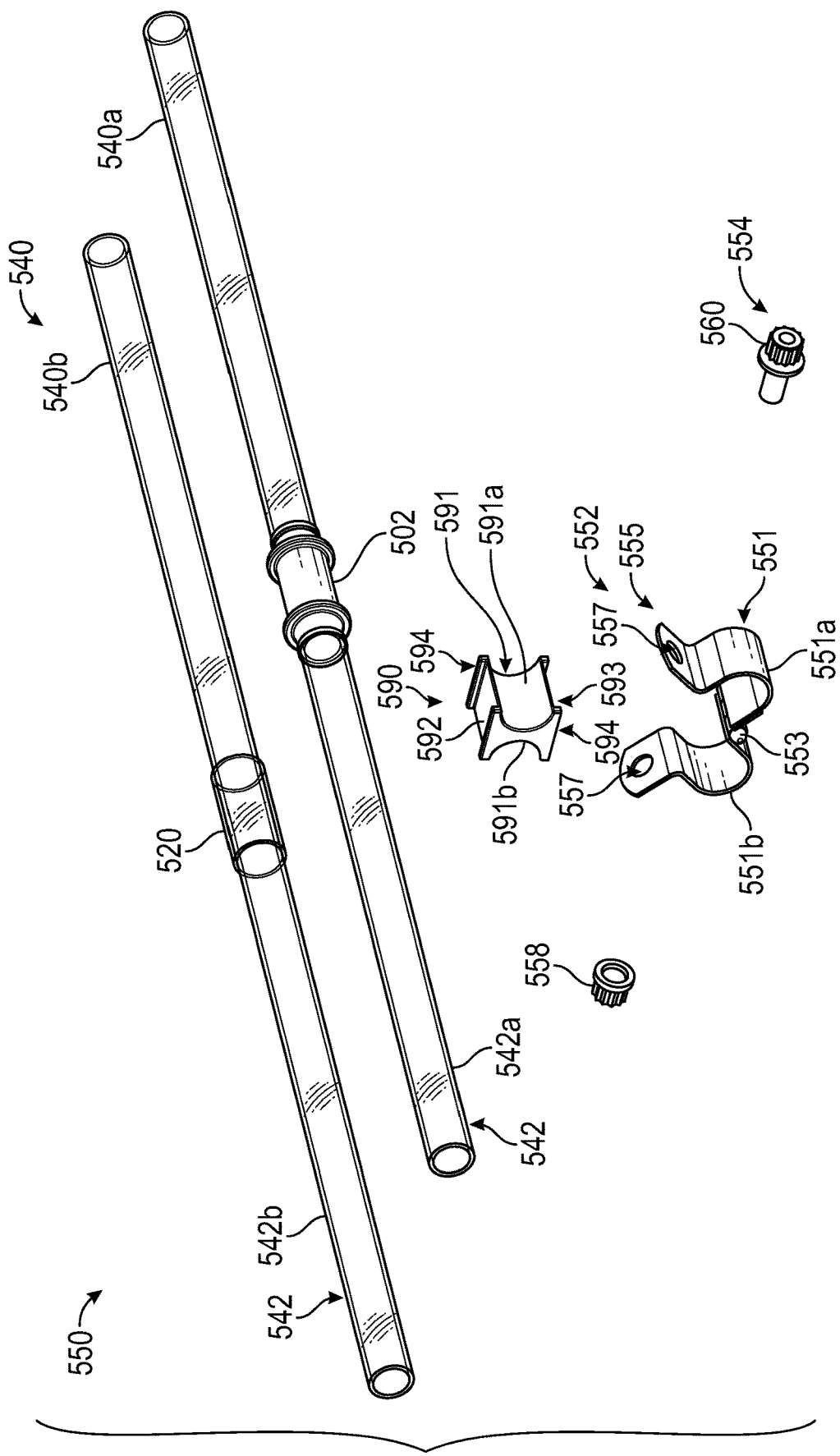
FIG. 5A is an exploded view of another fastening assembly for tubular structures, according to another embodiment of the present disclosure.

FIG. 5A is an exploded view of another fastening assembly 550 for tubular structures, according to another embodiment of the present disclosure. FIG. 5A shows a plurality of tubes 540 and a fastening assembly 550. The fastening assembly 550 includes a positioning fitting member 502, one or more clamping elements 552, a spacer element 590, and a removable fastening mechanism 554. The plurality of tubes 540 is a bank of tubes and includes a first tube 540a and a second tube 540b. Each tube 540 defines a tube outer surface 542. For example, the first tube 540a includes a first tube outer surface 542a and the second tube 540b includes a second tube outer surface 542b. The positioning fitting member 502 is coupled to the first tube 540a such that the positioning fitting member 502 forms a part of the first tube outer surface 542a of the first tube 540a. The second tube 540b includes a wear sleeve 520 coupled thereto. The wear sleeve 520 is a metal sleeve that provides additional material for a metal-to-metal contact between the clamping element 552 and the second tube 540b. In this way, the wear sleeve 520 may wear as the second tube 540b slides or moves axially within the clamping element 552 such that the wear sleeve 520 protects the second tube 540b from wear.

Figure 5B:
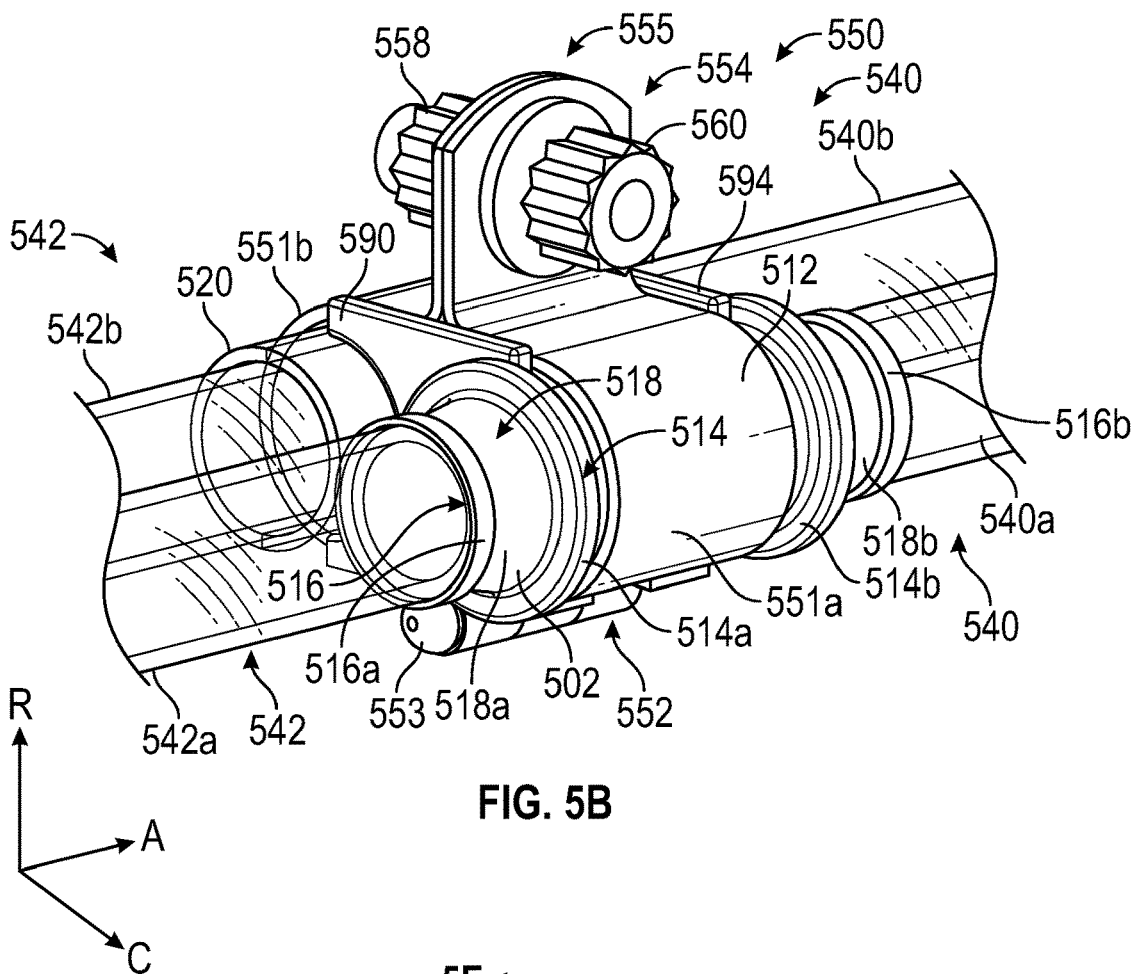
FIG. 5B is an enlarged schematic view of the fastening assembly of FIG. 5A in an assembled state, according to an embodiment of the present disclosure.

In FIG. 5A, the one or more clamping elements 552 includes a single clamping element. The clamping element 552 includes a metallic band that forms a plurality of looped sections 551. For example, the clamping element 552 includes a first looped section 551a and a second looped section 551b. The looped sections 551 are coupled together at a first end by a hinge 553 such that looped sections 551 can be opened (FIG. 5A) and closed (FIG. 5B). The looped sections 551 include a size and a shape that generally corresponds to a size and a shape of the tubes 540. In this way, the clamping element 552 can be closed to clamp around the tubes 540, as detailed further below. The clamping element 552 includes a plurality of clamp arms 555. Each clamp arm 555 is disposed at, and extends from, a second end of a respective looped section 551. FIG. 5A shows the clamping element 552 includes two clamp arms 555, but the clamping element 552 may include any number of clamp arms 555 as desired. Each of the plurality of clamp arms 555 includes an aperture 557 disposed therein for receiving the removable fastening mechanism 554. When the clamping element 552 is closed, the clamp arms 555 contact each other and the respective apertures 557 align with each other such that the removable fastening mechanism 554 can be inserted therethrough. The removable fastening mechanism 554 includes a nut 558 and a bolt 560, as detailed above.

The spacer element 590 includes a body having one or more cradle brackets 591 that define contact faces of the spacer element 590. The cradle brackets 591 are concave to correspond to a shape of the tubes 540. The cradle brackets 591 may include any shape that corresponds to respective tubes, conduits, pipes, etc. The spacer element 590 includes two opposing cradle brackets 591 including a first cradle bracket 591a and a second cradle bracket 591b. The spacer element 590 includes a first end 592 and a second end 593 opposite the first end 592. The first end 592 may be a top end and the second end 593 may be a bottom end in the orientation of FIG. 5A. While "top end" and "bottom end" are used herein, the spacer element 590 may be oriented in any direction, as desired. The spacer element 590 includes raised edges 594 extending radially outwardly from the first end 592 and from the second end 593 to provide a secure or a snug seating arrangement for the clamping element 552. In this way, the raised edges 594 prevent the clamping element 552 from sliding axially beyond the raised edges 594.

FIG. 5B shows an enlarged schematic side view of the fastening assembly 550 of FIG. 5A in an assembled state, according to an embodiment of the present disclosure. In FIG. the spacer element 590 spatially separates the tubes 540 and distributes stress in the fastening assembly 550. For example, the tubes 540 are inserted into and contact the respective cradle brackets 591 (FIG. 5A). The clamping element 552 extends around at least a portion of the tube outer surfaces 542 of the tubes 540. The clamping element 552 extends about and contacts the first end 592 (FIG. 5A) and the second end 593 (FIG. 5A) of the spacer element 590 between the raised edges 594 of the first end 592 and the second end 593.

The positioning fitting member 502 is similar to the positioning fitting member 202. The positioning fitting member 502 includes a clamping surface 512, a plurality of ribs 514 including a first rib 514a and a second rib 514b, a plurality of weld notches 516 including a first weld notch 516a and a second weld notch 516b, and a plurality of tapered surfaces 518 including a first tapered surface 518a and a second tapered surface 518b. A thickness of the clamping surface 512 is greater than a thickness of the clamping surface 212 (FIG. 2C), as detailed further below.

The first looped section 551a of the clamping element 552 is clamped to the positioning fitting member 502 of the first tube 540a such that the clamping element 552 extends around at least a portion of the positioning fitting member 502. In this way, the clamping element 552 is positioned between the first rib 514a and the second rib 514b of the positioning fitting member 502 when the fastening assembly 550 is assembled. The second looped section 551b is clamped to the wear sleeve 520 of the second tube 540b such that the clamping element 552 extends around at least a portion of the wear sleeve 520 of the second tube 540b. When the fastening assembly 550 is assembled, the clamp arms 555 contact each other and the removable fastening mechanism 554 is inserted into the respective apertures 557 (FIG. 5A) to fasten and to secure the clamping element 552 about the tubes 540. Thus, the clamping element 552 extends around at least a portion of the positioning fitting member 502 and around at least a portion of the tube outer surfaces 542 of the tubes 540 to bundle and to fasten the tubes 540 together. The positioning fitting member 502 prevents the first tube 540a from sliding or from moving axially beyond the ribs 514 of the positioning fitting member 502, as detailed above.

Figure 5C:
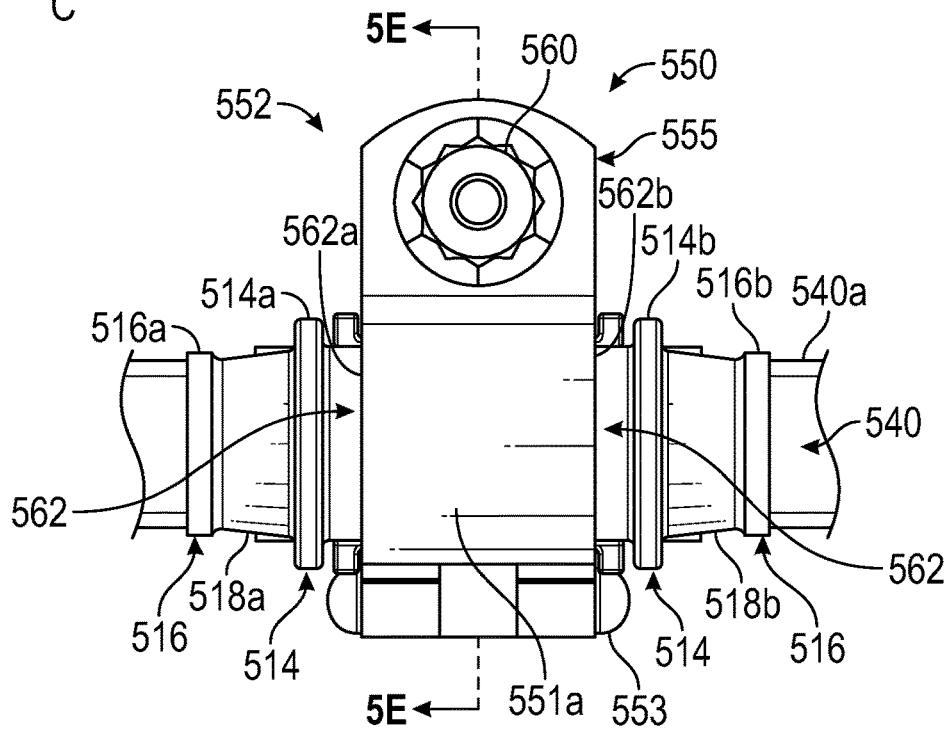
FIG. 5C is a schematic side view of the fastening assembly of FIG. 5B, according to an embodiment of the present disclosure.

FIG. 5C shows a schematic side view of the fastening assembly 550, according to an embodiment of the present disclosure. FIG. 5C shows that the clamping element 552 includes a plurality of radial faces 562 including a first radial face 562a and a second radial face 562b. The radial faces 562 extend radially and define a portion of an outer surface of the clamping element 552. When the clamping element 552 is clamped to the positioning fitting member 502 of the first tube 540a, the radial faces 562 are spaced from the ribs 514 of the positioning fitting member 502. During operation of the turbine engine or of the engineering assembly, the tubes 540 may move axially, circumferentially, or radially due to vibrations and relative motion of the various tubes and other assemblies. The positioning fitting member 502 prevents the clamping element 552 from sliding or moving axially with respect to the tubes 540. When the clamping element 552 begins to slide or to move axially, the radial faces 562 contact the ribs 514 of the positioning fitting member 502 such that the clamping element 552 is prevented from sliding or moving axially beyond the ribs 514. For example, the first radial face 562a may contact the first rib 514a if the clamping elements 552 or the first tube 540a slide or move in a first axial direction, and the second radial face 562b may contact the second rib 514b if the clamping elements 552 or the first tube 540a slide or move in a second axial direction opposite the first axial direction.

Figure 5D:
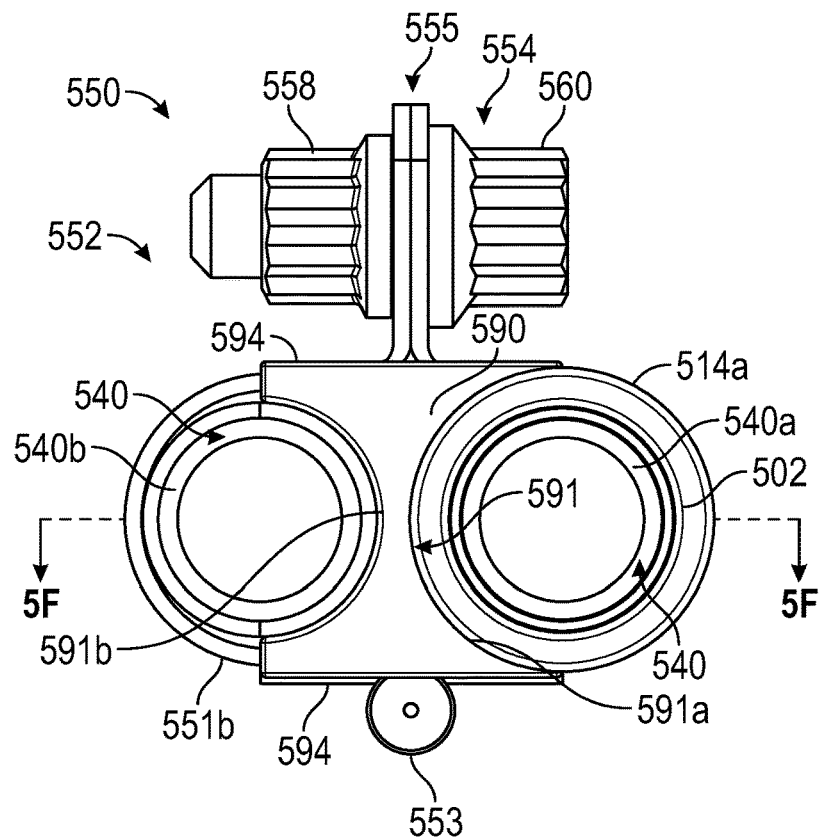
FIG. 5D is a schematic front view of the fastening assembly of FIG. 5B, according to an embodiment of the present disclosure.

FIG. 5D shows a schematic front view of the fastening assembly 550, according to an embodiment of the present disclosure. FIG. 5D shows the spacer element 590 spatially separates the tubes 540 and the tubes 540 engage with the cradle brackets 591. For example, the first tube 540a engages with the first cradle bracket 591a and the second tube 540b engages with the second cradle bracket 591b. The clamping element 552 is disposed on the first end 592 (FIG. and the second end 593 (FIG. 5A) of the spacer element 590 such that the clamping element 552 is disposed within the raised edges 594.

Figure 5E:
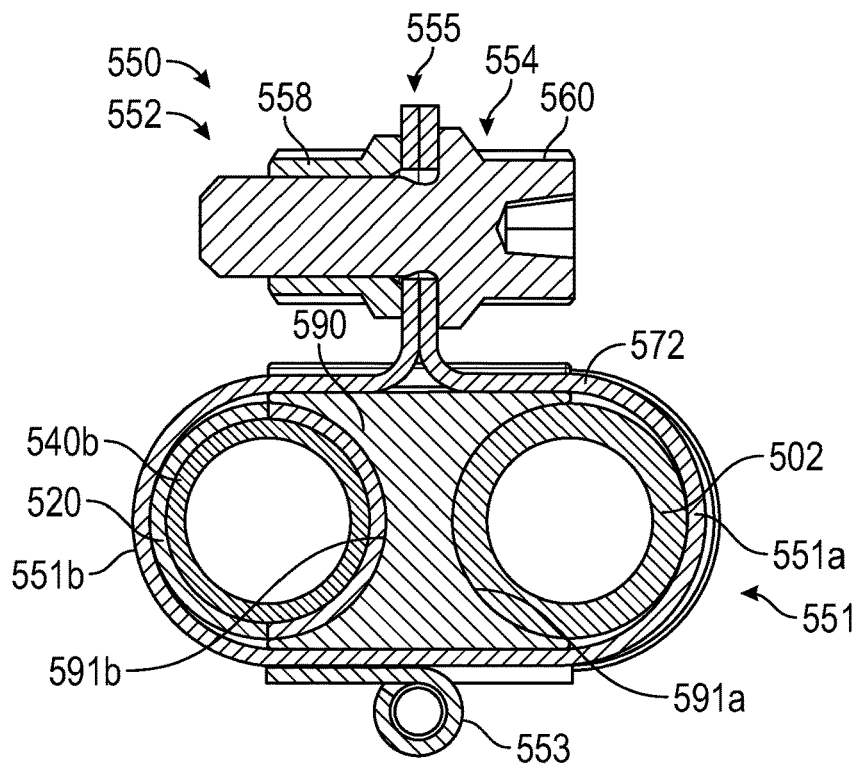
FIG. 5E is a cross-sectional view of the fastening assembly, taken at detail 5E-5E in FIG. 5C, according to an embodiment of the present disclosure.

FIG. 5E shows a cross-sectional view of the fastening assembly 550, taken at detail 5E-5E in FIG. 5C, according to an embodiment of the present disclosure. FIG. 5C shows the clamping element 552 includes a clamp body 572. The clamp body 572 defines a size and a shape of the clamping element 552. For example, the clamp body 572 defines the looped sections 551 and the clamp arms 555 of the clamping element 552. Each clamp arm 555 is integrally formed with a respective looped section 551 such that the respective looped sections 551 and the respective clamp arms 555 together form a single unitary structure. The clamp body 572 is made of any material such as, for example, metal, alloys, composites, or the like. The clamping element 552 does not include a cushion. In this way, the clamping element 552 can be used in high temperature environments and includes a greater stiffness as compared with the clamping elements 352 that include cushions. The clamping element 552 provides less friction damping as compared to the clamping elements 352 because of the metal-to-metal contact of the clamping element 552 on the tubes 540. FIG. 5E also shows that the wear sleeve 520 engages with the second cradle bracket 591b and the positioning fitting member 502 engages with the first cradle bracket 591a when the fastening assembly 550 is assembled.

Figure 5F:
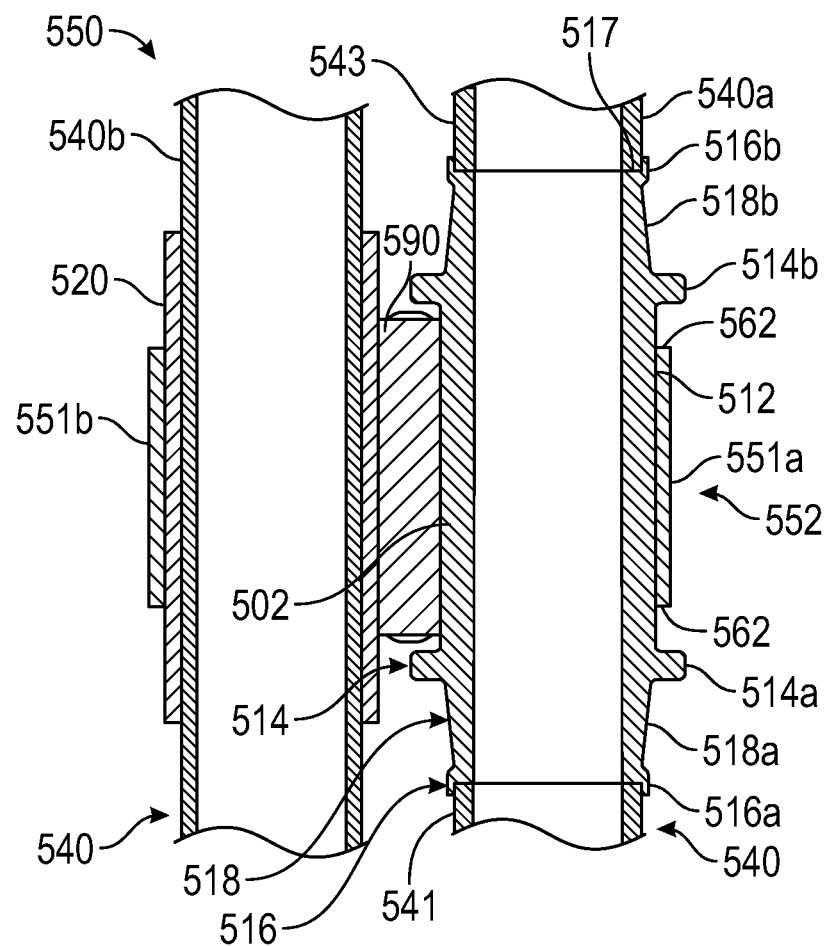
FIG. 5F is a cross-sectional view of the fastening assembly, taken at detail 5F-5F in FIG. 5D, according to an embodiment of the present disclosure.

FIG. 5F shows a cross-sectional view of the fastening assembly 550, taken at detail 5F-5F in FIG. 5D, according to an embodiment of the present disclosure. FIG. 5F shows the clamping element 552 engages with respective tubes 540. For example, the first looped section 551a engages with the positioning fitting member 502 of the first tube 540a and the second looped section 551b engages with the wear sleeve 520 of the second tube 540b. When the clamping element 552 is engaged with the tubes 540, the clamping element 552 generates high radial compressive force on the tubes 540 to maintain the bundle of tubes 540 under operational loads while the positioning fitting member 502 maintains the clamping element 552 in the intended location and position. For example, ribs 514 of the positioning fitting member 502 prevent the clamping elements 552 from sliding or moving axially about the tubes 540, as detailed above.

In applications that include an all-metal fastening assembly (e.g., the fastening assembly does not include composite or other materials), the thickness of the clamping surface 512 is greater as compared to applications in which the fastening assembly includes non-metal materials. The greater thickness provides additional wear resistance for the positioning fitting member 502. The greater thickness of the clamping surface 512 provides for a greater diameter as compared to the clamping surface 212 (FIG. 2C). FIG. 5F shows a diameter of the plurality of tapered surfaces 518 at the plurality of ribs 514 is equal to or less than a diameter of the clamping surface 512. Accordingly, the positioning fitting member 502 may be used in applications that include an all-metal fastening assembly.

FIG. 5F shows the weld notch 516 of the positioning fitting member 502. The first tube 540a contacts an inner radial surface 517 of the weld notches 516 and the positioning fitting member 502 is welded to the first tube 540a such that a first tube portion 541 of the first tube 540a, the positioning fitting member 502, and a second tube portion 543 of the first tube 540a form a single integral structure, as detailed above. When the positioning fitting member 502 is coupled to the first tube 540a, the tapered surfaces 518 provide a smooth transition between the positioning fitting member 502 and the first tube 540a to reduce the stress concentration on the coupling between the positioning fitting member 502 and the first tube 540a under operational loads on the tubes 540 during operation of the turbine engine 10 or the engineering assembly. During operation, the radial faces 562 may contact the ribs 514 to prevent the clamping element 552 from sliding or from moving axially about the tubes 540.

Figure 6A:
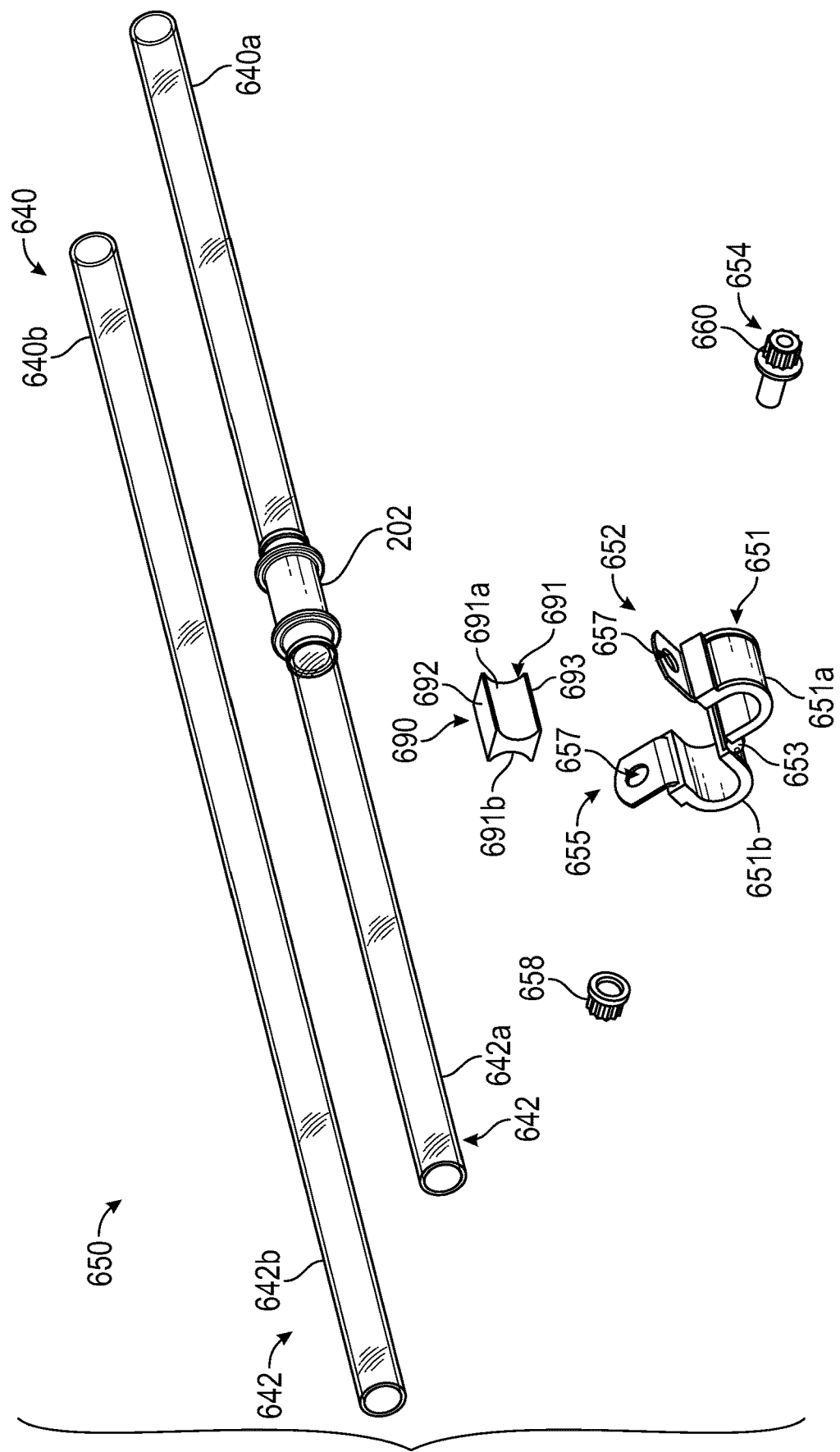
FIG. 6A is an exploded view of another fastening assembly for tubular structures, according to another embodiment of the present disclosure.

FIG. 6A is an exploded view of another fastening assembly for tubular structures, according to another embodiment of the present disclosure. FIG. 6A shows a plurality of tubes 640 and a fastening assembly 650. The fastening assembly 650 includes a positioning fitting member 202, one or more clamping elements 652, a spacer element 690, and a removable fastening mechanism 654. The plurality of tubes 640 is a bank of tubes and includes a first tube 640a and a second tube 640b. Each tube 640 defines a tube outer surface 642. For example, the first tube 640a includes a first tube outer surface 642a and the second tube 640b includes a second tube outer surface 642b. The positioning fitting member 202 is coupled to the first tube 640a such that the positioning fitting member 202 forms a part of the first tube outer surface 642a of the first tube 640a.

Figure 6B:
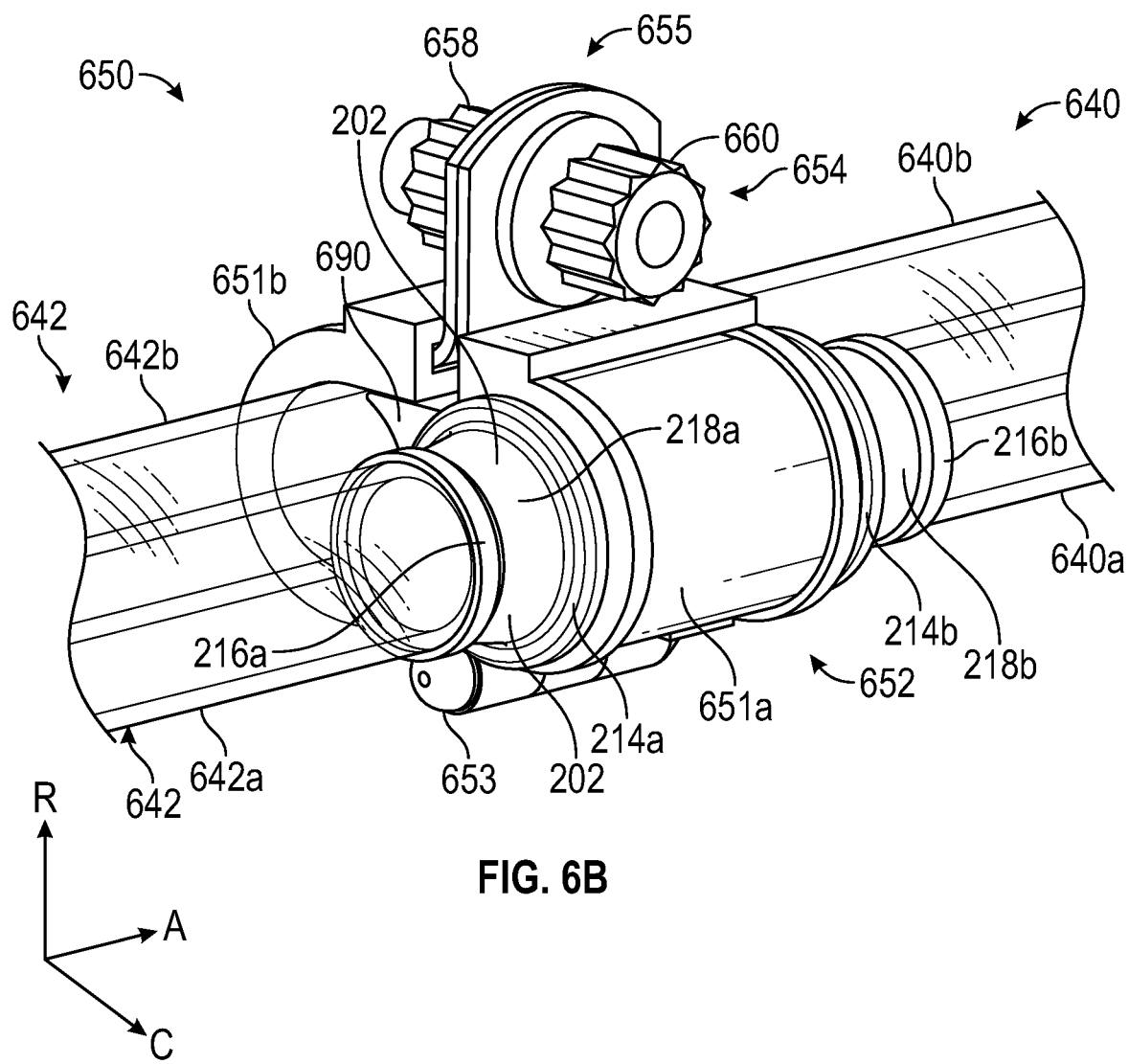
FIG. 6B is an enlarged schematic view of the fastening assembly of FIG. 6A in an assembled state, according to an embodiment of the present disclosure.

The one or more clamping elements 652 includes a single clamping element. The clamping element 652 is substantially similar to the clamping element 552 (FIG. 5A) but includes a cushion, as detailed further below. The clamping element 652 includes a metallic band that forms a plurality of looped sections 651. For example, the clamping element 652 includes a first looped section 651a and a second looped section 651b. The looped sections 651 are coupled together at a first end by a hinge 653 such that looped sections 651 can be opened (FIG. 6A) and closed (FIG. 6B). The looped sections 651 include a size and a shape that generally corresponds to a size and a shape of the tubes 640. In this way, the clamping element 652 can be closed to clamp around the tubes 640, as detailed further below. The clamping element 652 includes a plurality of clamp arms 655. Each clamp arm 655 is disposed at, and extends from, a second end of a respective looped section 651. FIG. 6A shows the clamping element 652 includes two clamp arms 655, but the clamping element 652 may include any number of clamp arms 655 as desired. Each of the plurality of clamp arms 655 includes an aperture 657 disposed therein for receiving the removable fastening mechanism 654. When the clamping element 652 is closed, the clamp arms 655 contact each other and the respective apertures 657 align with each other such that the removable fastening mechanism 654 can be inserted therethrough. The removable fastening mechanism 654 includes a nut 658 and a bolt 660, as detailed above.

The spacer element 690 includes a body having one or more cradle brackets 691 that define contact faces of the spacer element 690. The cradle brackets 691 are concave to correspond to a shape of the tubes 640. The cradle brackets 691 may include any shape that corresponds to respective tubes, conduits, pipes, etc. The spacer element 690 includes two opposing cradle brackets 691 including a first cradle bracket 691a and a second cradle bracket 691b. The spacer element 690 includes a first end 692 and a second end 693 opposite the first end 692. The spacer element 690 does not include raised edges like the spacer element 590.

FIG. 6B shows an enlarged schematic side view of the fastening assembly 650 of FIG. 6A in an assembled state, according to an embodiment of the present disclosure. In FIG. 6B, the spacer element 690 spatially separates the tubes 640 and distributes stress in the fastening assembly 650. For example, the tubes 640 are inserted into and contact the respective cradle brackets 691 (FIG. 6A). The clamping element 652 extends around at least a portion of the tube outer surfaces 642 of the tubes 640. The clamping element 652 extends about and contacts the first end 692 (FIG. 6A) and the second end 693 (FIG. 6A) of the spacer element 690.

The first looped section 651a of the clamping element 652 is clamped to the positioning fitting member 202 of the first tube 640a such that the clamping element 652 extends around at least a portion of the positioning fitting member 202. In this way, the clamping element 652 is positioned between the first rib 214a and the second rib 214b of the positioning fitting member 202 when the fastening assembly 650 is assembled. The second looped section 651b is clamped to the second tube 640b such that the clamping element 652 extends around at least a portion of the second tube outer surface 642b of the second tube 640b. When the fastening assembly 650 is assembled, the clamp arms 655 contact each other and the removable fastening mechanism 654 is inserted into the respective apertures 657 (FIG. 6A) to fasten and to secure the clamping element 652 about the tubes 640. Thus, the clamping element 652 extends around at least a portion of the positioning fitting member 202 and around at least a portion of the tube outer surfaces 642 of the tubes 640 to bundle and to fasten the tubes 640 together. The positioning fitting member 202 prevents the first tube 640a from sliding or from moving axially beyond the ribs 214 of the positioning fitting member 202, as detailed above.

Figure 6C:
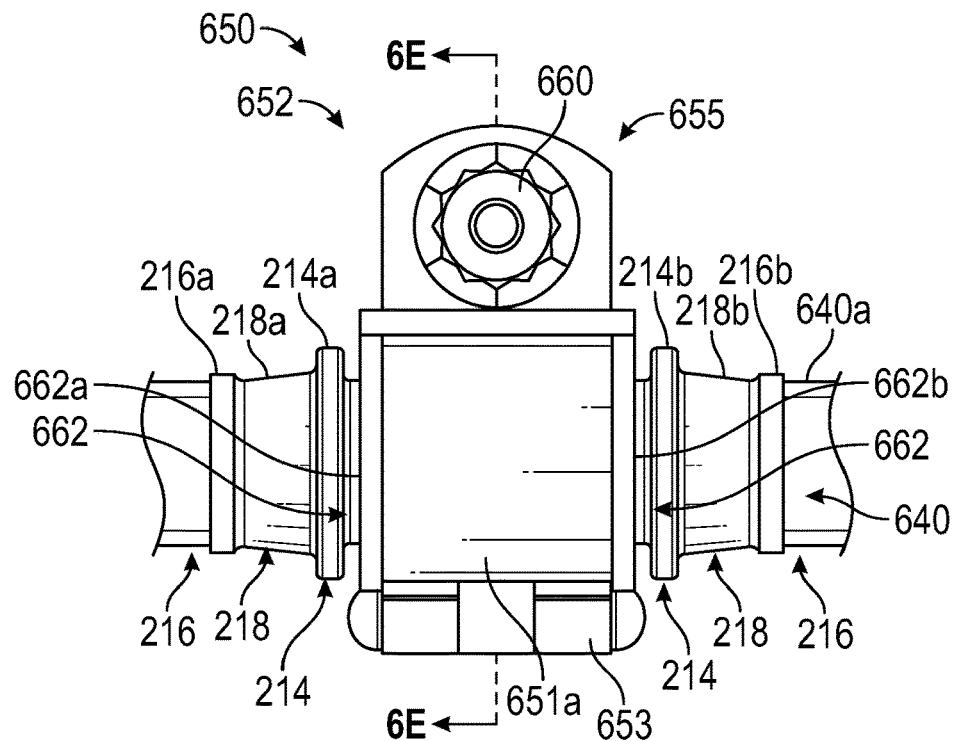
FIG. 6C is a schematic side view of the fastening assembly of FIG. 6B, according to an embodiment of the present disclosure.

FIG. 6C shows a schematic side view of the fastening assembly 650, according to an embodiment of the present disclosure. FIG. 6C shows that the clamping element 652 includes a plurality of radial faces 662 including a first radial face 662a and a second radial face 662b. The radial faces 662 extend radially and define a portion of an outer surface of the clamping element 652. When the clamping element 652 is clamped to the positioning fitting member 202 of the first tube 640a, the radial faces 662 are spaced from the ribs 214 of the positioning fitting member 202. During operation of the turbine engine or of the engineering assembly, the tubes 640 may move axially, circumferentially, or radially due to vibrations and relative motion of the various tubes and other assemblies. The positioning fitting member 202 prevents the clamping element 652 from sliding or moving axially with respect to the tubes 640. When the clamping element 652 begins to slide or to move axially, the radial faces 662 contact the ribs 214 of the positioning fitting member 202 such that the clamping element 652 is prevented from sliding or moving axially beyond the ribs 214. For example, the first radial face 662a may contact the first rib 214a if the clamping elements 652 or the first tube 640a slide or move in a first axial direction, and the second radial face 662b may contact the second rib 214b if the clamping elements 652 or the first tube 640a slide or move in a second axial direction opposite the first axial direction.

Figure 6D:
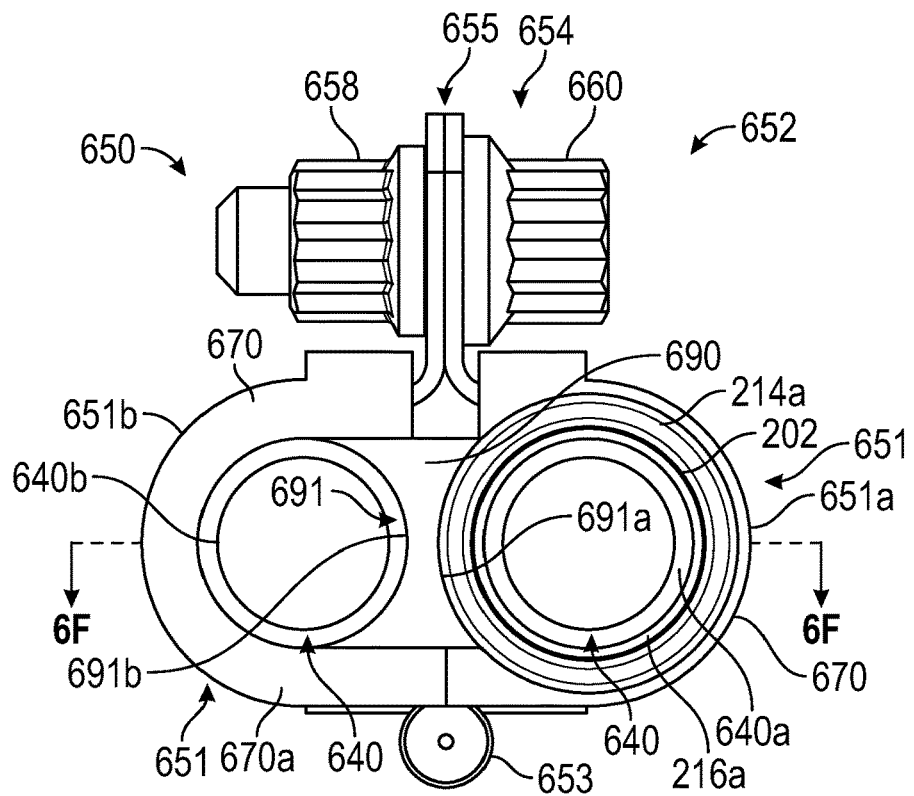
FIG. 6D is a schematic front view of the fastening assembly of FIG. 6B, according to an embodiment of the present disclosure.

FIG. 6D shows a schematic front view of the fastening assembly 650, according to an embodiment of the present disclosure. FIG. 6D shows the spacer element 690 spatially separates the tubes 640 and the tubes 640 engage with the cradle brackets 691. For example, the first tube 640a engages with the first cradle bracket 691a and the second tube 640b engages with the second cradle bracket 691b. The clamping element 652 is disposed on the first end 692 (FIG. 6A) and the second end 693 (FIG. 6A) of the spacer element 690. The clamping element 652 includes a cushion 670 disposed about the clamping element 652 that includes an outer cushion portion 670a and an inner cushion portion 670b (shown in FIG. 6E). FIG. 6D shows the outer cushion portion 670a disposed about an outer surface of the clamping element 652. The inner cushion portion 670a (FIG. 6E) of the cushion 670 is disposed within a respective clamping element 652 such that the cushion 670 extends around and contacts a respective tube 640, as detailed further below. The cushion 670 provides friction damping between the clamping element 652 and a respective tube 640. The cushion 670 is made from a polymer composite material or a similar material, as detailed above, for providing friction damping. The cushion 670 provides improved friction damping compared to a metal-to-metal contact between the clamping element 652 and the tube 640 or the positioning fitting member 202. In this way, the clamping element 652 provides improved friction damping but less heat resistance and stiffness as compared to the clamping element 552 (FIG. 5B). Thus, clamping elements with cushions can be used for improved friction damping for environments with low or moderate temperatures.

Figure 6E:
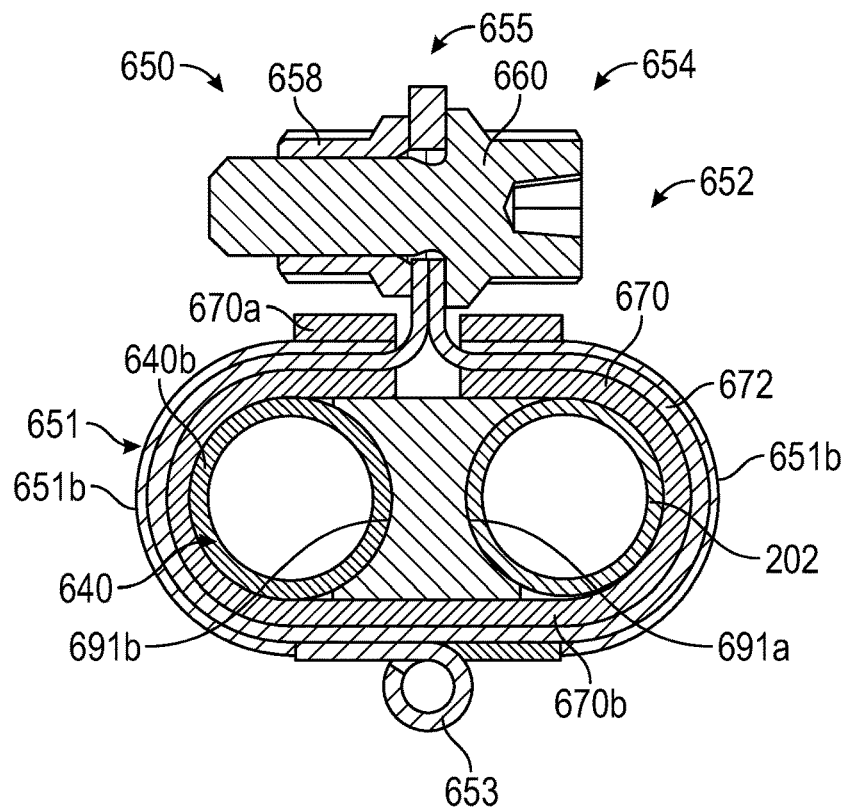
FIG. 6E is a cross-sectional view of the fastening assembly, taken at detail 6E-6E in FIG. 6C, according to an embodiment of the present disclosure.

FIG. 6E shows a cross-sectional view of the fastening assembly 650, taken at detail 6E-6E in FIG. 6C, according to an embodiment of the present disclosure. FIG. 6E shows the clamping element 652 includes a clamp body 672. The clamp body 672 defines a size and a shape of the clamping element 652. For example, the clamp body 672 defines the looped sections 651 and the clamp arms 655 of the clamping element 652. The clamp body 672 is made of any material such as, for example, metal, alloys, composites, or the like. The cushion 670 is coupled to, and disposed within, the clamp body 672 and forms a shape corresponding to the shape of the clamp body 672. For example, the cushion 670 includes the outer cushion portion 670a and the inner cushion portion 670b. The clamp body 672 can be inserted between the outer cushion portion 670a and the inner cushion portion 670b to couple the cushion 670 to the clamp body 672. Thus, the inner cushion portion 670b of the cushion 670 defines an interior surface of the clamping element 652 and engages with a respective tube 640 or with a positioning fitting member 202 to bundle and to secure the tubes 640 together.

Figure 6F:
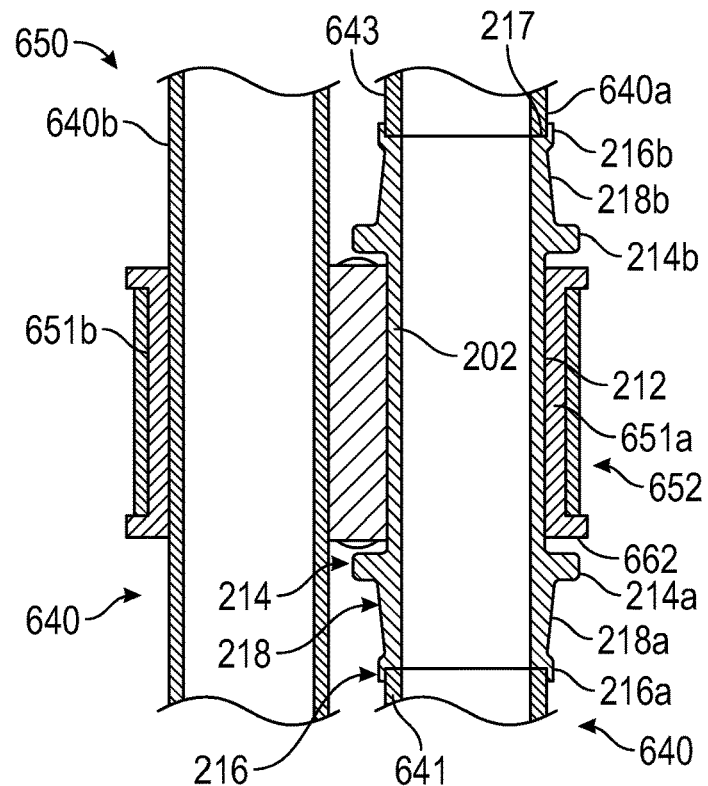
FIG. 6F is a cross-sectional view of the fastening assembly, taken at detail 6F-6F in FIG. 6D, according to an embodiment of the present disclosure.

FIG. 6F shows a cross-sectional view of the fastening assembly 650, taken at detail 6F-6F in FIG. 6D, according to an embodiment of the present disclosure. FIG. 6F shows the clamping element 652 engages with respective tubes 640. For example, the first looped section 651a engages with the positioning fitting member 202 of the first tube 640a and the second looped section 651b engages with the second tube 640b. When the clamping element 652 is engaged with the tubes 640, the clamping element 652 generates a high radial compressive force on the tubes 640 to maintain the bundle of tubes 640 under operational loads while the positioning fitting member 202 maintains the clamping element 652 in the intended location and position. For example, the ribs 214 of the positioning fitting member 202 prevent the clamping elements 652 from sliding or moving axially about the tubes 640, as detailed above.

FIG. 6F shows the weld notch 216 of the positioning fitting member 202. The first tube 640a contacts the inner radial surface 217 of the weld notches 216 and the positioning fitting member 202 is welded to the first tube 640a such that a first tube portion 641 of the first tube 640a, the positioning fitting member 202, and a second tube portion 643 of the first tube 640a form a single integral structure, as detailed above. When the positioning fitting member 202 is coupled to the first tube 640a, the tapered surfaces 218 provide a smooth transition between the positioning fitting member 202 and the first tube 640a to reduce the stress concentration on the coupling between the positioning fitting member 202 and the first tube 640a under operational loads on the tubes 640 during operation of the turbine engine 10 or the engineering assembly. During operation, the radial faces 662 may contact the ribs 214 to prevent the clamping element 652 from sliding or from moving axially about the tubes 640.

Figure 7A:
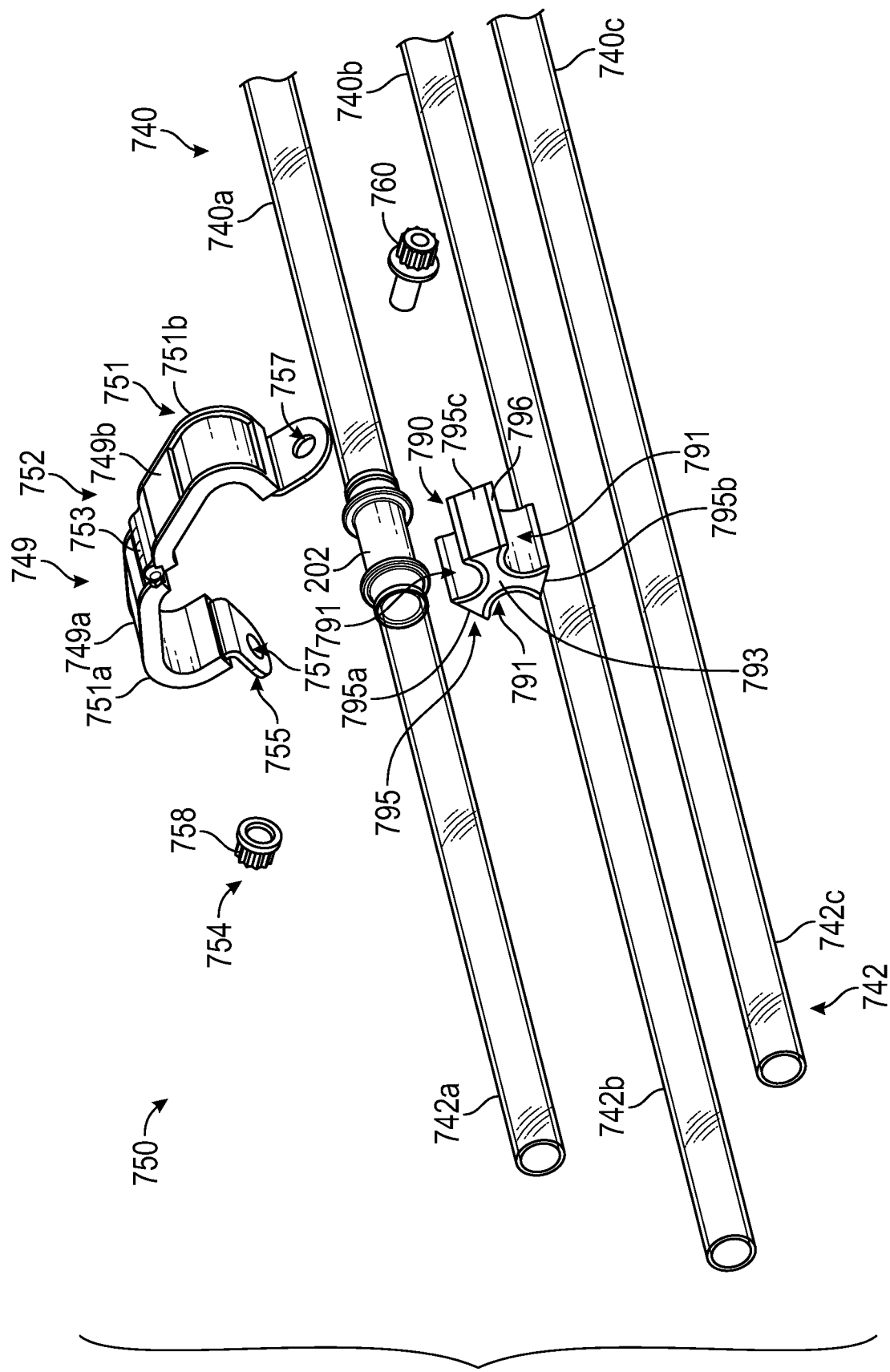
FIG. 7A is an exploded view of another fastening assembly for tubular structures, according to another embodiment of the present disclosure.

FIG. 7A is an exploded view of another fastening assembly 750 for tubular structures, according to another embodiment of the present disclosure. FIG. 7A shows a plurality of tubes 740 and a fastening assembly 750. The fastening assembly 750 includes a positioning fitting member 202, one or more clamping elements 752, a spacer element 790, and a removable fastening mechanism 754. The plurality of tubes 740 is a bank of tubes and includes a first tube 740a, a second tube 740b, and a third tube 740c. Each tube 740 defines a tube outer surface 742. For example, the first tube 740a includes a first tube outer surface 742a, the second tube 740b includes a second tube outer surface 742b, and the third tube 740c includes a third tube outer surface 742c. The positioning fitting member 202 is coupled to the first tube 740a such that the positioning fitting member 202 forms a part of the first tube outer surface 742a of the first tube 740a.

Figure 7B:
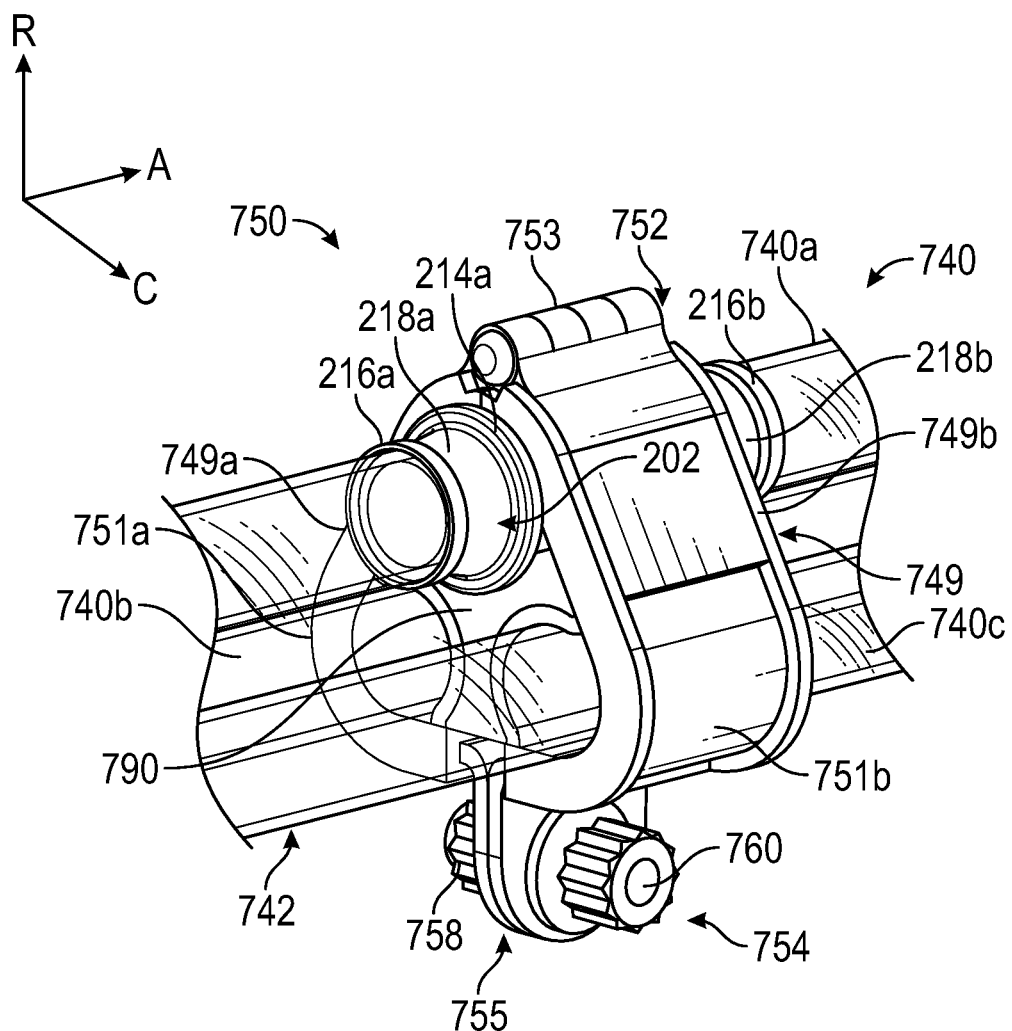
FIG. 7B is an enlarged schematic view of the fastening assembly of FIG. 7A in an assembled state, according to an embodiment of the present disclosure.

The one or more clamping elements 752 includes a single clamping element. The clamping element 752 includes a generally triangular shape. The clamping element 752 includes a metallic band that forms a plurality of straight sections 749 and a plurality of looped sections 751. For example, the clamping element 752 includes a first straight section 749a and a second straight section 749b coupled together at a hinge 753 such that the clamping element 752 can be opened (FIG. 7A) and closed (FIG. 7B). The straight sections 749 each includes a curved portion at a first end thereof such that the curved portions engage a respective tube 740 when the clamping element 752 is closed. The clamping element 752 includes a first looped section 751a and a second looped section 751b. The looped sections 751 extend from the respective straight sections 749. For example, the first looped section 751a extends at a first end from the first straight section 749a and the second looped section 751b extends at a first end from the second straight section 749b. The looped sections 751 include a size and a shape that generally corresponds to a size and a shape of the tubes 740. In this way, the clamping element 752 can be closed to clamp around the tubes 740, as detailed further below. The clamping element 752 includes a plurality of clamp arms 755. Each clamp arm 755 is disposed at, and extends from, a second end of a respective looped section 751. FIG. 7A shows the clamping element 752 includes two clamp arms 755, but the clamping element 752 may include any number of clamp arms 755 as desired. Each of the plurality of clamp arms 755 includes an aperture 757 disposed therein for receiving the removable fastening mechanism 754. When the clamping element 752 is closed, the clamp arms 755 contact each other and the respective apertures 757 align with each other such that the removable fastening mechanism 754 can be inserted therethrough. The removable fastening mechanism 754 includes a nut 758 and a bolt 760, as detailed above.

The spacer element 790 includes a body having one or more cradle brackets 791 that define contact faces of the spacer element 790. The cradle brackets 791 are concave to correspond to a shape of the tubes 740. The cradle brackets 791 may include any shape that corresponds to respective tubes, conduits, pipes, etc. The spacer element 790 includes three cradle brackets 791. The spacer element 790 includes a core part 793 and a plurality of radial arms 795 extending radially outward from the core part 793. The plurality of radial arms 795 include a first radial arm 795a, a second radial arm 795b, and a third radial arm 795c. The radial arms 795 define a portion of the cradle brackets 791. The core part 793 and the radial arms 795 may be integral and unitary or may be separate components coupled together. The spacer element 790 may include any number of radial arms 795 and cradle brackets 791 as desired. Each cradle bracket 791 includes a cushion 796. The cushion 796 includes a shape that generally corresponds to a shape of the cradle brackets 791. In this way, the tubes 740 engage with the cushion 796 and the cushion provides friction damping similar to the cushions detailed above.

FIG. 7B shows an enlarged schematic side view of the fastening assembly 750 of FIG. 7A in an assembled state, according to an embodiment of the present disclosure. In FIG. 7B, the spacer element 790 spatially separates the tubes 740 and distributes stress in the fastening assembly 750. For example, the tubes 740 are inserted into and contact the respective cradle brackets 791 (FIG. 7A). The clamping element 752 extends around at least a portion of the tube outer surfaces 742 of the tubes 740. The clamping element 752 extends about and contacts outer surfaces of the radial arms 795 (FIG. 7A) of the spacer element 790.

When the clamping element 752 is closed, the curved portion of the straight sections 749 forms a shape that generally corresponds to a shape of the first tube 740a and thus clamps to the positioning fitting member 202 of the first tube 740a. In this way, the clamping element 752 is positioned between the first rib 214a and the second rib 214b of the positioning fitting member 202 when the fastening assembly 750 is assembled. The first looped section 751a of the clamping element 752 is clamped to the second tube 740b such that the clamping element 752 extends around at least a portion of the second tube outer surface 742b of the second tube 740b. The second looped section 751b is clamped to the third tube 740c such that the clamping element 752 extends around at least a portion of the third tube outer surface 742c of the third tube 740c. When the fastening assembly 750 is assembled, the clamp arms 755 contact each other and the removable fastening mechanism 754 is inserted into the respective apertures 757 (FIG. 7A)

to fasten and to secure the clamping element 752 about the tubes 740. Thus, the clamping element 752 extends around at least a portion of the positioning fitting member 202 and around at least a portion of the tube outer surfaces 742 of the tubes 740 to bundle and to fasten the tubes 740 together. The positioning fitting member 202 prevents the first tube 740*a* from sliding or from moving axially beyond the ribs 214 of the positioning fitting member 202, as detailed above.

Figure 7C:
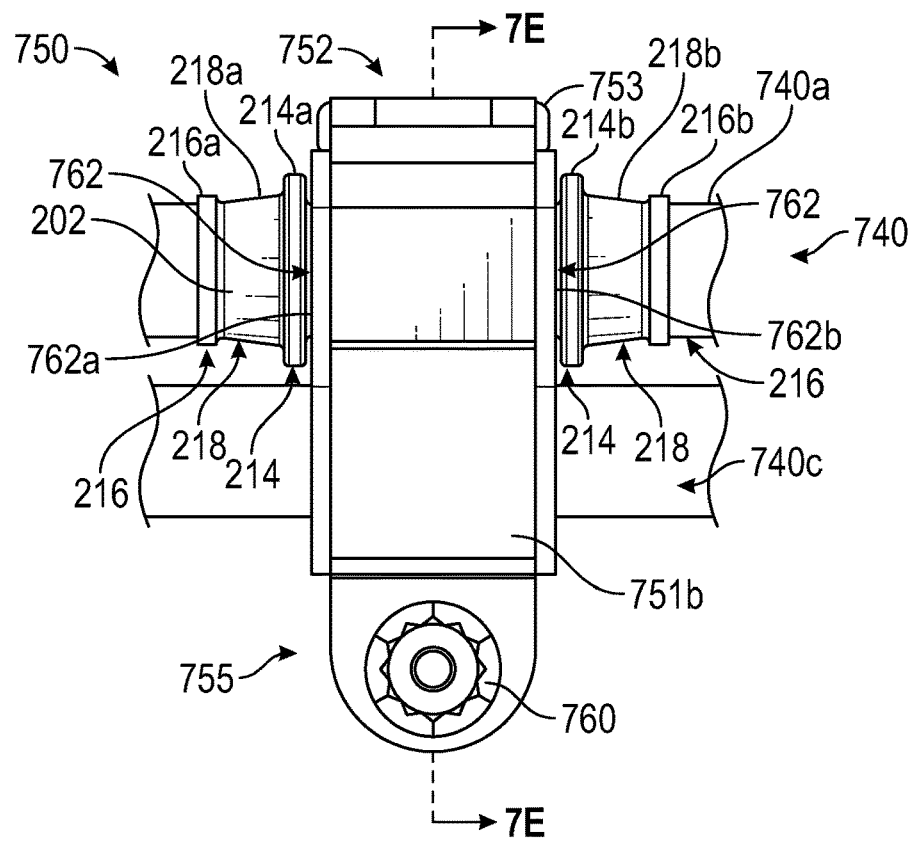
FIG. 7C is a schematic side view of the fastening assembly of FIG. 7B, according to an embodiment of the present disclosure.

FIG. 7C shows a schematic side view of the fastening assembly 750, according to an embodiment of the present disclosure. FIG. 7C shows that the clamping element 752 includes a plurality of radial faces 762 including a first radial face 762*a* and a second radial face 762*b*. The radial faces 762 extend radially and define a portion of an outer surface of the clamping element 752. When the clamping element 752 is clamped to the positioning fitting member 202 of the first tube 740*a*, the radial faces 762 are spaced from the ribs 214 of the positioning fitting member 202. During operation of the turbine engine or of the engineering assembly, the tubes 740 may move axially, circumferentially, or radially due to vibrations and relative motion of the various tubes and other assemblies. The positioning fitting member 202 prevents the clamping element 752 from sliding or moving axially with respect to the tubes 740. When the clamping element 752 begins to slide or to move axially, the radial faces 762 contact the ribs 214 of the positioning fitting member 202 such that the clamping element 752 is prevented from sliding or moving axially beyond the ribs 214. For example, the first radial face 762*a* may contact the first rib 214*a* if the clamping elements 752 or the first tube 740*a* slide or move in a first axial direction, and the second radial face 762*b* may contact the second rib 214*b* if the clamping elements 752 or the first tube 740*a* slide or move in a second axial direction opposite the first axial direction.

Figure 7D:
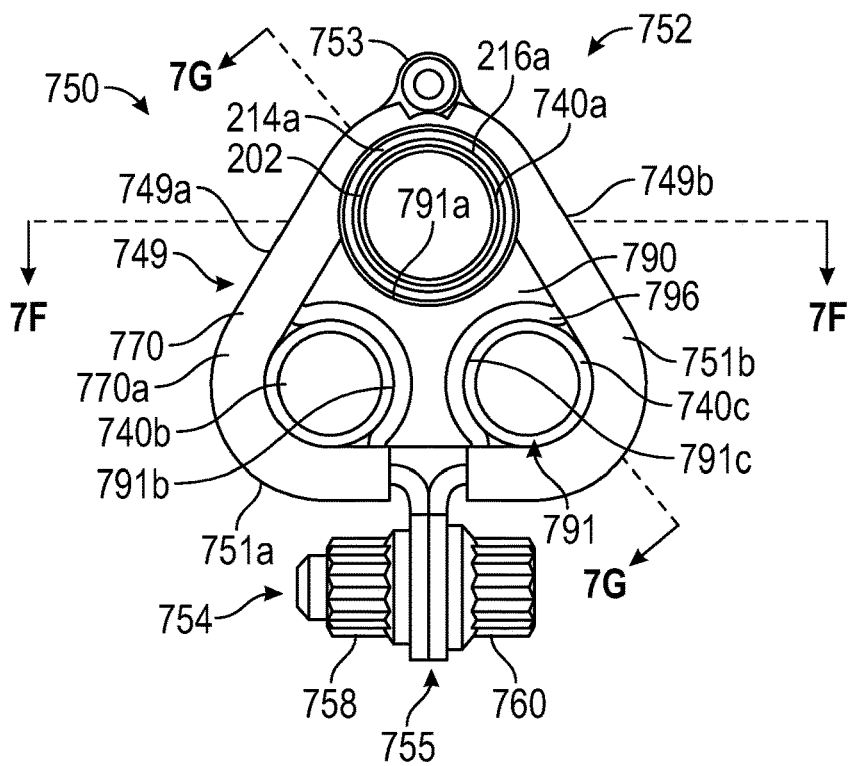
FIG. 7D is a schematic front view of the fastening assembly of FIG. 7B, according to an embodiment of the present disclosure.

FIG. 7D shows a schematic front view of the fastening assembly 750, according to an embodiment of the present disclosure. FIG. 7D shows the spacer element 790 spatially separates the tubes 740 and the tubes 740 engage with the cradle brackets 791. For example, the first tube 740*a* engages with the first cradle bracket 791*a*, the second tube 740*b* engages with the second cradle bracket 791*b*, and the third tube 740*c* engages with the third cradle bracket 791*c*. The clamping element 752 is disposed about the outer surfaces of the radial arms 795 (FIG. 7A). The clamping element 752 includes a cushion 770 disposed about the clamping element 752 that includes an outer cushion portion 770*a* and an inner cushion portion 770*b* (shown in FIG. 7E). FIG. 7D shows the outer cushion portion 770*a* is disposed about an outer surface of the clamping element 752. The inner cushion portion 770*b* (FIG. 7E) of the cushion 770 is disposed within the clamping element 752 such that the cushion 770 extends around and contacts a respective tube 740, as detailed further below. The cushion 770 provides friction damping between the clamping element 752 and a respective tube 740. The cushion 770 is made from a polymer composite material or similar material, as detailed above, for providing friction damping.

Figure 7F:
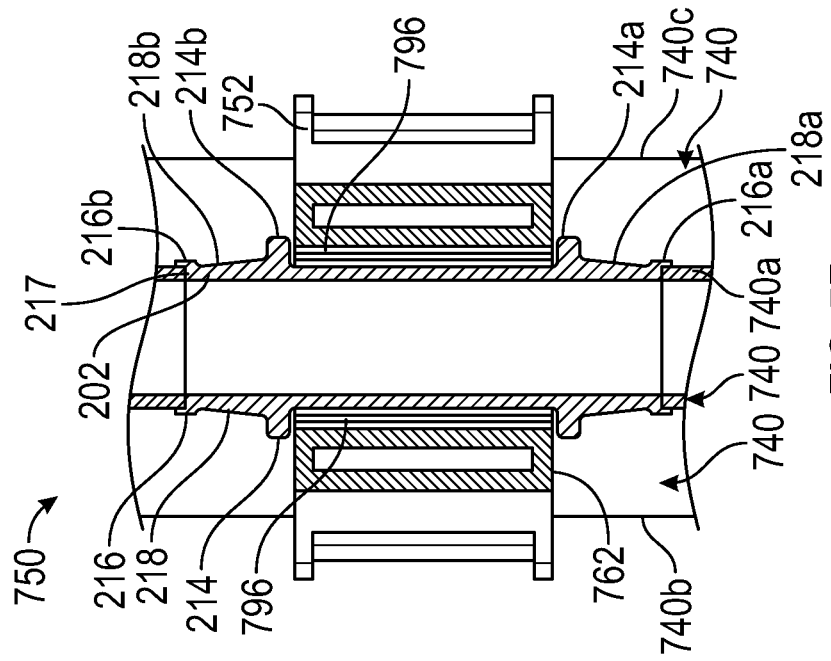
FIG. 7F is a cross-sectional view of the fastening assembly, taken at detail 7F-7F in FIG. 7D, according to an embodiment of the present disclosure.
Figure 7E:
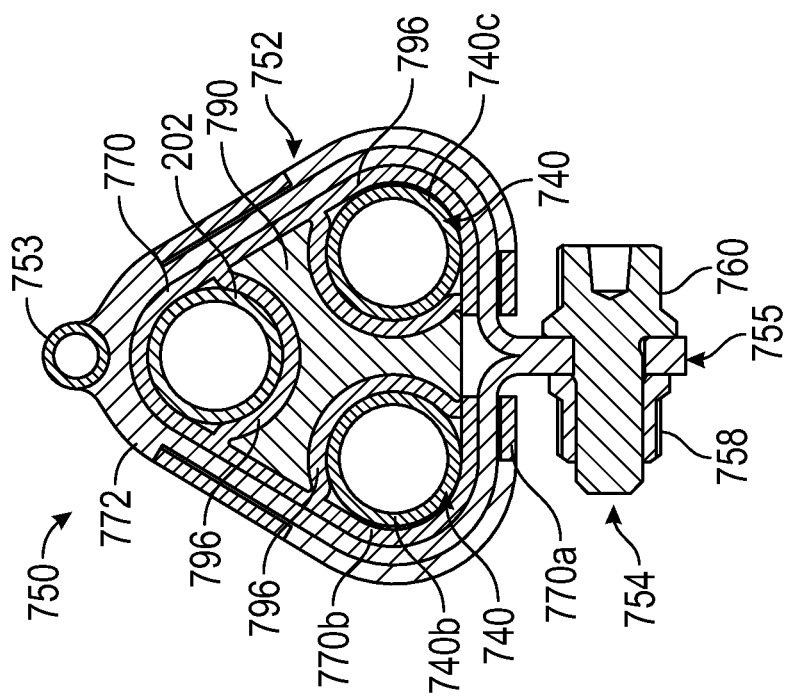
FIG. 7E is a cross-sectional view of the fastening assembly, taken at detail 7E-7E in FIG. 7C, according to an embodiment of the present disclosure.

FIG. 7E shows a cross-sectional view of the fastening assembly 750, taken at detail 7E-7E in FIG. 7C, according to an embodiment of the present disclosure. FIG. 7C shows the clamping element 752 includes a clamp body 772. The clamp body 772 defines a size and a shape of the clamping element 752. For example, the clamp body 772 defines the looped sections 751 and the clamp arms 755 of the clamping element 752. The clamp body 772 is generally triangular but may include any shape as desired. The clamp body 772 is made of any material such as, for example, metal, alloys, composites, or the like. The cushion 770 is coupled to, and disposed within, the clamp body 772 and forms a shape corresponding to the shape of the clamp body 772. For example, the cushion 770 includes the outer cushion portion 770*a* and the inner cushion portion 770*b*. The clamp body 772 can be inserted between the outer cushion portion 770*a* and the inner cushion portion 770*b* to couple the cushion 770 to the clamp body 752. The cushion 770 and the cushions 796 together form a shape that corresponds to the tubes 740 when the clamping element 752 is closed. Thus, the inner cushion portion 770*b* of the cushion 770 and the cushions 796 define an interior surface of the clamping element 752 and engage with a respective tube 740 or with a positioning fitting member 202 to bundle and to secure the tubes 740 together.

FIG. 7F shows a cross-sectional view of the fastening assembly 750, taken at detail 7F-7F in FIG. 7D, according to an embodiment of the present disclosure. FIG. 7F shows the clamping element 752 engages with respective tubes 740. For example, the cushion 796 and the cushion 770 (FIG. 7E) engage with the positioning fitting member 202 or with a respective tube 740. When the clamping element 752 is engaged with the tubes 740, the clamping element 752 generates high radial compressive force on the tubes 740 to maintain the bundle of tubes 740 under operational loads while the positioning fitting member 202 maintains the clamping element 752 in the intended location and position. For example, the ribs 214 of the positioning fitting member 202 prevent the clamping elements 752 from sliding or moving axially about the tubes 740, as detailed above.

FIG. 7F shows the weld notch 216 of the positioning fitting member 202. The first tube 740*a* contacts the inner radial surface 217 of the weld notches 216 and the positioning fitting member 202 is welded to the first tube 740*a*, as detailed above. When the positioning fitting member 202 is coupled to the first tube 740*a*, the tapered surfaces 218 provide a smooth transition between the positioning fitting member 202 and the first tube 740*a* to reduce the stress concentration on the coupling between the positioning fitting member 202 and the first tube 740*a* under operational loads on the tubes 740 during operation of the turbine engine 10 or the engineering assembly. During operation, the radial faces 762 may contact the ribs 214 to prevent the clamping element 752 from sliding or from moving axially about the tubes 740.

Figure 7G:
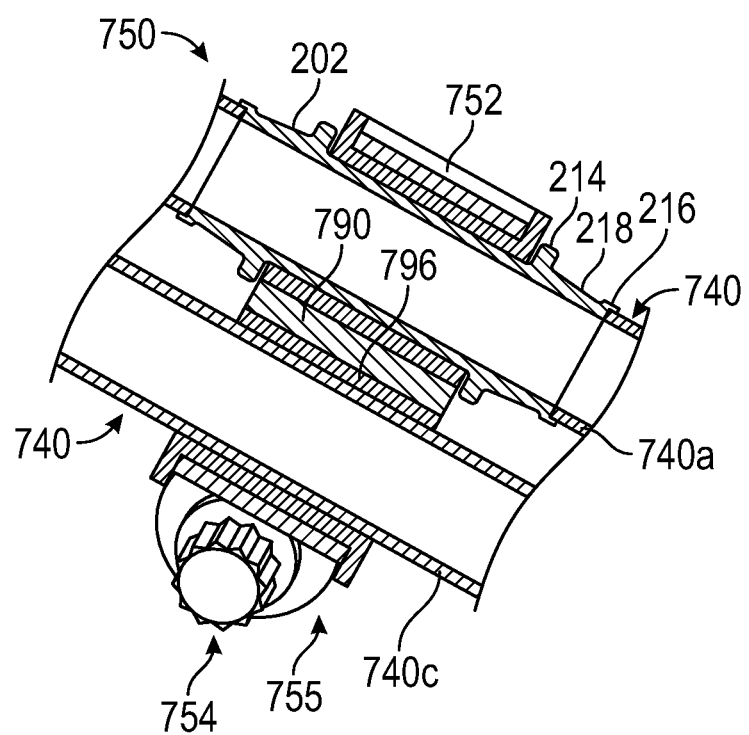
FIG. 7G is a cross-sectional view of the fastening assembly, taken at detail 7G-7G in FIG. 7D, according to an embodiment of the present disclosure.

FIG. 7G shows a cross-sectional view of the fastening assembly 750, taken at detail 7G-7G in FIG. 7D, according to an embodiment of the present disclosure. FIG. 7G shows the tubes 740 engage with the spacer element 790 such that the tubes 740 are spatially separated. The spacer element 790 is disposed between the ribs 214 of the positioning fitting member 202 such that the ribs 214 prevent the spacer element 790 from sliding or from moving axially beyond the ribs 214.

Figure 8A:
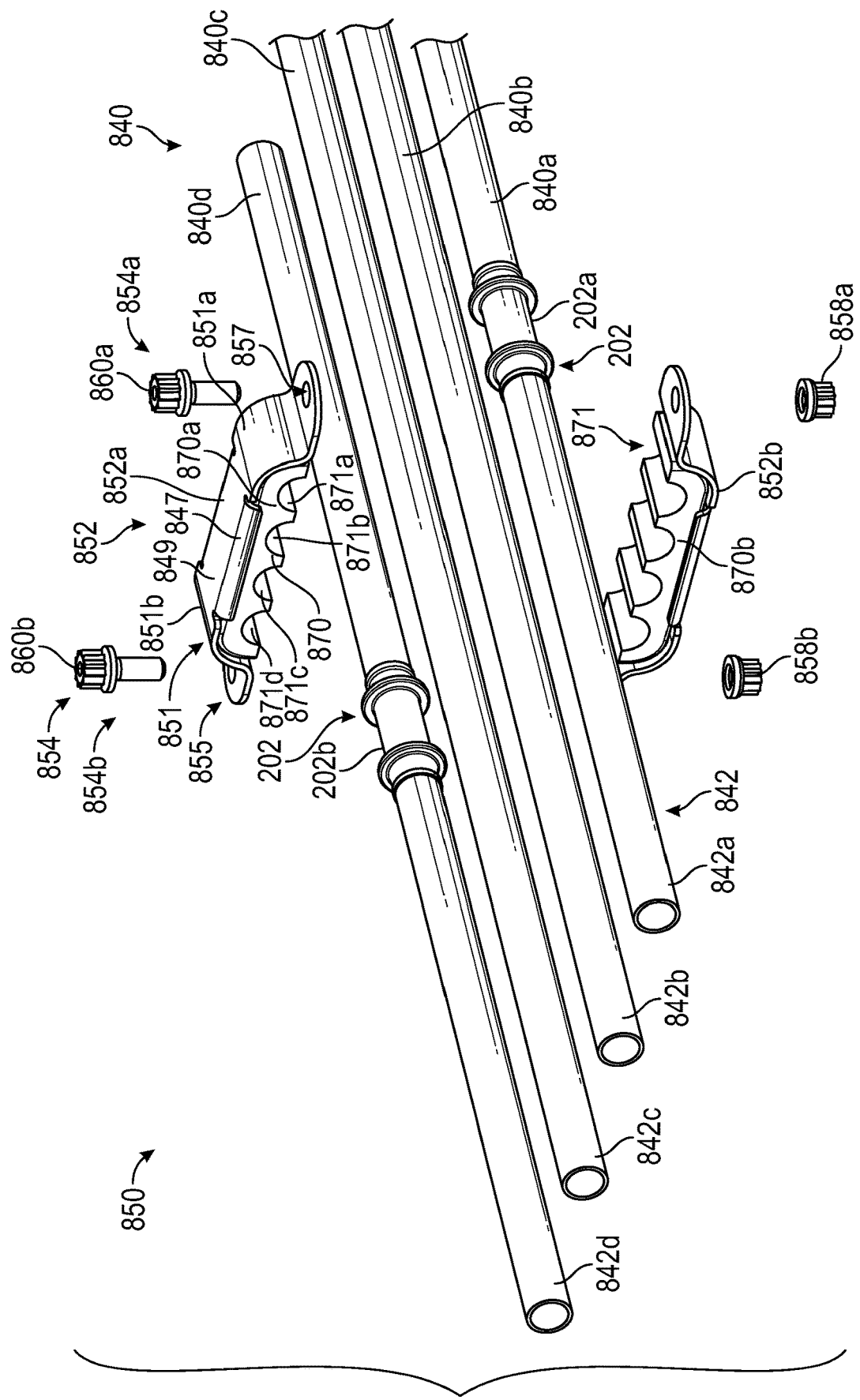
FIG. 8A is an exploded view of another fastening assembly for tubular structures, according to another embodiment of the present disclosure.

FIG. 8A is an exploded view of another fastening assembly 850 for tubular structures, according to another embodiment of the present disclosure. FIG. 8A shows a plurality of tubes 840 and a fastening assembly 850. The fastening assembly 850 includes one or more positioning fitting members 202, one or more clamping elements 852, and one or more removable fastening mechanisms 854. The plurality of tubes 840 is a bank of tubes and includes four tubes 840. The tubes 840 include a first tube 840*a*, a second tube 840*b*, a third tube 840*c*, and a fourth tube 840*d*. Each tube 840 defines a tube outer surface 842. For example, the first tube 840*a* includes a first tube outer surface 842*a*, the second tube 840*b* includes a second tube outer surface 842*b*, the third tube includes a third tube outer surface 842c, and the fourth tube 840d includes a fourth tube outer surface 842d. The positioning fitting members 202 include a first positioning fitting member 202a that is coupled to the first tube 840a such that the first positioning fitting member 202a forms a part of the first tube outer surface 842a of the first tube 840a. The positioning fitting members 202 include a second positioning fitting member 202b that is coupled to the fourth tube 840d such that the second positioning fitting member 202b forms a part of the fourth tube outer surface 842d of the fourth tube 840d. While the fastening assembly 850 includes two positioning fitting members 202, any tube 840 may include a respective positioning fitting member 202.

The one or more clamping elements 852 includes a first clamping element 852a and a second clamping element 852b. The first clamping element 852a and the second clamping element 852b together form a single clamping element 852. Each clamping element 852a, 852b includes a metallic band that forms a straight section 849 and a plurality of curved sections 851 disposed at respective ends of the straight section 849. For example, each clamping element 852a, 852b includes a first curved section 851a extending from a first end of the straight section 849 and a second curved section 851b extending from a second end of the straight section 849. The straight section 849 includes a plurality of lips 847 that extend from the straight section 849. A cushion 870 is disposed within the clamping element 852. The cushion 870 includes a first cushion 870a and a second cushion 870b. The first cushion 870a is coupled to the first clamping element 852a and secured by the lips 847 of the first clamping element 852a. The second cushion 870b is coupled to the second clamping element 852b and secured by the lips 847 of the second clamping element 852b. The cushion 870 may be coupled to the clamping element 852 by adhesive, mechanical bonding, chemical bonding, or the like. The cushion 870 includes one or more cradle surfaces 871 including a shape that generally corresponds to the shape of the tubes 840. For example, the cushion 870 includes a first cradle surface 871a, a second cradle surface 871b, a third cradle surface 871c, and a fourth cradle surface 871d. In this way, the tubes 840 engage with the cradle surfaces 871 when the fastening assembly 850 is assembled.

Each clamping element 852a, 852b forms a half of the clamping element 852 and each cushion 870a, 870b forms a half of the cushion 870. The clamping element 852 can be closed to clamp around the tubes 840 such that the clamping elements 852a, 852b together form the clamping element 852, as detailed further below. Each clamping element 852a, 852b includes a plurality of clamp arms 855. Each clamp arm 855 is disposed at, and extends from, a respective end of the respective curved sections 851. FIG. 8A shows the clamping elements 852a, 852b each includes two clamp arms 855, but the clamping elements 852a, 852b may include any number of clamp arms 855 as desired. Each of the plurality of clamp arms 855 includes an aperture 857 disposed therein for receiving a respective removable fastening mechanism 854. When the clamping element 852 is closed (e.g., the clamping elements 852a, 852b are mounted about the tube 840 and contact each other), the clamp arms 855 contact each other and the respective apertures 857 align with each other such that the respective removable fastening mechanisms 854 can be inserted therethrough. The removable fastening mechanisms 854 include a first fastening mechanism 854a that includes a first nut 858a and a first bolt 860a and a second fastening mechanism 854b that includes a second nut 858b and a second bolt 860b.

Figure 8B:
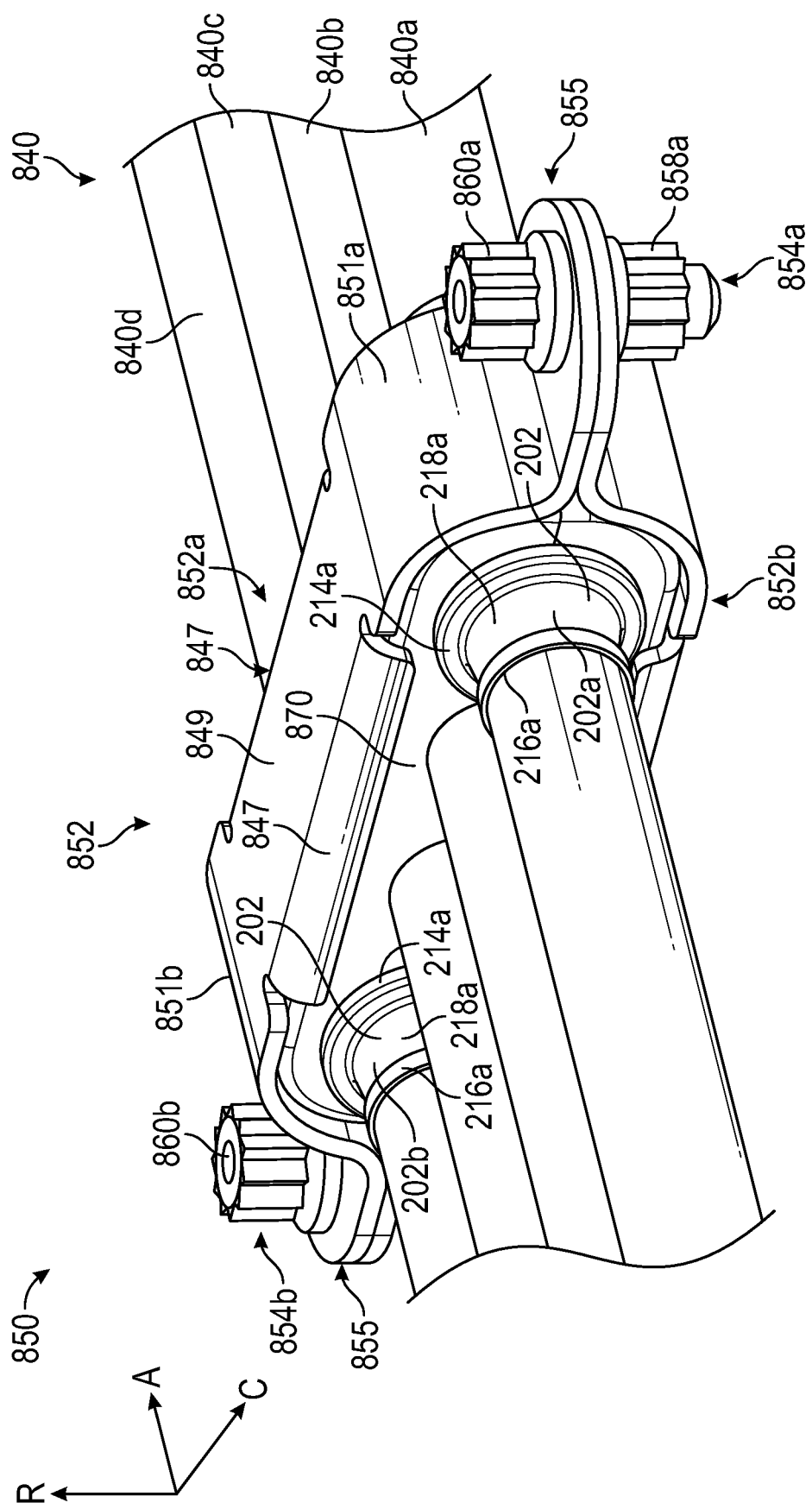
FIG. 8B is an enlarged schematic view of the fastening assembly of FIG. 8A in an assembled state, according to an embodiment of the present disclosure.

FIG. 8B shows an enlarged schematic view of the fastening assembly 850 of FIG. 8A in an assembled state, according to an embodiment of the present disclosure. In FIG. 8B, the cushion 870 spatially separates the tubes 840 and distributes stress in the fastening assembly 850. For example, the tubes 840 are inserted into and contact the respective cradle surfaces 871 (FIG. 8A). Thus, the cushion 870 of the clamping element 852 extends around at least a portion of the tube outer surfaces 842 of the tubes 840.

The cushion 870 (e.g., the first cradle surface 871a in FIG. 8A) of the clamping element 852 is clamped to the first positioning fitting member 202a of the first tube 840a such that the clamping element 852 extends around at least a portion of the first positioning fitting member 202a. In this way, the clamping element 852 is positioned between the first rib 214a and the second rib 214b (FIG. 8C) of the first positioning fitting member 202a when the fastening assembly 850 is assembled. The cushion 870 (e.g., the second cradle surface 871b in FIG. 8A) of the clamping element 852 is clamped to the second tube 840b such that the clamping element 852 extends around at least a portion of the second tube outer surface 842b of the second tube 840b. The cushion 870 (e.g., the third cradle surface 871c in FIG. 8A) of the clamping element 852 is clamped to the third tube 840c such that the clamping element 852 extends around at least a portion of the third tube outer surface 842c of the third tube 840c. The cushion 870 (e.g., the fourth cradle surface 871d in FIG. 8A) of the clamping element 852 is clamped to the second positioning fitting member 202b of the fourth tube 840d such that the clamping element 852 extends around at least a portion of the second positioning fitting member 202b. In this way, the clamping element 852 is positioned between the first rib 214a and the second rib 214b (FIG. 8C) of the second positioning fitting member 202b when the fastening assembly 850 is assembled.

When the fastening assembly 850 is assembled, the clamp arms 855 of the respective clamping elements 852a, 852b contact each other and the removable fastening mechanisms 854 are inserted into the respective apertures 857 (FIG. 6A) to fasten and to secure the clamping element 852 about the tubes 840. Thus, the clamping element 852 extends around at least a portion of the positioning fitting members 202 and around at least a portion of the tube outer surfaces 842 of the tubes 840 to bundle and to fasten the tubes 840 together. The positioning fitting members 202 prevent the first tube 840a and the fourth tube 840d from sliding or from moving axially beyond the ribs 214 of the positioning fitting members 202, as detailed above.

Figure 8C:
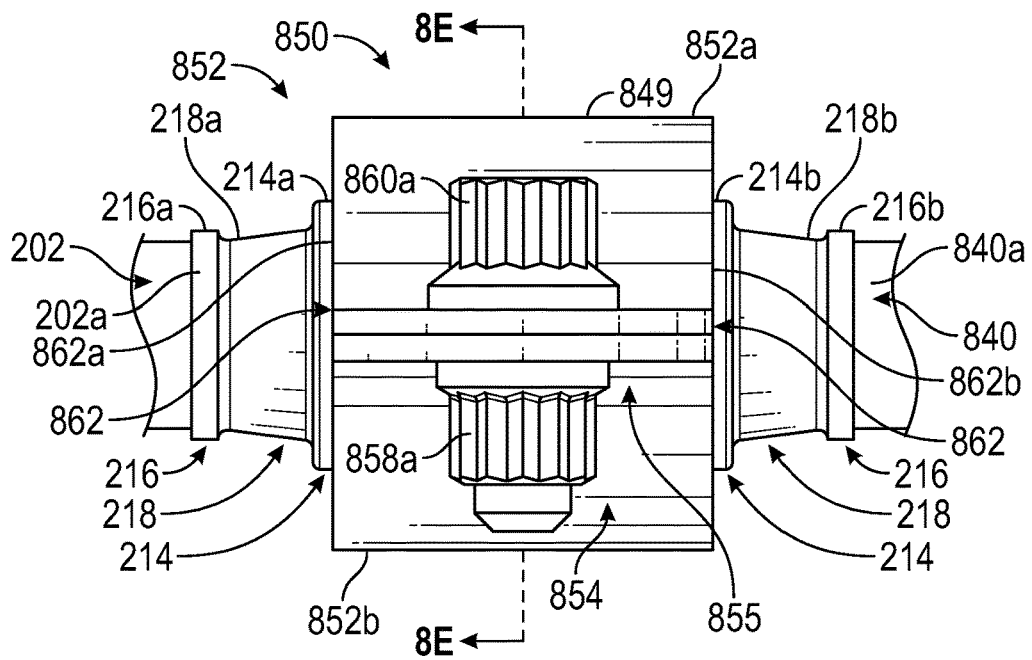
FIG. 8C is a schematic side view of the fastening assembly of FIG. 8B, according to an embodiment of the present disclosure.

FIG. 8C shows a schematic side view of the fastening assembly 850, according to an embodiment of the present disclosure. FIG. 8C shows that the clamping element 852 includes a plurality of radial faces 862 including a first radial face 862a and a second radial face 862b. The radial faces 862 extend radially and define a portion of an outer surface of the clamping element 852. For example, the radial faces 862 are faces of the cushion 870. When the clamping element 852 is clamped to the positioning fitting members 202 of the first tube 840a and the fourth tube 840d (FIG. 8B), the radial faces 862 are spaced from the ribs 214 of the positioning fitting members 202. During operation of the turbine engine or of the engineering assembly, the tubes 840 may move axially, circumferentially, or radially due to vibrations and relative motion of the various tubes and other assemblies. The positioning fitting members 202 prevent the clamping element 852 from sliding or moving axially with respect to the tubes 840. When the clamping element 852 begins to slide or to move axially, the radial faces 862 contact the ribs 214 of the positioning fitting members 202 such that the clamping element 852 is prevented from sliding or moving axially beyond the ribs 214. For example, the first radial face 862a may contact the first rib 214a of the first positioning fitting member 202a if the clamping elements 852 or the first tube 840a slide or move in a first axial direction, and the second radial face 862b may contact the second rib 214b of the first positioning fitting member 202a if the clamping element 852 or the first tube 840a slide or move in a second axial direction opposite the first axial direction. Likewise, the first radial face 862a may contact the first rib 214a of the second positioning fitting member 202b if the clamping elements 852 or the fourth tube 840d slide or move in the first axial direction, and the second radial face 862b may contact the second rib 214b of the second positioning fitting member 202b if the clamping element 852 or the fourth tube 840d slide or move in the second axial direction.

Figure 8D:
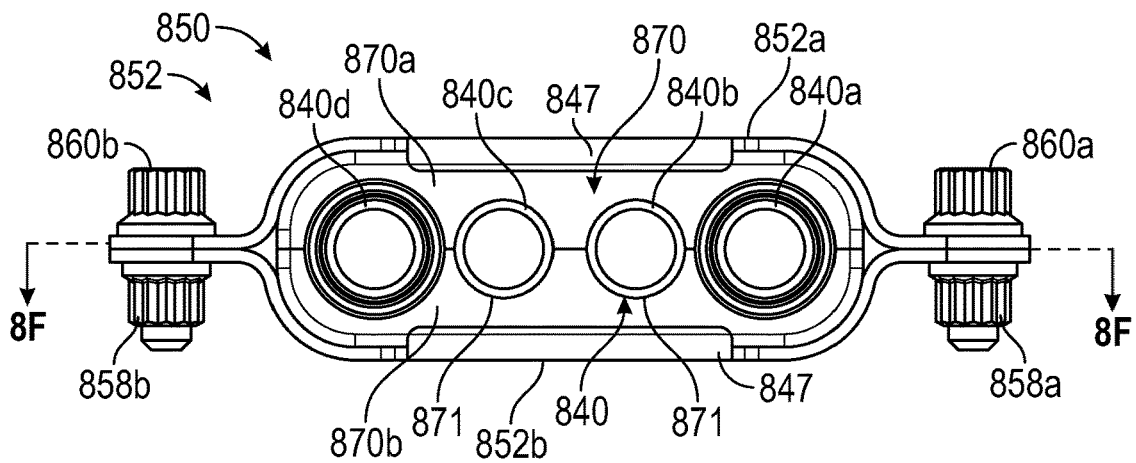
FIG. 8D is a schematic front view of the fastening assembly of FIG. 8B, according to an embodiment of the present disclosure.

FIG. 8D shows a schematic front view of the fastening assembly 850, according to an embodiment of the present disclosure. FIG. 8D shows the cradle surfaces 871 of the cushion 870 spatially separates the tubes 840 and the tubes 840 engage with the cradle surfaces 871. The cushion 870 provides friction damping between the clamping element 852 and a respective tube 840. The cushion 870 is made from a polymer composite material or a similar material, as detailed above, for providing friction damping. The lips 847 of the clamping element 852 prevent the cushion 870 from moving or sliding axially with respect to the clamping elements 852a, 852b.

Figure 8E:
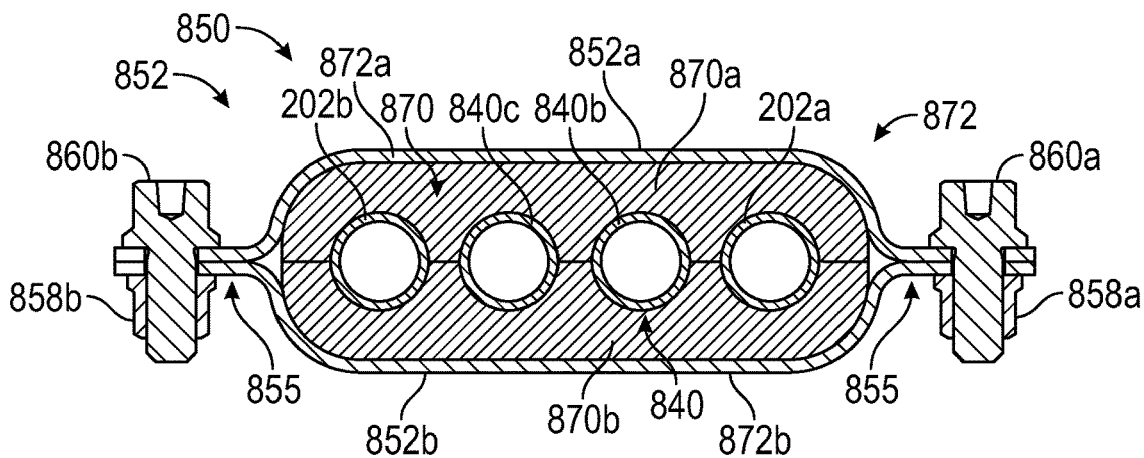
FIG. 8E is a cross-sectional view of the fastening assembly, taken at detail 8E-8E in FIG. 8C, according to an embodiment of the present disclosure.

FIG. 8E shows a cross-sectional view of the fastening assembly 850, taken at detail 8E-8E in FIG. 8C, according to an embodiment of the present disclosure. FIG. 8C shows the clamping element 852 includes a clamp body 872. The clamp body 872 defines a size and a shape of the clamping element 852. For example, the clamp body 872 includes a first clamp body 872a that defines the first clamping element 852a and a second clamp body 872b that defines the second clamping element 852b. The clamp body 872 is made of any material such as, for example, metal, alloys, composites, or the like. The cushion 870 is coupled to, and disposed within, the clamp body 872 and forms a shape corresponding to the shape of the clamp body 872. Thus, the cushion 870 defines an interior surface of the clamping element 852 and engages with the tubes 840 or with the positioning fitting members 202 to bundle and to secure the tubes 840 together.

Figure 8F:
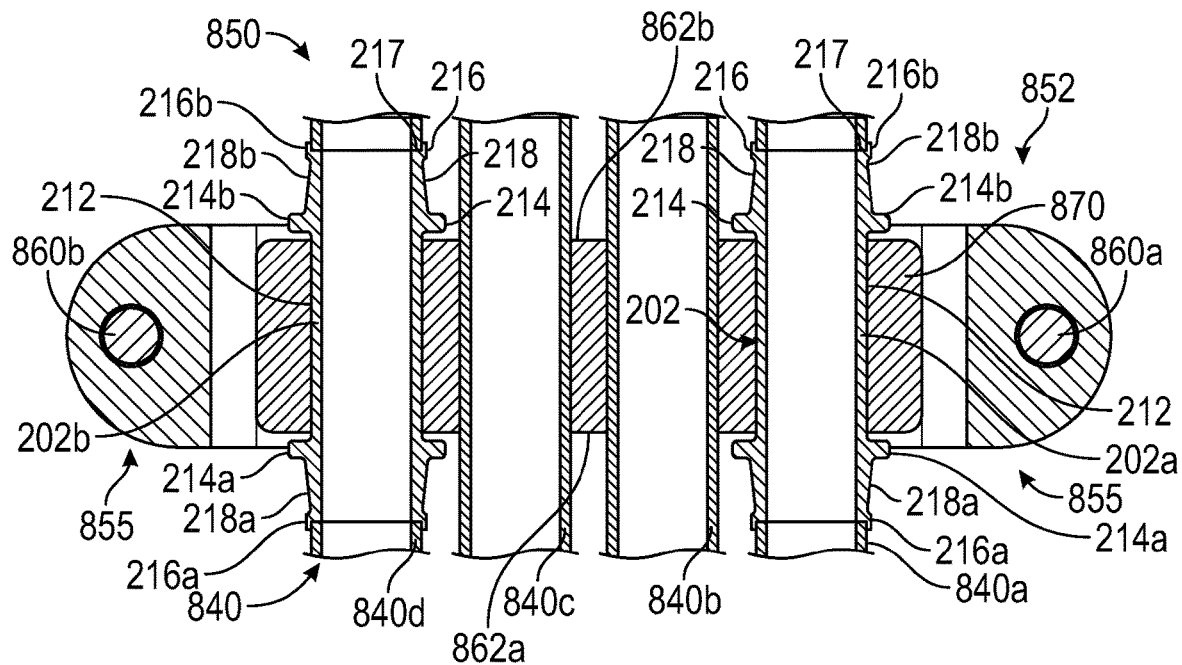
FIG. 8F is a cross-sectional view of the fastening assembly, taken at detail 8F-8F in FIG. 8D, according to an embodiment of the present disclosure.

FIG. 8F shows a cross-sectional view of the fastening assembly 850, taken at detail 8F-8F in FIG. 8D, according to an embodiment of the present disclosure. FIG. 8F shows the cushion 870 of the clamping element 852 engages with respective tubes 840. When the clamping element 852 is engaged with the tubes 840, the clamping element 852 generates high radial compressive force on the tubes 840 to maintain the bundle of tubes 840 under operational loads while the positioning fitting members 202 maintain the clamping element 852 in the intended location and position on the tubes 840. For example, the ribs 214 of the positioning fitting members 202 prevent the clamping element 852 from sliding or moving axially about the tubes 840, as detailed above.

FIG. 8F shows the weld notch 216 of the positioning fitting members 202a, 202b. The first tube 840a and the fourth tube 840d contact the inner radial surface 217 of the weld notches 216 and the positioning fitting members 202a, 202b are welded to the first tube 840a and the fourth tube 840d, respectively, as detailed above. When the positioning fitting members 202a, 202b are coupled to the first tube 840a and the fourth tube 840d, the tapered surfaces 218 provide a smooth transition between the positioning fitting members 202a, 202b and the tubes 840a, 840d to reduce the stress concentration on the coupling between the positioning fitting members 202a, 202b and the tubes 840a, 840d under operational loads on the tubes 840 during operation of the turbine engine 10 or the engineering assembly. During operation, the radial faces 862a, 862b may contact the ribs 214 of the respective positioning fitting members 202a, 202b to prevent the clamping element 852 from sliding or from moving axially about the tubes 840.

Figure 9:
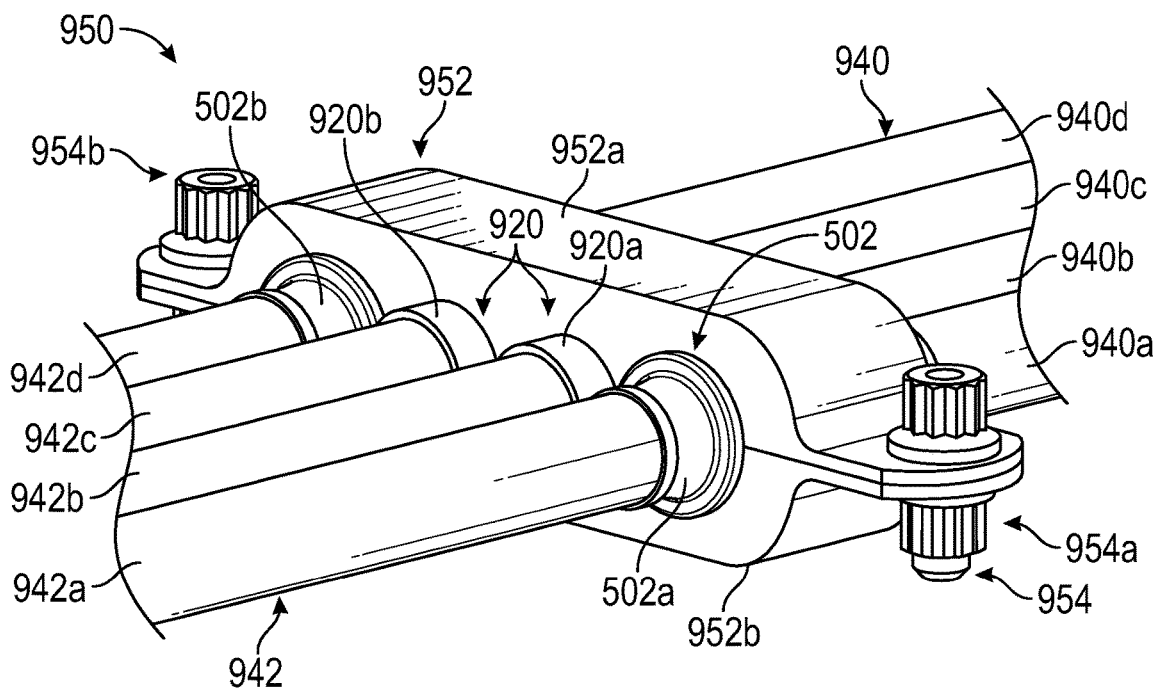
FIG. 9 is an enlarged schematic view of another fastening assembly in an assembled state, according to another embodiment of the present disclosure.

FIG. 9 shows an enlarged schematic view of another fastening assembly 950 in an assembled state, according to another embodiment of the present disclosure. FIG. 9 shows a plurality of tubes 940 and the fastening assembly 950. The fastening assembly 950 includes one or more positioning fitting members 502, one or more clamping elements 952, and one or more removable fastening mechanisms 954. The plurality of tubes 940 is a bank of tubes and includes four tubes 940. The tubes 940 include a first tube 940a, a second tube 940b, a third tube 940c, and a fourth tube 940d. Each tube 940 defines a tube outer surface 942. For example, the first tube 940a includes a first tube outer surface 942a, the second tube 940b includes a second tube outer surface 942b, the third tube includes a third tube outer surface 942c, and the fourth tube 940d includes a fourth tube outer surface 942d. The positioning fitting members 502 include a first positioning fitting member 502a that is coupled to the first tube 940a such that the first positioning fitting member 502a forms a part of the first tube outer surface 942a of the first tube 940a. The positioning fitting members 502 include a second positioning fitting member 502b that is coupled to the fourth tube 940d such that the second positioning fitting member 502b forms a part of the fourth tube outer surface 942d of the fourth tube 940d. While the fastening assembly 950 includes two positioning fitting members 502, any tube 940 may include a respective positioning fitting member 502. The removable fastening mechanisms 954 include a first removable fastening mechanism 954a and a second removable fastening mechanism 954b.

The clamping element 952 is substantially similar to the clamping element 852 (FIG. 8B). For example, the clamping element 952 includes a first clamping element 952a and a second clamping element 952b. The clamping element 952, however, does not include a cushion. In this way, the clamping element 952 is entirely metallic. Thus, the fastening assembly 950 includes the positioning fitting member 502 including a clamping surface with a greater thickness. The fastening assembly 950 also includes wear sleeves 920 on one or more tubes 940. For example, the wear sleeves 920 include a first wear sleeve 920a coupled to the second tube 940b and a second wear sleeve 920b coupled to the third tube 940c. Thus, the wear sleeves 920 may protect the second tube 940b and the third tube 940c from wear during operation due to the metal-to-metal contact between the clamping element 952 and the tubes 940, as detailed above. The clamping element 952 may provide improved stiffness and temperature resistance but less friction damping as compared to the clamping element 852 that includes a cushion 870 (FIG. 8A).

Figure 10A:
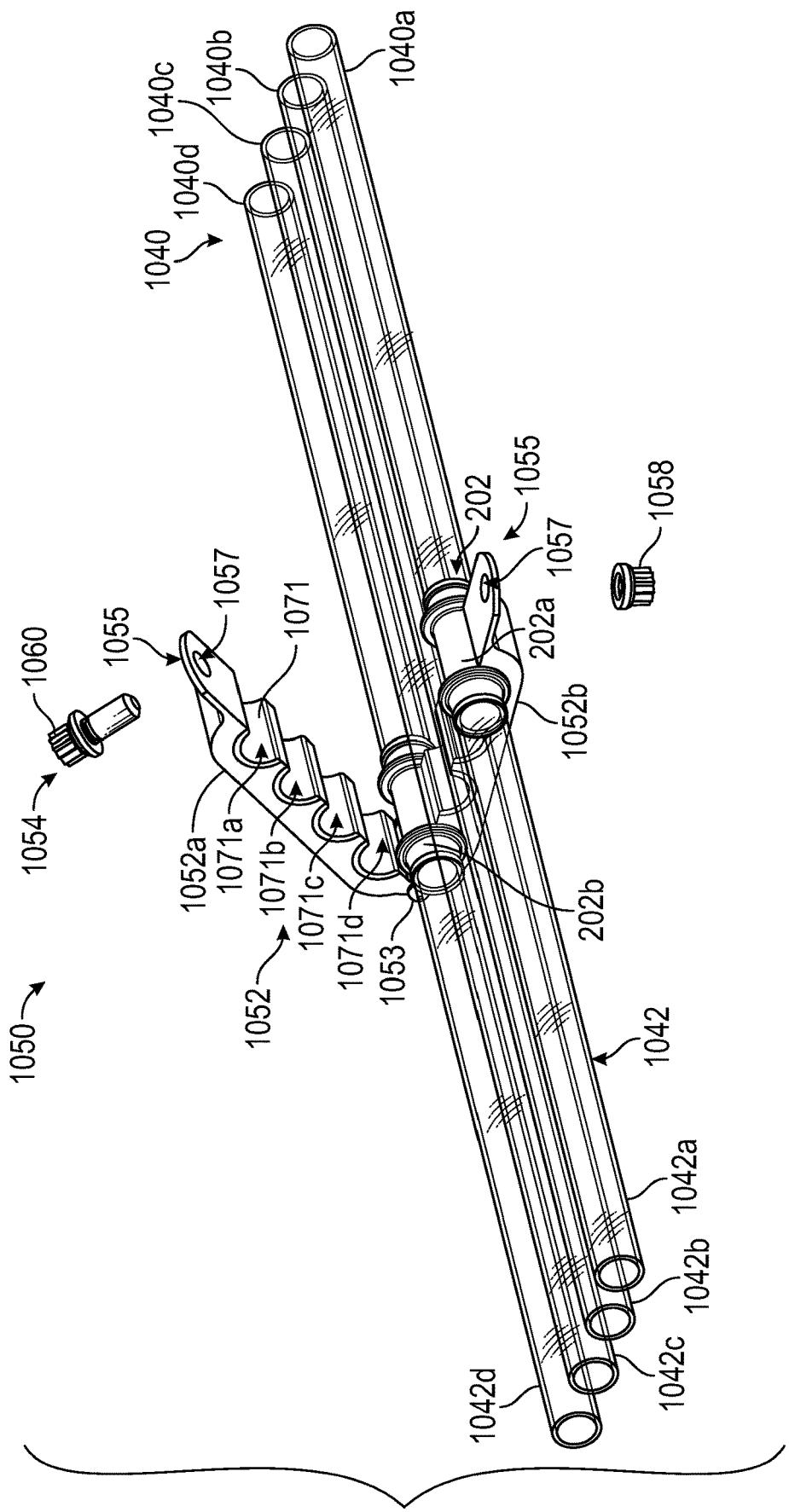
FIG. 10A is an exploded view of another fastening assembly for tubular structures, according to another embodiment of the present disclosure.

FIG. 10A is an exploded view of another fastening assembly 1050 for tubular structures, according to another embodiment of the present disclosure. FIG. 10A shows a plurality of tubes 1040 and the fastening assembly 1050. The fastening assembly 1050 is substantially similar to the fastening assembly 850 (FIG. 8A). The fastening assembly 1050 includes one or more positioning fitting members 202, one or more clamping elements 1052, and one or more removable fastening mechanisms 1054. The plurality of tubes 1040 is a bank of tubes and includes four tubes 1040. The tubes 1040 include a first tube 1040a, a second tube 1040b, a third tube 1040c, and a fourth tube 1040d. Each tube 1040 defines a tube outer surface 1042. For example, the first tube 1040a includes a first tube outer surface 1042a, the second tube 1040b includes a second tube outer surface 1042b, the third tube includes a third tube outer surface 1042c, and the fourth tube 1040d includes a fourth tube outer surface 1042d. The positioning fitting members 202 include a first positioning fitting member 202a that is coupled to the first tube 1040a such that the first positioning fitting member 202a forms a part of the first tube outer surface 1042a of the first tube 1040a. The positioning fitting members 202 include a second positioning fitting member 202b that is coupled to the fourth tube 1040d such that the second positioning fitting member 202b forms a part of the fourth tube outer surface 1042d of the fourth tube 1040d. While the fastening assembly 1050 includes two positioning fitting members 202, any tube 1040 may include a respective positioning fitting member 202.

Figure 10B:
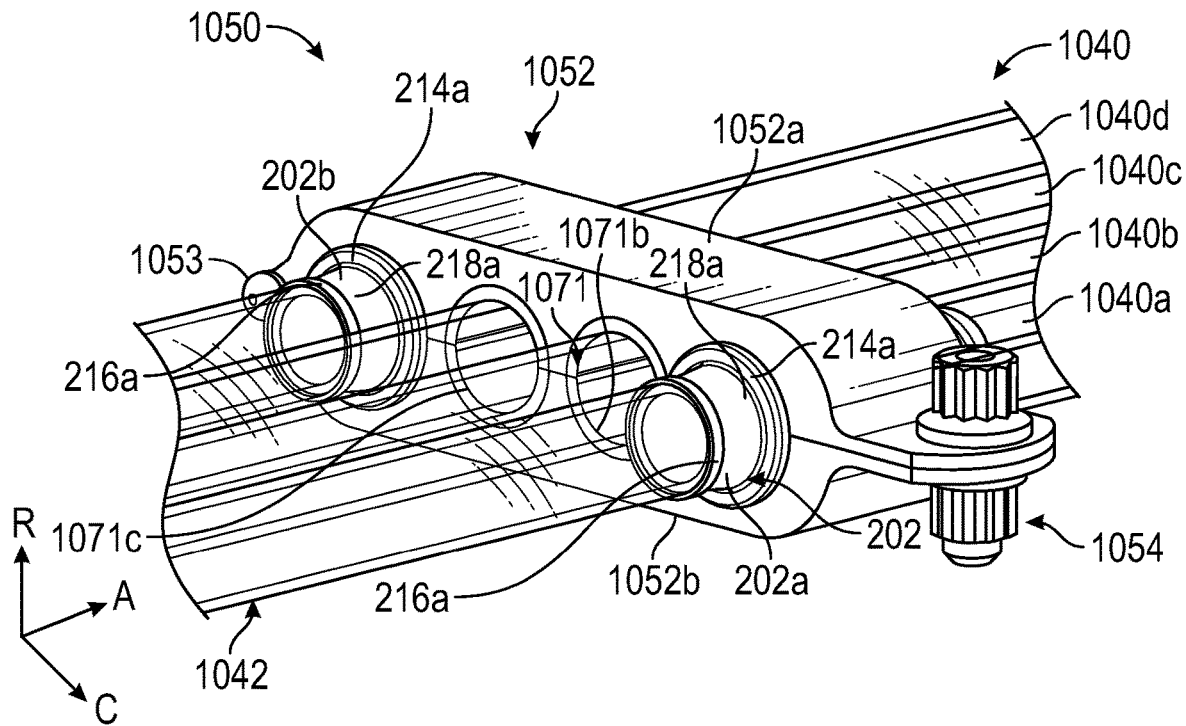
FIG. 10B is an enlarged schematic view of the fastening assembly of FIG. 10A in an assembled state, according to an embodiment of the present disclosure.

The one or more clamping elements 1052 includes a first clamping element 1052a and a second clamping element 1052b. The first clamping element 1052a and the second clamping element 1052b are coupled together at a hinge 1053 and form a single clamping element 1052. In this way, the clamping element 1052 can be opened (FIG. 10A) and closed (FIG. 10B). Each clamping element 1052a, 1052b includes a metallic band, as detailed above, and includes the same or similar components as the clamping elements 852a, 852b (FIG. 8A). The clamping element 1052 includes one or more cradle surfaces 1071 including a shape that generally corresponds to the shape of the tubes 1040. For example, the clamping element 1052 includes a first cradle surface 1071a, a second cradle surface 1071b, a third cradle surface 1071c, and a fourth cradle surface 1071d. In this way, the tubes 1040 engage with the cradle surfaces 1071 when the fastening assembly 1050 is assembled.

Each clamping element 1052a, 1052b forms a half of the clamping element 1052 and forms a half of the respective cradle surfaces 1071. The clamping element 1052 can be closed to clamp around the tubes 1040 such that the clamping elements 1052a, 1052b together form the clamping element 1052, as detailed further below. Each clamping element 1052a, 1052b includes a plurality of clamp arms 1055, as detailed above. Each of the plurality of clamp arms 1055 includes an aperture 1057 disposed therein for receiving the removable fastening mechanism 1054. When the clamping element 1052 is closed, the clamp arms 1055 contact each other and the respective apertures 1057 align with each other such that the removable fastening mechanisms 1054 can be inserted therethrough. The removable fastening mechanisms 1054 includes a nut 1058 and a bolt 1060, as detailed above.

FIG. 10B shows an enlarged schematic view of the fastening assembly 1050 of FIG. 10A in an assembled state, according to an embodiment of the present disclosure. In FIG. the cradle surfaces 1071 spatially separate the tubes 1040 and distribute stress in the fastening assembly 1050. For example, the tubes 1040 are inserted into and contact the respective cradle surfaces 1071 (FIG. 10A). Thus, the clamping element 1052 extends around at least a portion of the tube outer surfaces 1042 of the tubes 1040.

The first cradle surface 1071a (FIG. 10A) of the clamping element 1052 is clamped to the first positioning fitting member 202a of the first tube 1040a such that the clamping element 1052 extends around at least a portion of the first positioning fitting member 202a. In this way, the clamping element 1052 is positioned between the first rib 214a and the second rib 214b (FIG. 10C) of the first positioning fitting member 202a when the fastening assembly 1050 is assembled. The second cradle surface 1071b of the clamping element 1052 is clamped to the second tube 1040b such that the clamping element 1052 extends around at least a portion of the second tube outer surface 1042b of the second tube 1040b. The third cradle surface 1071c of the clamping element 1052 is clamped to the third tube 1040c such that the clamping element 1052 extends around at least a portion of the third tube outer surface 1042c of the third tube 1040c. The fourth cradle surface 1071d (FIG. 10A) of the clamping element 1052 is clamped to the second positioning fitting member 202b of the fourth tube 1040d such that the clamping element 1052 extends around at least a portion of the second positioning fitting member 202b. In this way, the clamping element 1052 is positioned between the first rib 214a and the second rib 214b (FIG. 10C) of the second positioning fitting member 202b when the fastening assembly 1050 is assembled.

When the fastening assembly 1050 is assembled, the clamp arms 1055 of the respective clamping elements 1052a, 1052b contact each other and the removable fastening mechanism 1054 is inserted into the respective apertures 1057 (FIG. 10A) to fasten and to secure the clamping element 1052 about the tubes 1040. Thus, the clamping element 1052 extends around at least a portion of the positioning fitting members 202 and around at least a portion of the tube outer surfaces 1042 of the tubes 1040 to bundle and to fasten the tubes 1040 together. The positioning fitting members 202 prevent the first tube 1040a and the fourth tube 1040d from sliding or from moving axially beyond the ribs 214 of the positioning fitting members 202, as detailed above. The second tube 1040b and the third tube 1040c may slide or move axially with respect to the clamping element 1052.

Figure 10C:
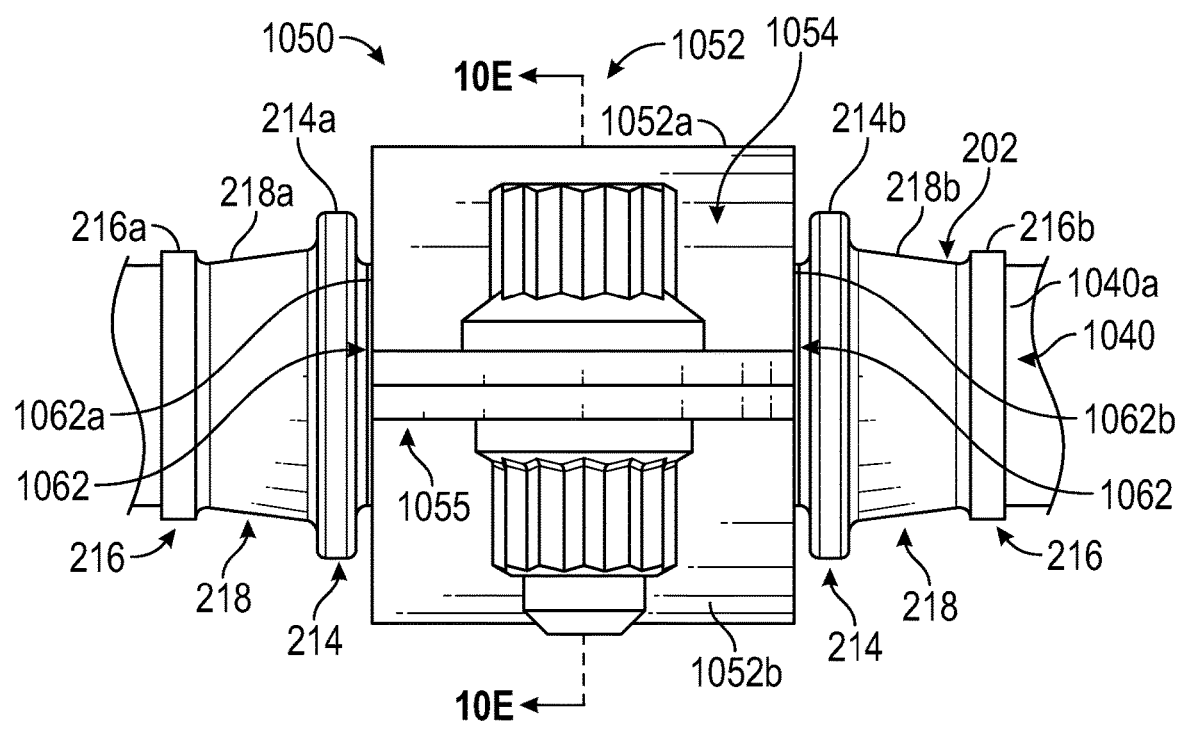
FIG. 10C is a schematic side view of the fastening assembly of FIG. 10B, according to an embodiment of the present disclosure.

FIG. 10C shows a schematic side view of the fastening assembly 1050, according to an embodiment of the present disclosure. FIG. 10C shows that the clamping element 1052 includes a plurality of radial faces 1062 including a first radial face 1062a and a second radial face 1062b. The radial faces 1062 extend radially and define a portion of an outer surface of the clamping element 1052. When the clamping element 1052 is clamped to the positioning fitting members 202 of the first tube 1040a and the fourth tube 1040d (FIG. 10B), the radial faces 1062 are spaced from the ribs 214 of the positioning fitting members 202. During operation of the turbine engine or of the engineering assembly, the tubes 1040 may move axially, circumferentially, or radially due to vibrations and relative motion of the various tubes and other assemblies. The positioning fitting members 202 prevent the clamping element 1052 from sliding or moving axially with respect to the tubes 1040. When the clamping element 1052 begins to slide or to move axially, the radial faces 1062 contact the ribs 214 of the positioning fitting members 202 such that the clamping element 1052 is prevented from sliding or moving axially beyond the ribs 214. For example, the first radial face 1062a may contact the first rib 214a of the first positioning fitting member 202a if the clamping elements 1052 or the first tube 1040a slide or move in a first axial direction, and the second radial face 1062b may contact the second rib 214b of the first positioning fitting member 202a if the clamping element 1052 or the first tube 1040a slide or move in a second axial direction opposite the first axial direction. Likewise, the first radial face 1062a may contact the first rib 214a of the second positioning fitting member 202b (FIG. 10B) if the clamping elements 1052 or the fourth tube 1040d (FIG. slide or move in the first axial direction, and the second radial face 1062b may contact the second rib 214b of the second positioning fitting member 202b (FIG. 10B) if the clamping element 1052 or the fourth tube 1040d (FIG. 10B) slide or move in the second axial direction.

Figure 10D:
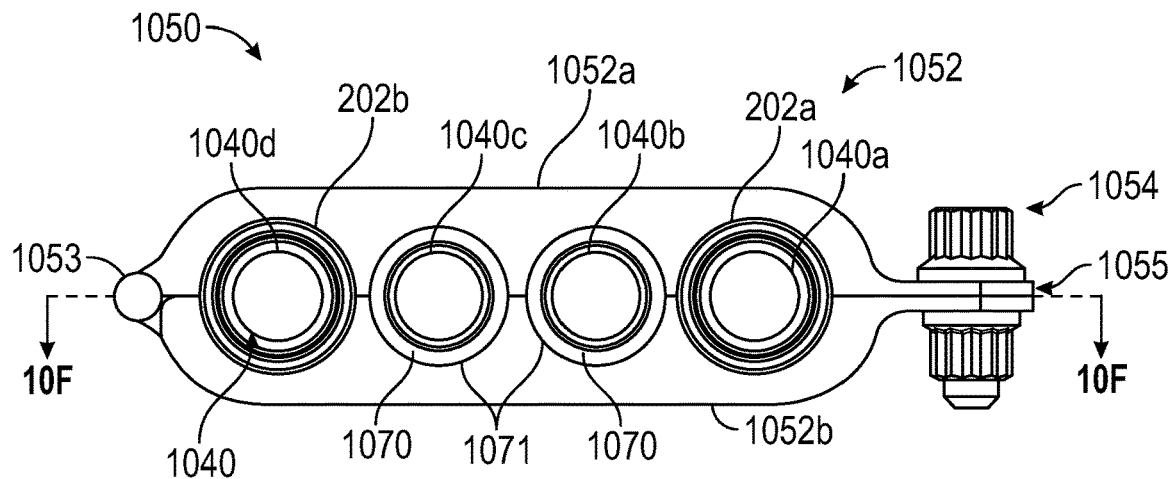
FIG. 10D is a schematic front view of the fastening assembly of FIG. 10B, according to an embodiment of the present disclosure.

FIG. 10D shows a schematic front view of the fastening assembly 1050, according to an embodiment of the present disclosure. FIG. 10D shows the cradle surfaces 1071 spatially separate the tubes 1040 and the tubes 1040 engage with the cradle surfaces 1071. The clamping element 1052 includes one or more cushions 1070 that provide friction damping between the clamping element 1052 and a respective tube 1040. The cushions 1070 are made from a polymer composite material or similar material, as detailed above, for providing friction damping. Each cradle surface 1071 includes a cushion 1070 disposed therein. Each cushion 1070 includes a shape that generally corresponds to a shape of the cradle surfaces 1071 and may be coupled to the cradle surfaces 1071 by adhesive, mechanical bonding, chemical bonding, or the like.

Figure 10E:
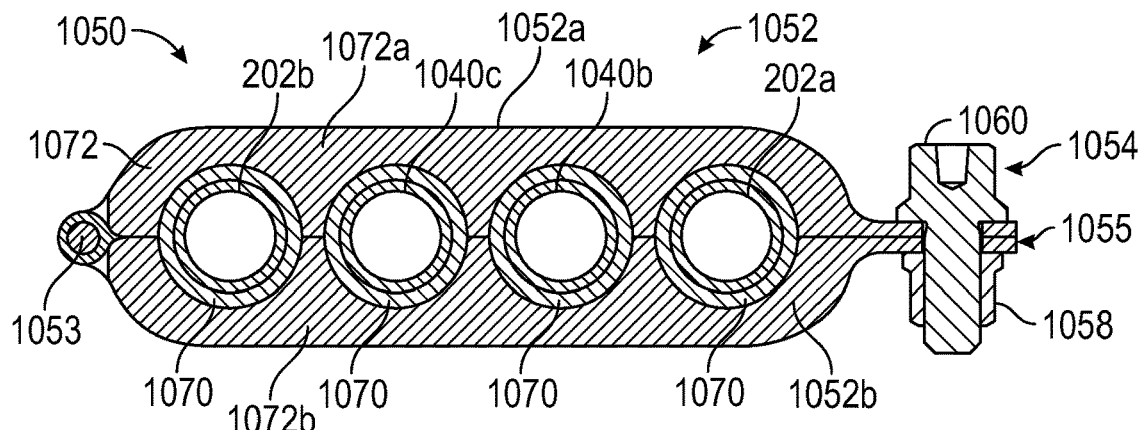
FIG. 10E is a cross-sectional view of the fastening assembly, taken at detail 10E-10E in FIG. 10C, according to an embodiment of the present disclosure.

FIG. 10E shows a cross-sectional view of the fastening assembly 1050, taken at detail 10E-10E in FIG. 10C, according to an embodiment of the present disclosure. FIG. 10C shows the clamping element 1052 includes a clamp body 1072. The clamp body 1072 defines a size and a shape of the clamping element 1052. For example, the clamp body 1072 includes a first clamp body 1072a that defines the first clamping element 1052a and a second clamp body 1072b that defines the second clamping element 1052b. The clamp body 1072 is made of any material such as, for example, metal, alloys, composites, or the like, as detailed above.

Figure 10F:
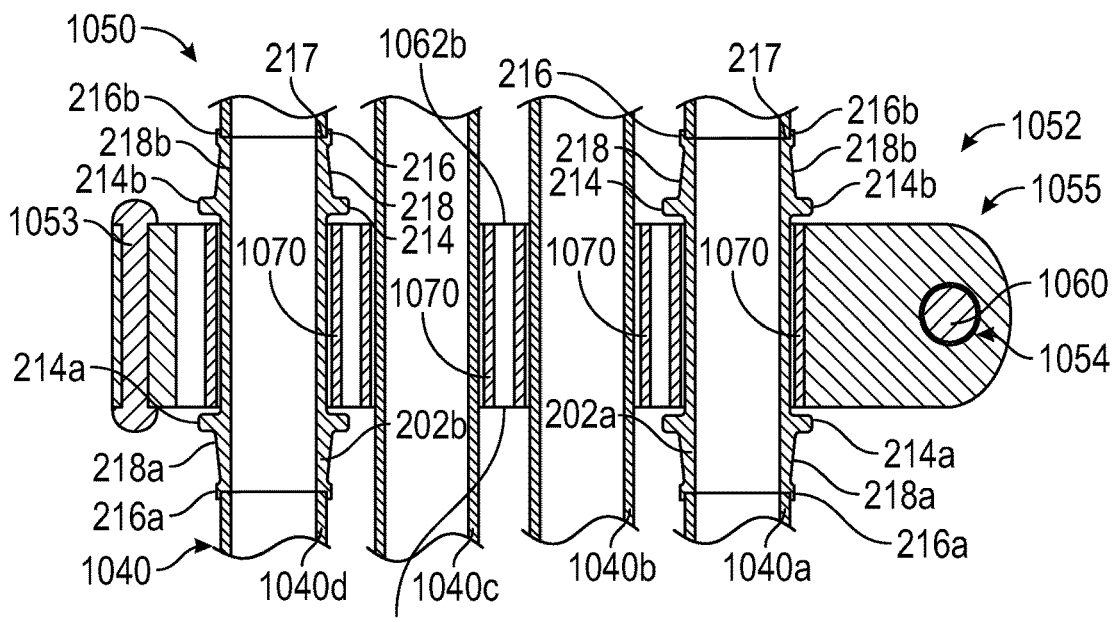
FIG. 10F is a cross-sectional view of the fastening assembly, taken at detail 10E-10F in FIG. 10D, according to an embodiment of the present disclosure.

FIG. 10F shows a cross-sectional view of the fastening assembly 1050, taken at detail 10F-10F in FIG. 10D, according to an embodiment of the present disclosure. FIG. 10F shows the cushions 1070 of the clamping element 1052 engage with the respective tubes 1040. When the clamping element 1052 is engaged with the tubes 1040, the clamping element 1052 generates high radial compressive force on the tubes 1040 to maintain the bundle of tubes 1040 under operational loads while the positioning fitting members 202 maintain the clamping element 1052 in the intended location and position on the tubes 1040. For example, the ribs 214 of the positioning fitting members 202 prevent the clamping element 1052 from sliding or moving axially about the tubes 1040, as detailed above.

FIG. 10F shows the weld notch 216 of the positioning fitting members 202a, 202b. The first tube 1040a and the fourth tube 1040d contact the inner radial surface 217 of the weld notches 216 and the positioning fitting members 202a, 202b are welded to the first tube 1040a and the fourth tube 1040d, respectively, as detailed above. When the positioning fitting members 202a, 202b are coupled to the first tube 1040a and the fourth tube 1040d, the tapered surfaces 218 provide a smooth transition between the positioning fitting members 202a, 202b and the tubes 1040a, 1040d to reduce the stress concentration on the coupling between the positioning fitting members 202a, 202b and the tubes 1040a, 1040d under operational loads on the tubes 1040 during operation of the turbine engine 10 or the engineering assembly. During operation, the radial faces 1062a, 1062b may contact the ribs 214 of the respective positioning fitting members 202a, 202b to prevent the clamping element 1052 from sliding or from moving axially about the tubes 1040.

Figure 11A:
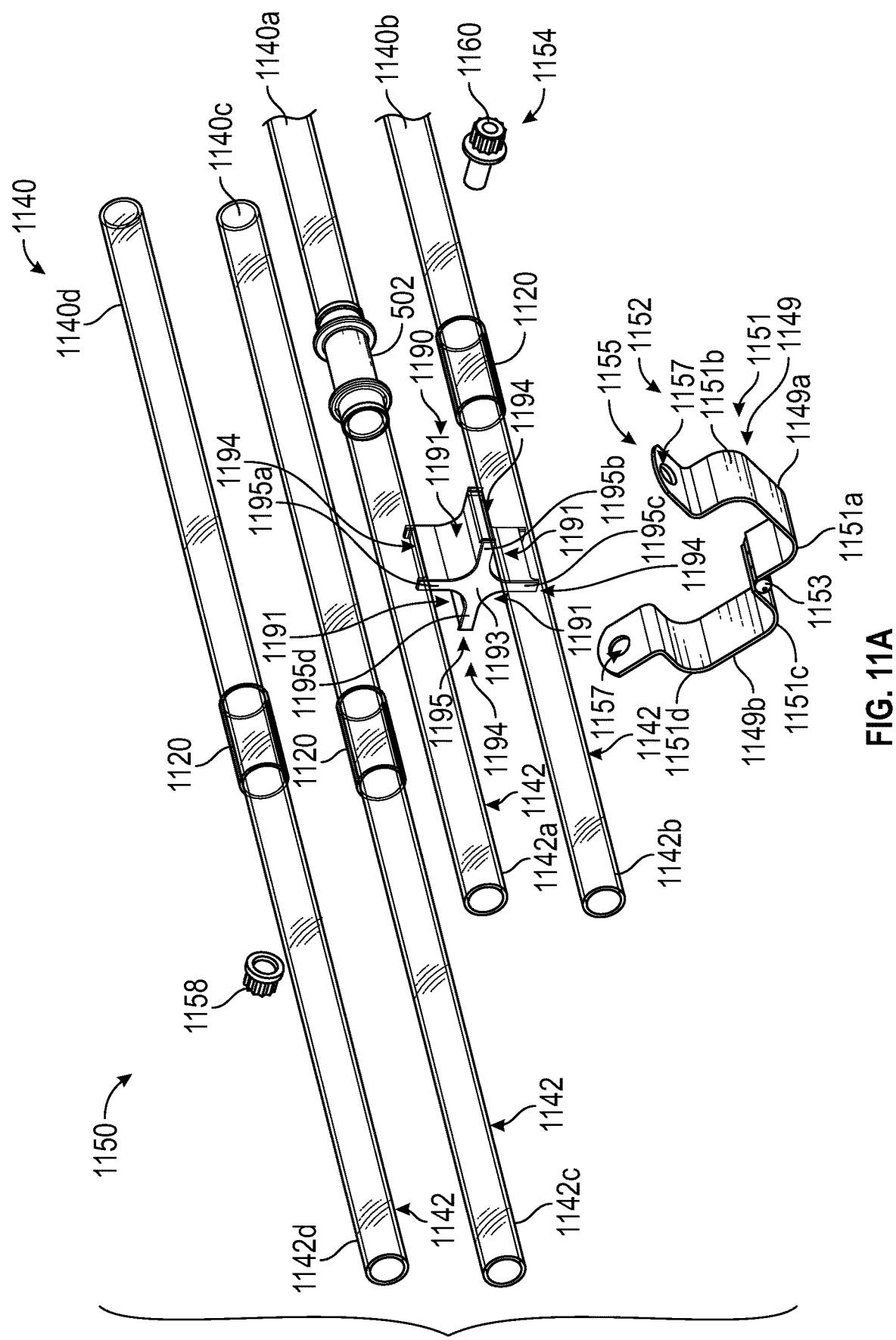
FIG. 11A is an exploded view of another fastening assembly for tubular structures, according to another embodiment of the present disclosure.

FIG. 11A is an exploded view of another fastening assembly for tubular structures, according to another embodiment of the present disclosure. FIG. 11A shows a plurality of tubes 1140 and a fastening assembly 1150. The fastening assembly 1150 includes a positioning fitting member 502, one or more clamping elements 1152, a spacer element 1190, and a removable fastening mechanism 1154. The plurality of tubes 1140 is a bank of tubes that includes four tubes 1140. The plurality of tubes 1140 includes a first tube 1140a, a second tube 1140b, a third tube 1140c, and a fourth tube 1140d. Each tube 1140 defines a tube outer surface 1142. For example, the first tube 1140a includes a first tube outer surface 1142a, the second tube 1140b includes a second tube outer surface 1142b, the third tube 1140c includes a third tube outer surface 1142c, and the fourth tube 1140d includes a fourth tube outer surface 1142d. The positioning fitting member 502 is coupled to the first tube 1140a such that the positioning fitting member 502 forms a part of the first tube outer surface 1142a of the first tube 1140a. The second tube 1140b, the third tube 1140c, and the fourth tube 1140d each includes a wear sleeve 1120 coupled thereto. The wear sleeves 1120 are metal sleeves that provide additional material for a metal-to-metal contact between the clamping element 1152 and the tubes 1140b, 1140c, 1140d. In this way, the wear sleeves 1120 may wear as the tubes 1140b, 1140c, 1140d slide or move axially within the clamping element 1152 such that the wear sleeves 1120 protect the tubes 1140b, 1140c, 1140d from wear.

Figure 11B:
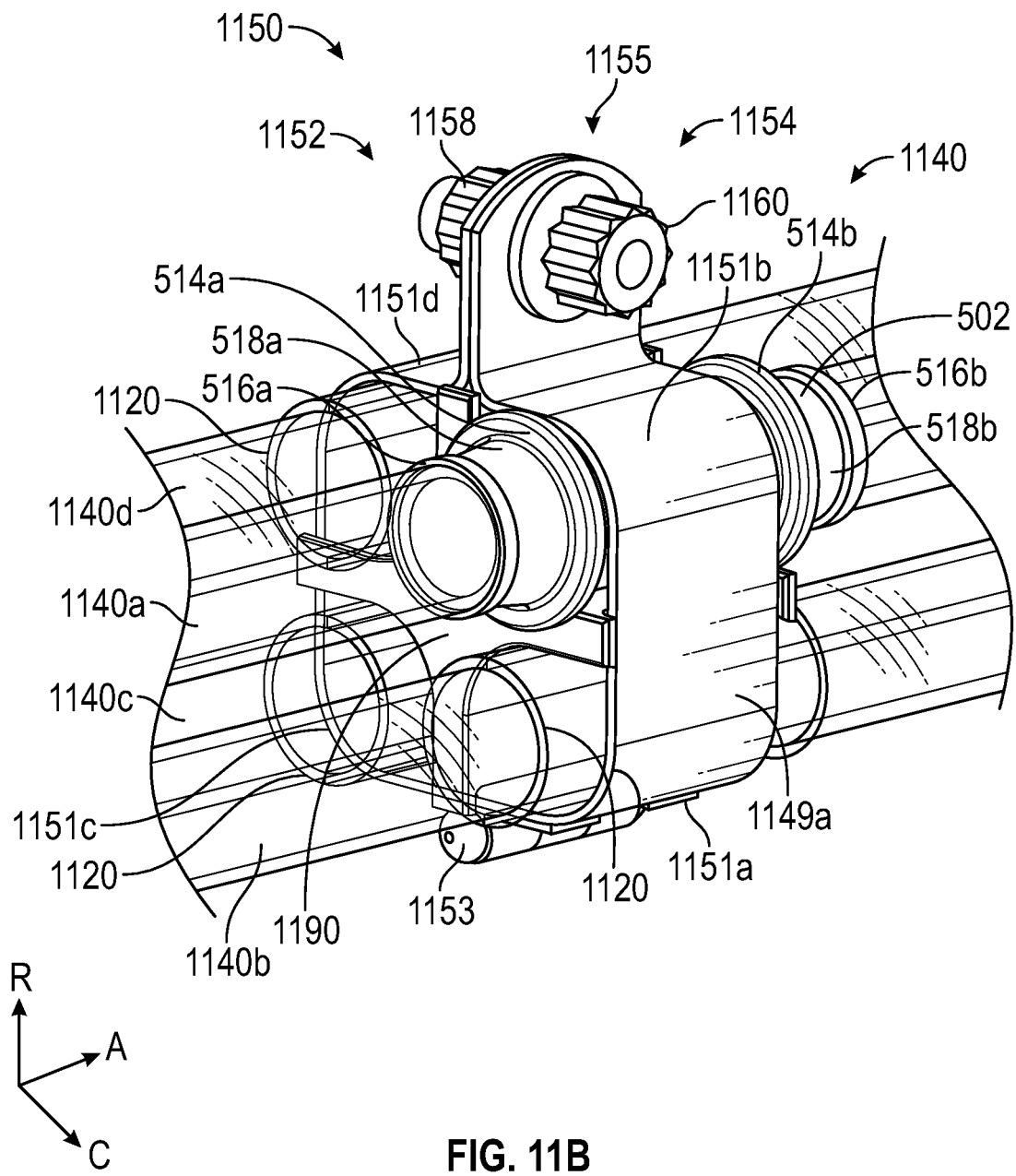
FIG. 11B is an enlarged schematic view of the fastening assembly of FIG. 11A in an assembled state, according to an embodiment of the present disclosure.

In FIG. 11A, the one or more clamping elements 1152 includes a single clamping element. The clamping element 1152 includes a metallic band that forms a plurality of straight sections 1149 and a plurality of looped sections 1151. Thus, the fastening assembly 1150 includes the positioning fitting member 502 including a clamping surface with a greater thickness, as detailed above. The clamping element 1152 includes a first looped section 1151a, a second looped section 1151b, a third looped section 1151c, and a fourth looped section 1151d. The first looped section 1151a and the second looped section 1151b are disposed at opposite ends of a first straight section 1149a. The third looped section 1151c and the fourth looped section 1151d are disposed at opposite ends of a second straight section 1149b. The first looped section 1151a and the third looped section 1151c are coupled together at a first end by a hinge 1153 such that clamping element 1152 can be opened (FIG. 11A) and closed (FIG. 11B). The looped sections 1151 include a size and a shape that generally corresponds to a size and a shape of the tubes 1140. In this way, the clamping element 1152 can be closed to clamp around, and engage with, the tubes 1140, as detailed further below. The clamping element 1152 includes a plurality of clamp arms 1155. Each clamp arm 1155 is disposed at, and extends from, a second end of the second looped section 1151b and a second end of the fourth looped section 1151d. FIG. 11A shows the clamping element 1152 includes two clamp arms 1155, but the clamping element 1152 may include any number of clamp arms 1155 as desired. Each of the plurality of clamp arms 1155 includes an aperture 1157 disposed therein for receiving the removable fastening mechanism 1154. When the clamping element 1152 is closed, the clamp arms 1155 contact each other and the respective apertures 1157 align with each other such that the removable fastening mechanism 1154 can be inserted therethrough. The removable fastening mechanism 1154 includes a nut 1158 and a bolt 1160, as detailed above.

The spacer element 1190 includes a body having one or more cradle brackets 1191 that define contact faces of the spacer element 1190. The cradle brackets 1191 are concave to correspond to a shape of the tubes 1140. The cradle brackets 1191 may include any shape that corresponds to respective tubes, conduits, pipes, etc. The spacer element 1190 includes four cradle brackets 1191. The spacer element 1190 may include any number of cradle brackets 1191 to hold a number of tubes 1140 as desired. The spacer element 1190 includes a core part 1193 and a plurality of radial arms 1195 extending radially outward from the core part 1193. The plurality of radial arms 1195 include a first radial arm 1195*a*, a second radial arm 1195*b*, a third radial arm 1195*c*, and a fourth radial arm 1195*d*. The radial arms 1195 define a portion of the cradle brackets 1191. The core part 1193 and the radial arms 1195 may be integral and unitary or may be separate components coupled together. The spacer element 1190 may include any number of radial arms 1195 and cradle brackets 1191 as desired. The spacer element 1190 includes raised edges 1194 extending radially outwardly from radial arms 1195 to provide a secure or a snug seating arrangement for the clamping element 1152. In this way, the raised edges 1194 prevent the clamping element 1152 from sliding axially beyond the raised edges 1194.

FIG. 11B shows an enlarged schematic side view of the fastening assembly 1150 of FIG. 11A in an assembled state, according to an embodiment of the present disclosure. In FIG. 11B, the spacer element 1190 spatially separates the tubes 1140 and distributes stress in the fastening assembly 1150. For example, the tubes 1140 are inserted into and contact the respective cradle brackets 1191 (FIG. 11A). The clamping element 1152 extends around at least a portion of the tube outer surfaces 1142 of the tubes 1140. The clamping element 1152 extends about and contacts an outer surface of each radial arm 1195 of the spacer element 1190 between the raised edges 1194.

The second looped section 1151*b* of the clamping element 1152 is clamped to the positioning fitting member 502 of the first tube 1140*a* such that the clamping element 1152 extends around at least a portion of the positioning fitting member 502. In this way, the clamping element 1152 is positioned between the first rib 514*a* and the second rib 514*b* of the positioning fitting member 502 when the fastening assembly 1150 is assembled. The first looped section 1151*a* is clamped to the wear sleeve 1120 of the second tube 1140*b* such that the clamping element 1152 extends around at least a portion of the wear sleeve 1120 of the second tube 1140*b*. The third looped section 1151*c* is clamped to the wear sleeve 1120 of the third tube 1140*c* such that the clamping element 1152 extends around at least a portion of the wear sleeve 1120 of the third tube 1140*c*. The fourth looped section 1151*d* is clamped to the wear sleeve 1120 of the fourth tube 1140*d* such that the clamping element 1152 extends around at least a portion of the wear sleeve 1120 of the fourth tube 1140*d*. Thus, each tube 1140 is disposed between the clamping element 1152 and the spacer element 1190. When the fastening assembly 1150 is assembled, the clamp arms 1155 contact each other and the removable fastening mechanism 1154 is inserted into the respective apertures 1157 (FIG. 11A) to fasten and to secure the clamping element 1152 about the tubes 1140. Thus, the clamping element 1152 extends around at least a portion of the positioning fitting member 502 and around at least a portion of the tube outer surfaces 1142 of the tubes 1140 to bundle and to fasten the tubes 1140 together. The positioning fitting member 502 prevents the first tube 1140*a* from sliding or from moving axially beyond the ribs 514 of the positioning fitting member 502, as detailed above.

Figure 11C:
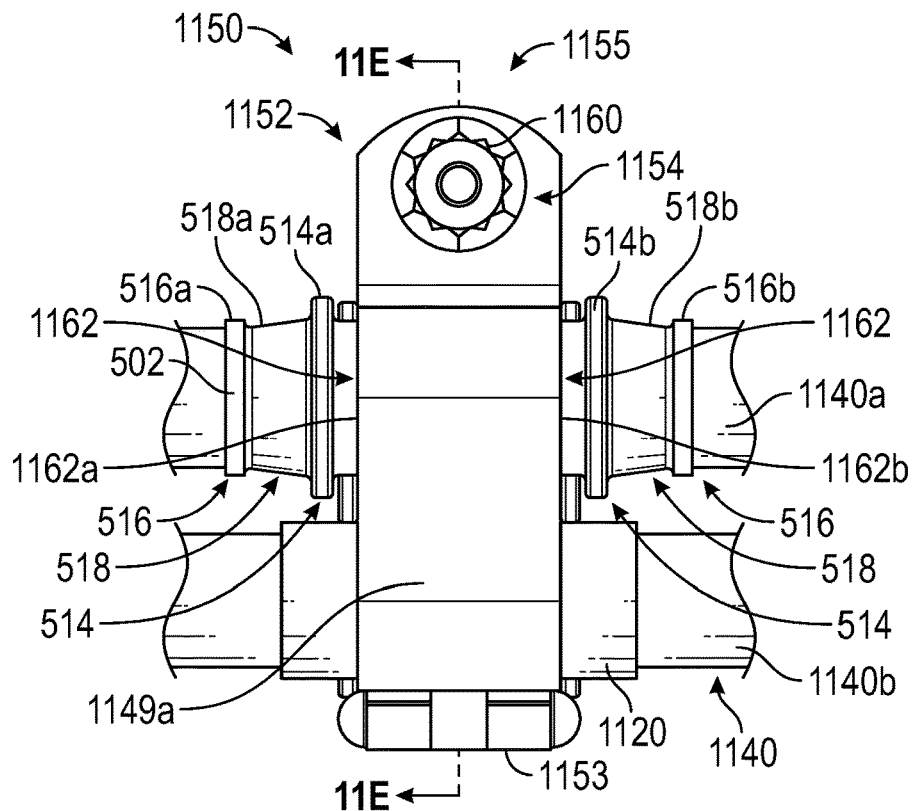
FIG. 11C is a schematic side view of the fastening assembly of FIG. 11B, according to an embodiment of the present disclosure.

FIG. 11C shows a schematic side view of the fastening assembly 1150, according to an embodiment of the present disclosure. FIG. 11C shows that the clamping element 1152 includes a plurality of radial faces 1162 including a first radial face 1162*a* and a second radial face 1162*b*. The radial faces 1162 extend radially and define a portion of an outer surface of the clamping element 1152. When the clamping element 1152 is clamped to the positioning fitting member 502 of the first tube 1140*a*, the radial faces 1162 are spaced from the ribs 514 of the positioning fitting member 502. During operation of the turbine engine or of the engineering assembly, the tubes 1140 may move axially, circumferentially, or radially due to vibrations and relative motion of the various tubes and other assemblies. The positioning fitting member 502 prevents the clamping element 1152 and the spacer element 1190 from sliding or moving axially with respect to the tubes 1140. When the clamping element 1152 begins to slide or to move axially, the radial faces 1162 contact the 514 of the positioning fitting member 502 such that the clamping element 1152 is prevented from sliding or moving axially beyond the ribs 514. For example, the first radial face 1162*a* may contact the first rib 514*a* if the clamping elements 1152 or the first tube 1140*a* slide or move in a first axial direction, and the second radial face 1162*b* may contact the second rib 514*b* if the clamping elements 1152 or the first tube 1140*a* slide or move in a second axial direction opposite the first axial direction.

Figure 11D:
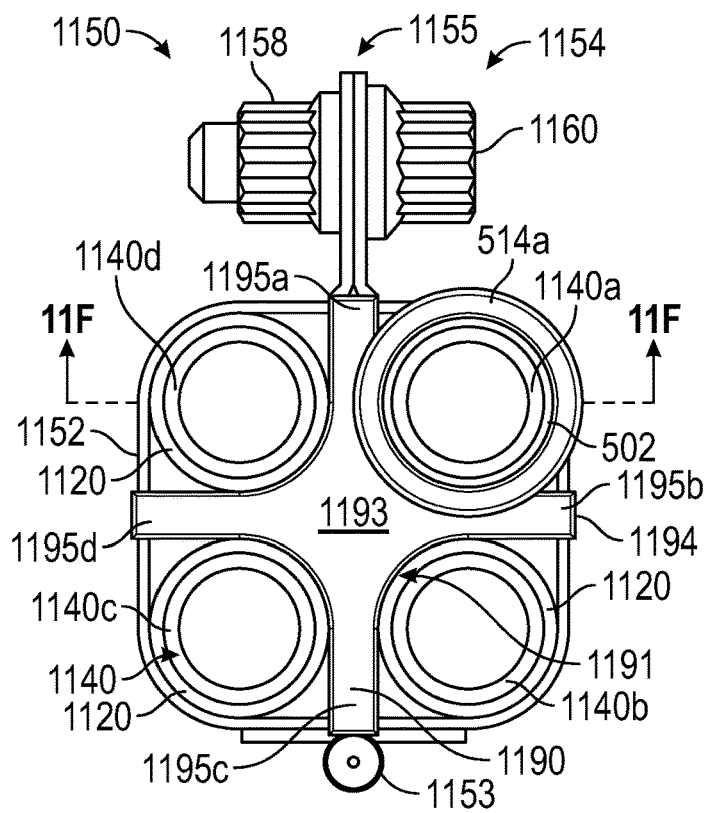
FIG. 11D is a schematic front view of the fastening assembly of FIG. 11B, according to an embodiment of the present disclosure.

FIG. 11D shows a schematic front view of the fastening assembly 1150, according to an embodiment of the present disclosure. FIG. 11D shows the spacer element 1190 spatially separates the tubes 1140 and the tubes 1140 engage with the cradle brackets 1191. The clamping element 1152 is disposed on the outer surfaces of the radial arms 1195*a*, 1195*b*, 1195*c*, 1195*d* of the spacer element 1190 such that the clamping element 1152 is disposed radially within the raised edges 1194.

Figure 11E:
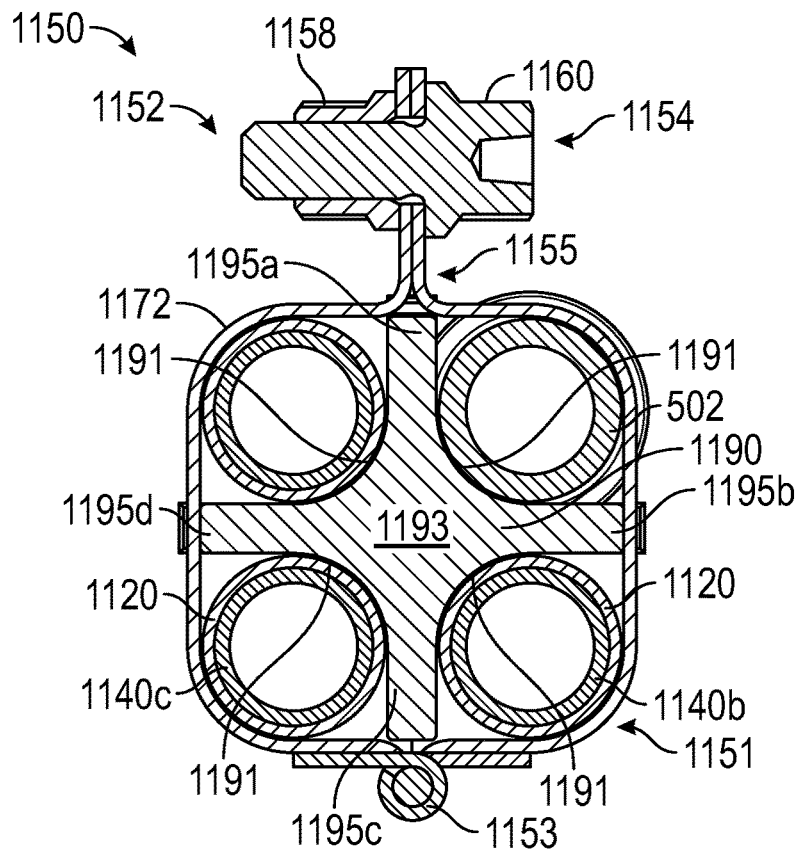
FIG. 11E is a cross-sectional view of the fastening assembly, taken at detail 11E-11E in FIG. 11C, according to an embodiment of the present disclosure.

FIG. 11E shows a cross-sectional view of the fastening assembly 1150, taken at detail 11E-11E in FIG. 11C, according to an embodiment of the present disclosure. FIG. 11C shows the clamping element 1152 includes a clamp body 1172. The clamp body 1172 defines a size and a shape of the clamping element 1152. For example, the clamp body 1172 defines the looped sections 1151 and the clamp arms 1155 of the clamping element 1152. Each clamp arm 1155 is integrally formed with a respective looped section 1151 such that the respective looped sections 1151 and the respective clamp arms 1155 together form a single unitary structure. The clamp body 1172 is made of any material such as, for example, metal, alloys, composites, or the like. The clamping element 1152 does not include a cushion. In this way, the clamping element 1152 can be used in high temperature environments and includes a greater stiffness as compared with the clamping elements that include cushions, as detailed above.

Figure 11F:
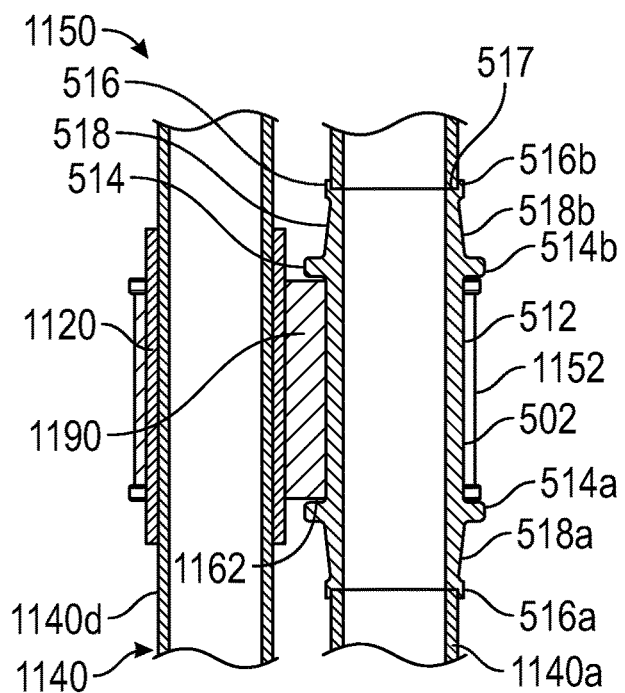
FIG. 11F is a cross-sectional view of the fastening assembly, taken at detail 11F-11F in FIG. 11D, according to an embodiment of the present disclosure.

FIG. 11F shows a cross-sectional view of the fastening assembly 1150, taken at detail 11F-11F in FIG. 11D, according to an embodiment of the present disclosure. FIG. 11F shows the clamping element 1152 engages with respective tubes 1140. When the clamping element 1152 is engaged with the tubes 1140, the clamping element 1152 generates high radial compressive force on the tubes 1140 to maintain the bundle of tubes 1140 under operational loads while the positioning fitting member 502 maintains the clamping element 1152 in the intended location and position on the tubes 1140. For example, the ribs 514 of the positioning fitting member 502 prevent the clamping element 1152 from sliding or moving axially about the tubes 1140, as detailed above.

FIG. 11F shows the weld notch 516 of the positioning fitting member 502. The first tube 1140a contacts the inner radial surface 517 of the weld notches 516 and the positioning fitting member 502 is welded to the first tube 1140a, as detailed above. When the positioning fitting member 502 is coupled to the first tube 1140a, the tapered surfaces 518 provide a smooth transition between the positioning fitting member 502 and the first tube 1140a to reduce the stress concentration on the coupling between the positioning fitting member 502 and the first tube 1140a under operational loads on the tubes 1140 during operation of the turbine engine 10 (FIG. 1) or the engineering assembly. During operation, the radial faces 1162 may contact the ribs 514 to prevent the clamping element 1152 from sliding or from moving axially about the tubes 1140.

Figure 12:
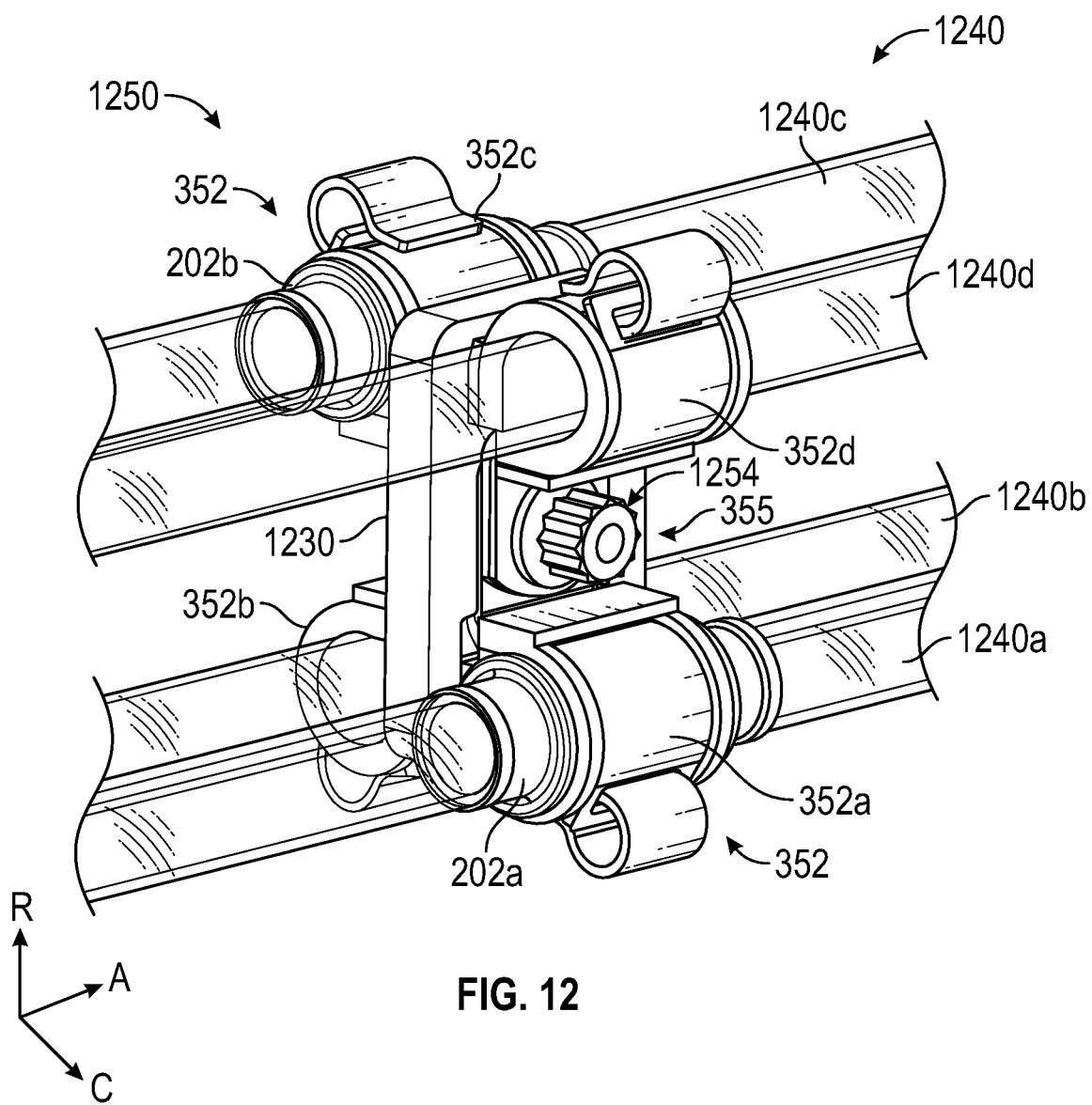
FIG. 12 is an enlarged schematic view of another fastening assembly in an assembled state, according to another embodiment of the present disclosure.

FIG. 12 shows an enlarged schematic side view of another fastening assembly 1250 in an assembled state, according to another embodiment of the present disclosure. The fastening assembly 1250 includes many of the same components as the fastening assembly 350 (FIG. 3B). The fastening assembly 1250, however, includes a first clamping element 352a, a second clamping element 352b, a third clamping element 352c, and a fourth clamping element 352d for bundling together a plurality of tubes 1240. The plurality of tubes 1240 includes four tubes including a first tube 1240a, a second tube 1240b, a third tube 1240c, and a fourth tube 1240d. The first tube 1240a includes a first positioning fitting member 202a and the third tube 1240c includes a second positioning fitting member 202b. The first clamping element 352a and the second clamping element 352b bundle together the first tube 1240a and the second tube 1240b in a similar orientation to that of FIG. 4B. The third clamping element 352c and the fourth clamping element 352d bundle together the third tube 1240c and the fourth tube 1240d in a mirrored orientation to that of FIG. 4B. The clamp arms 355 of each clamping element 352a, 352b, 352c, 352d are positioned together when the fastening assembly 1250 is assembled and a fastening mechanism 1254 is inserted therein to couple the clamping elements 352 together. A support bracket 1230 mounts and supports the first clamping element 352a and the second clamping element 352b with the third clamping element 352c and the fourth clamping element 352d. Thus, the clamping elements 352 bundle and secure the tubes 1240 together and the positioning fitting members 202a, 202b prevent the clamping elements 352 from sliding or moving axially, as detailed above.

Figure 13A:
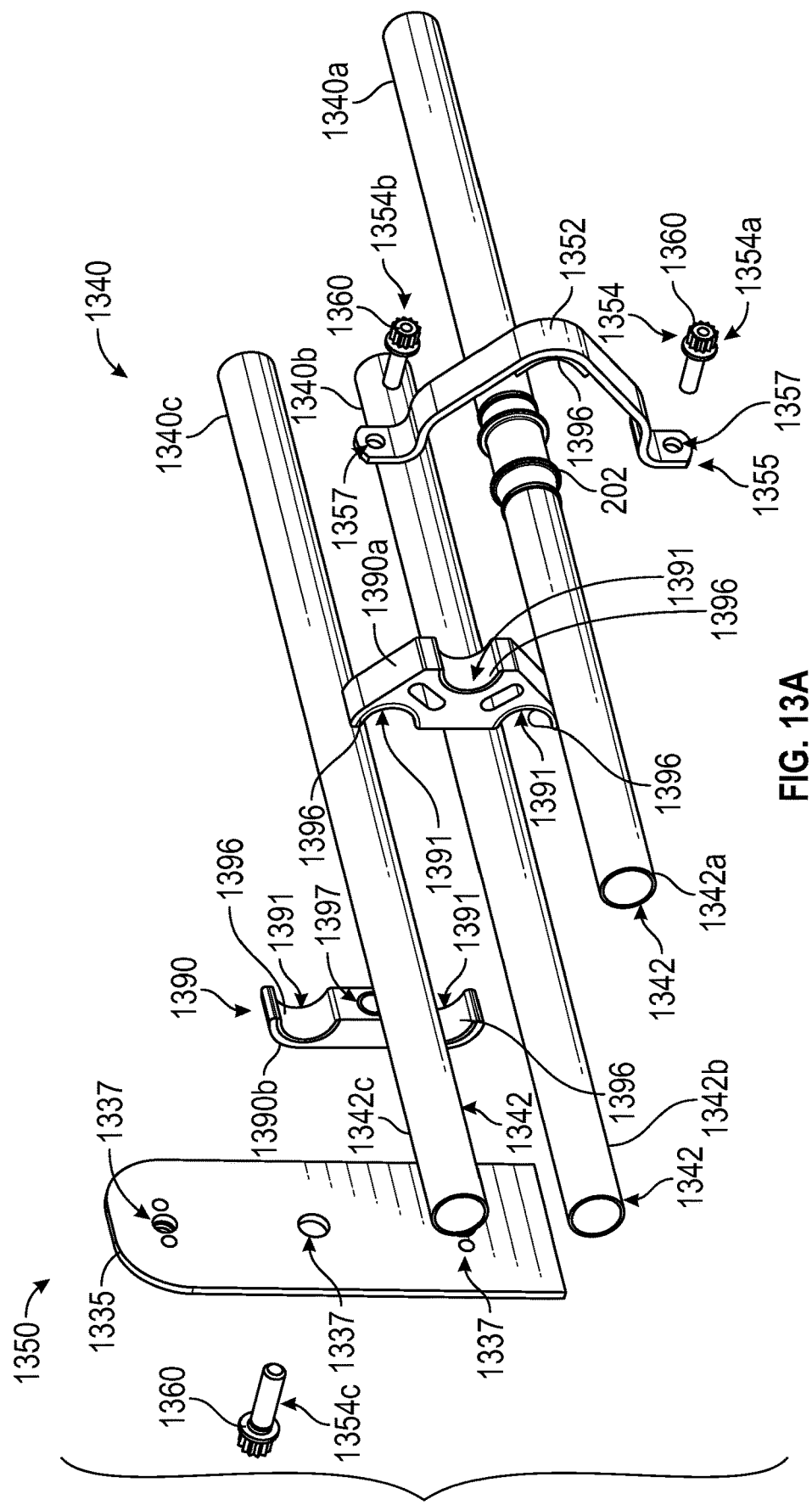
FIG. 13A is an exploded view of another fastening assembly for tubular structures, according to another embodiment of the present disclosure.

FIG. 13A is an exploded view of another fastening assembly 1350 for tubular structures, according to another embodiment of the present disclosure. FIG. 13A shows a plurality of tubes 1340 and the fastening assembly 1350. The fastening assembly 1350 includes a positioning fitting member 202, one or more clamping elements 1352, a spacer element 1390, a mounting bracket 1335, and one or more removable fastening mechanisms 1354. The plurality of tubes 1340 includes three tubes that includes a first tube 1340a, a second tube 1340b, and a third tube 1340c. Each tube 1340 defines a tube outer surface 1342. For example, the first tube 1340a includes a first tube outer surface 1342a, the second tube 1340b includes a second tube outer surface 1342b, and the third tube 1340c includes a third tube outer surface 1342c. The positioning fitting member 202 is coupled to the first tube 1340a such that the positioning fitting member 202 forms a part of the first tube outer surface 1342a of the first tube 1340a.

The one or more clamping elements 1352 includes a single clamping element. The clamping element 1352 includes a generally triangular shape. The clamping element 1352 includes a metallic band that is formed in the generally triangular shape. The clamping element 1352 includes a plurality of clamp arms 1355. Each clamp arm 1355 is disposed at respective ends of the band. FIG. 13A shows the clamping element 1352 includes two clamp arms 1355, but the clamping element 1352 may include any number of clamp arms 1355 as desired. Each of the plurality of clamp arms 1355 includes an aperture 1357 disposed therein for receiving the removable fastening mechanism 1354. When the clamping element 1352 is closed, the clamp arms 1355 contact the mounting bracket 1335 and the respective apertures 1357 align with respective apertures 1337 of the mounting bracket 1335. In this way, a first removable fastening mechanism 1354a and a second removable fastening mechanism 1354b can be inserted therethrough. The removable fastening mechanisms 1354 each includes the mounting bracket 1335 and a bolt 1360 (e.g., threaded into apertures 1337), as detailed above.

The spacer element 1390 includes a first spacer element 1390a and a second spacer element 1390b. Each spacer element 1390a, 1390b includes a body having one or more cradle brackets 1391 that define contact faces of the spacer element 1390. The cradle brackets 1391 are concave to correspond to a shape of the tubes 1340. The cradle brackets 1391 may include any shape that corresponds to respective tubes, conduits, pipes, etc. The first spacer element 1390a includes three cradle brackets 1391. For example, the first spacer element 1390a includes one cradle bracket 1391 on a first side of the first spacer element 1390a and two cradle brackets 1391 on a second side of the first spacer element 1390a. The second spacer element 1390b includes two cradle brackets 1391 that align with the two cradle brackets 1391 of the first spacer element 1390a when the fastening assembly 1350 is assembled. The cradle bracket 1391 on the first side of the first spacer element 1390a aligns with a corresponding portion of the clamping element 1352 when fastening assembly 1350 is assembled. Each cradle bracket 1391 includes a cushion 1396. The cushions 1396 include a shape that generally corresponds to a shape of the cradle brackets 1391. In this way, the tubes 1340 engage with the cushions 1396 and the cushions 1396 provide friction damping similar to the cushions detailed above. A third removable fastening element 1354c is inserted through a respective aperture 1337 of the mounting bracket 1335, a respective aperture 1397 of the second spacer element 1390b, and a respective aperture 1399 (FIG. 13E) to mount the spacer element 1390 to the mounting bracket 1335. The mounting bracket 1335 may be mounted to a static component of the turbine engine or of the engineering assembly.

Figure 13B:
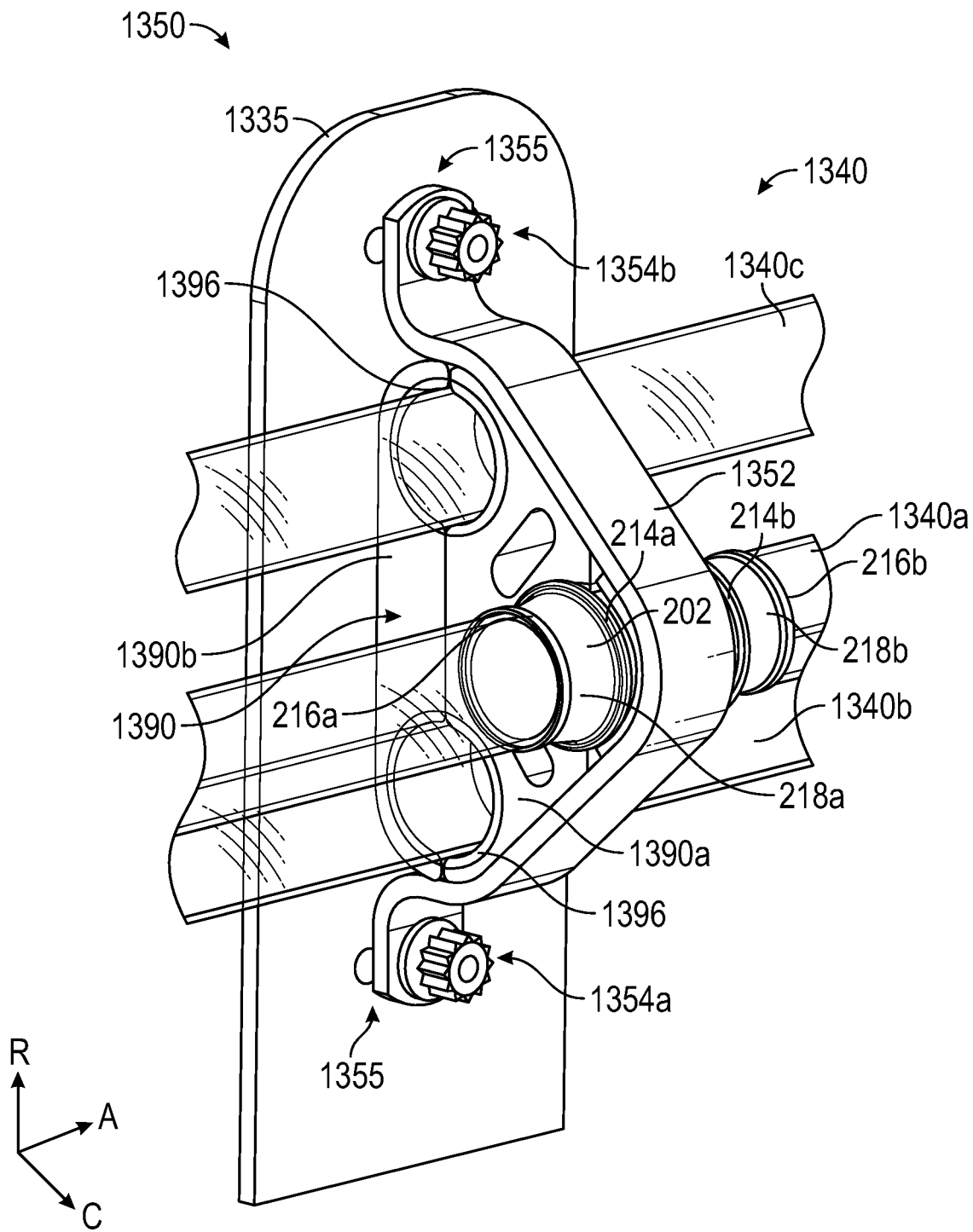
FIG. 13B is an enlarged schematic view of the fastening assembly of FIG. 13A in an assembled state, according to an embodiment of the present disclosure.

FIG. 13B shows an enlarged schematic side view of the fastening assembly 1350 of FIG. 13A in an assembled state, according to an embodiment of the present disclosure. In FIG. 13B, the spacer element 1390 spatially separates the tubes 1340 and distributes stress in the fastening assembly 1350. For example, the tubes 1340 are inserted into and contact the respective cradle brackets 1391 (FIG. 7A). The clamping element 1352 extends around at least a portion of the tube outer surfaces 1342 of the tubes 1340. The clamping element 1352 extends about and contacts outer surfaces of the spacer elements 1390a, 1390b. The clamping element 1352 is mounted and secured to the mounting bracket 1335 to mount and to secure the tubes 1340 to the mounting bracket 1335. In this way, the tubes 1340 are bundled and secured to a static component of the turbine engine 10 or of the engineering assembly.

When the clamping element 1352 is mounted to the mounting bracket 1335, the clamping element 1352 forms a shape at an apex thereof that generally corresponds to a shape of the first tube 1340a and thus clamps to the positioning fitting member 202 of the first tube 1340a. In this way, the clamping element 1352 is positioned between the first rib 214a and the second rib 214b of the positioning fitting member 202 when the fastening assembly 1350 is assembled. The first tube 1340a is engaged between the clamping element 1352 and the cradle bracket 1391 (FIG. 13A) on the first side of the first spacer element 1390a. The second tube 1340b and the third tube 1340c are each clamped and engaged between respective cradle brackets 1391 of the first spacer element 1390a and the second spacer element 1390b. When the fastening assembly 1350 is assembled, the clamp arms 1355 contact the mounting bracket 1335 and the removable fastening mechanisms 1354a, 1354b are inserted into the respective apertures 1357 (FIG. 13A) to fasten and to secure the clamping element 1352 about the tubes 1340 and to the mounting bracket 1335. Thus, the clamping element 1352 extends around at least a portion of the positioning fitting member 202 and around at least a portion of the tube outer surfaces 1342 of the tubes 1340 to bundle and to fasten the tubes 1340 together. The positioning fitting member 202 prevents the first tube 1340a from sliding or from moving axially beyond the ribs 214 of the positioning fitting member 202, as detailed above.

Figure 13C:
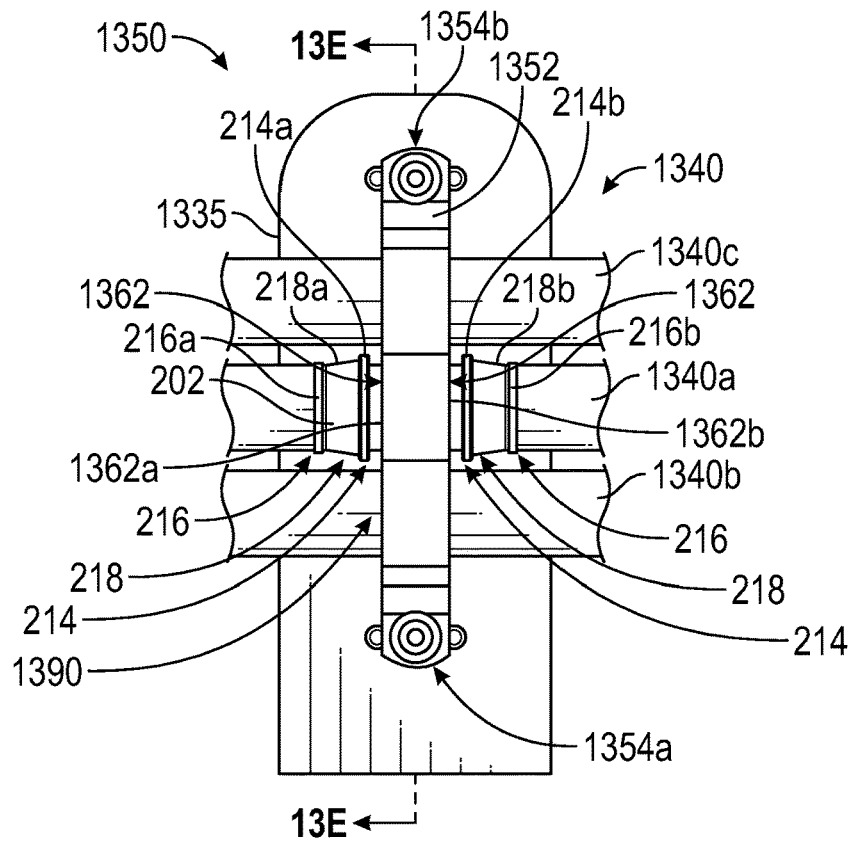
FIG. 13C is a schematic side view of the fastening assembly of FIG. 13B, according to an embodiment of the present disclosure.

FIG. 13C shows a schematic side view of the fastening assembly 1350, according to an embodiment of the present disclosure. FIG. 13C shows that the clamping element 1352 includes a plurality of radial faces 1362 including a first radial face 1362a and a second radial face 1362b. The radial faces 1362 extend radially and define a portion of an outer surface of the clamping element 1352. For example, the radial faces 1362 are faces of the spacer element 1390. When the clamping element 1352 is clamped to the positioning fitting member 202 of the first tube 1340a, the radial faces 1362 are spaced from the ribs 214 of the positioning fitting member 202. During operation of the turbine engine or of the engineering assembly, the tubes 1340 may move axially, circumferentially, or radially due to vibrations and relative motion of the various tubes and other assemblies. The positioning fitting member 202 prevents the first tube 1340a from sliding or moving axially with respect to clamping element 1352. When the first tube 1340a begins to slide or to move axially, the ribs 214 of the positioning fitting member 202 contact the radial faces 1362 such that the first tube 1340a is prevented from sliding or moving axially. For example, the first rib 214a may contact the first radial face 1362a if the first tube 1340a slides or moves in a first axial direction, and the second rib 214b may contact the second radial face 1362b if the first tube 1340a slides or moves in a second axial direction opposite the first axial direction.

Figure 13D:
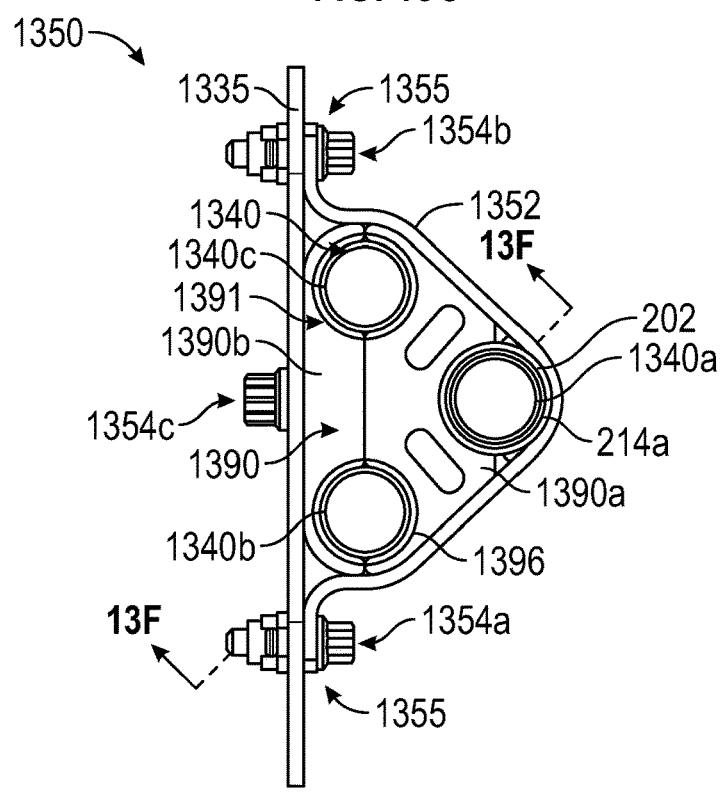
FIG. 13D is a schematic front view of the fastening assembly of FIG. 13B, according to an embodiment of the present disclosure.

FIG. 13D shows a schematic front view of the fastening assembly 1350, according to an embodiment of the present disclosure. FIG. 13D shows the spacer element 1390 spatially separates the tubes 1340 and the tubes 1340 engage with the cradle brackets 1391. The clamping element 1352 is disposed about the outer surfaces of the spacer elements 1390. FIG. 13D shows that the cushions 1396 engage the tubes 1340. The cushions 1396 provide friction damping between the clamping element 1352 and a respective tube 1340. The cushions 1396 are made from a polymer composite material or similar material, as detailed above, for providing friction damping.

Figure 13E:
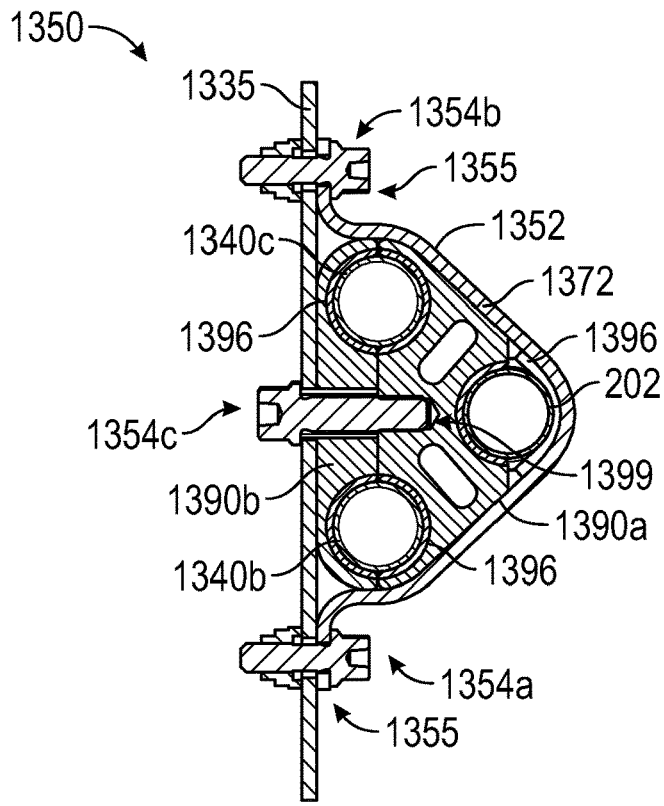
FIG. 13E is a cross-sectional view of the fastening assembly, taken at detail 13E-13E in FIG. 13C, according to an embodiment of the present disclosure.

FIG. 13E shows a cross-sectional view of the fastening assembly 1350, taken at detail 13E-13E in FIG. 13C, according to an embodiment of the present disclosure. FIG. 13C shows the clamping element 1352 includes a clamp body 1372. The clamp body 1372 defines a size and a shape of the clamping element 1352. For example, the clamp body 1372 defines the triangular shape of the clamping element 1352 and defines the clamp arms 1355. The clamp body 1372 is generally triangular but may include any shape as desired. The clamp body 1372 is made of any material such as, for example, metal, alloys, composites, or the like. The spacer elements 1390a, 1390b are disposed within the clamping element 1352 when the fastening assembly 1350 is assembled. The cushions 1396 of the spacer elements 1390a, 1390b define an interior surface of the clamping element 1352 and engage with a respective tube 1340 or with a positioning fitting member 202 to bundle and to secure the tubes 1340 together.

Figure 13F:
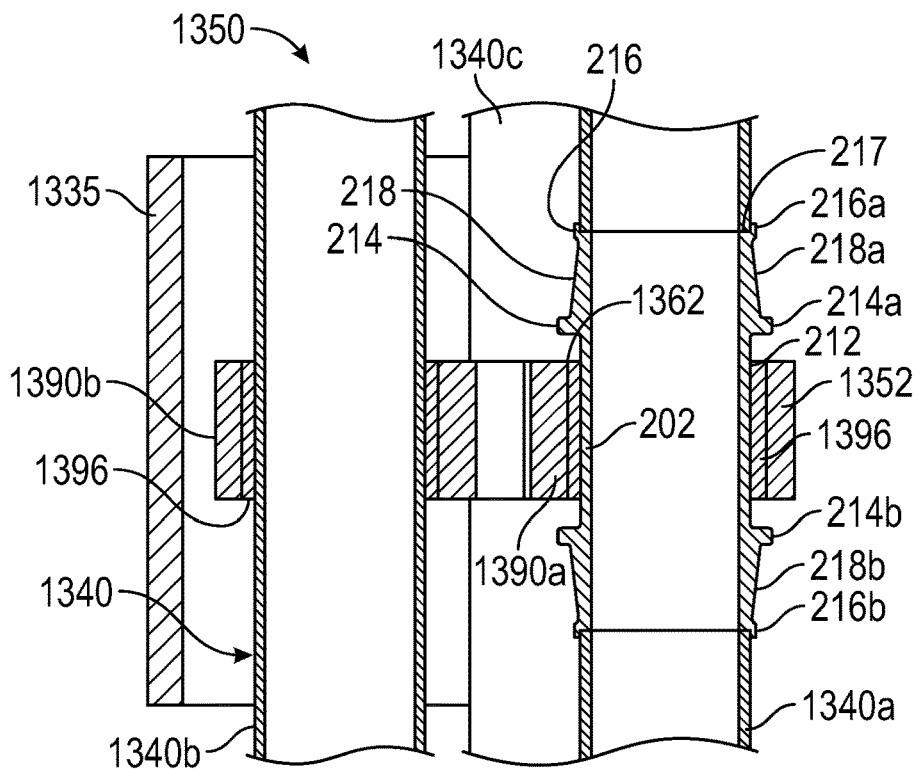
FIG. 13F is a cross-sectional view of the fastening assembly, taken at detail 13F-13F in FIG. 13D, according to an embodiment of the present disclosure.

FIG. 13F shows a cross-sectional view of the fastening assembly 1350, taken at detail 13F-13F in FIG. 13D, according to an embodiment of the present disclosure. FIG. 13F shows the clamping element 1352 engages with respective tubes 1340. For example, the cushions 1396 engage with the positioning fitting member 202 or with a respective tube 1340. When the clamping element 1352 is engaged with the tubes 1340, the clamping element 1352 generates a high radial compressive force on the tubes 1340 to maintain the bundle of tubes 1340 under operational loads while the positioning fitting member 202 maintains the clamping element 1352 in the intended location and position. For example, the ribs 214 of the positioning fitting member 202 prevent the first tube 1340a from sliding or moving axially, as detailed above. The second tube 1340b and the third tube 1340c may slide or move axially with respect to the clamping element 1352.

FIG. 13F shows the weld notches 216 of the positioning fitting member 202. The first tube 1340a contacts the inner radial surface 217 of the weld notches 216 and the positioning fitting member 202 is welded to the first tube 1340a, as detailed above. When the positioning fitting member 202 is coupled to the first tube 1340a, the tapered surfaces 218 provide a smooth transition between the positioning fitting member 202 and the first tube 1340a to reduce the stress concentration on the coupling between the positioning fitting member 202 and the first tube 1340a under operational loads on the tubes 1340 during operation of the turbine engine 10 or the engineering assembly. During operation, the ribs 214 may contact the radial faces 1362 to prevent the first tube 1340a from sliding or from moving axially with respect to the clamping element 1352.

Figure 14:
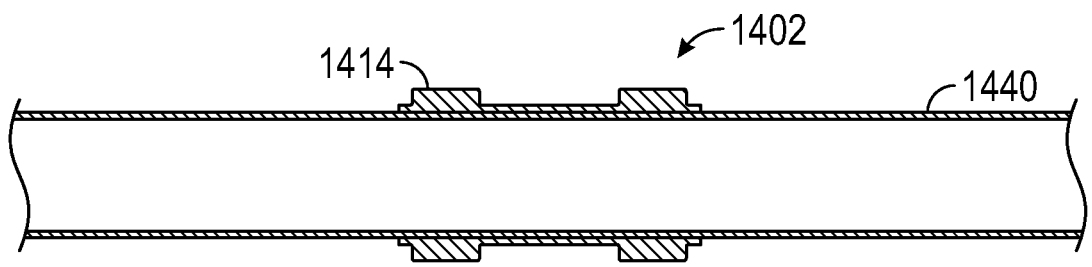
FIG. 14 is a cross-sectional view of another positioning fitting member coupled to a tubular structure, taken along a longitudinal centerline of the tubular structure, according to another embodiment of the present disclosure.

FIG. 14 is a cross-sectional view of a positioning fitting member 1402 coupled to a tube 1440, taken along a longitudinal centerline of the tube 1440, according to an embodiment of the present disclosure. The positioning fitting member 1402 may be used in any of the fastening assemblies detailed above. The positioning fitting member 1402 is substantially similar to the positioning fitting member 202 (FIGS. 2A-13F) described above and includes a plurality of ribs 1414. The positioning fitting member 1402, however, does not include weld notches and does not include tapered surfaces. In some examples, the positioning fitting member 1402 does include tapered surfaces. The positioning fitting member 1402 is non-metallic and includes a ceramic, a composite, or a similar material. The positioning fitting member 1402 is positioned over an outer surface of the tube 1440 and is chemically bonded to the tube 1440 using, for example, epoxy, composite, adhesive, or the like.

Figure 15:
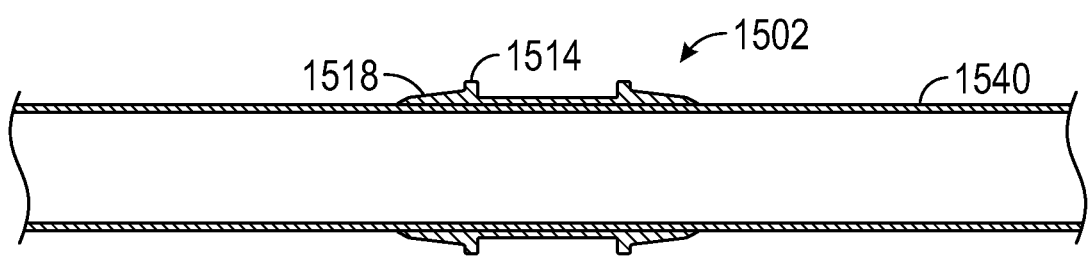
FIG. 15 is a cross-sectional view of another positioning fitting member coupled to a tubular structure, taken along a longitudinal centerline of the tubular structure, according to another embodiment of the present disclosure.

FIG. 15 is a cross-sectional view of another positioning fitting member 1502 coupled to a tube 1540, taken along a longitudinal centerline of the tube 1540, according to another embodiment of the present disclosure. The positioning fitting member 1502 may be used in any of the fastening assemblies detailed above. The positioning fitting member 1502 is substantially similar to the positioning fitting member 202 (FIGS. 2A-13F) described above and includes a plurality of ribs 1514 and a plurality of tapered surfaces 1518. The positioning fitting member 1502, however, does not include weld notches. The positioning fitting member 1502 is metallic. The positioning fitting member 1502 is positioned over an outer surface of the tube 1540 and is coupled to the tube 1540 by a thermal joint, such as by brazing.

Figure 16:
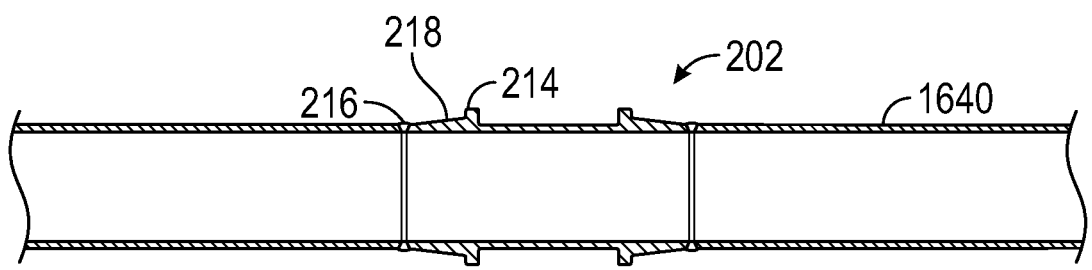
FIG. 16 is a cross-sectional view of the positioning fitting member of FIG. 2A coupled to a tubular structure, taken along a longitudinal centerline of the tubular structure, according to another embodiment of the present disclosure.

FIG. 16 is a cross-sectional view of the positioning fitting member 202 coupled to a tube 1640, taken along a longitudinal centerline of the tube 1640, according to an embodiment of the present disclosure. FIG. 16 shows the positioning fitting member 202 welded to the tube 1640 at the weld notches 216.

Figure 17:
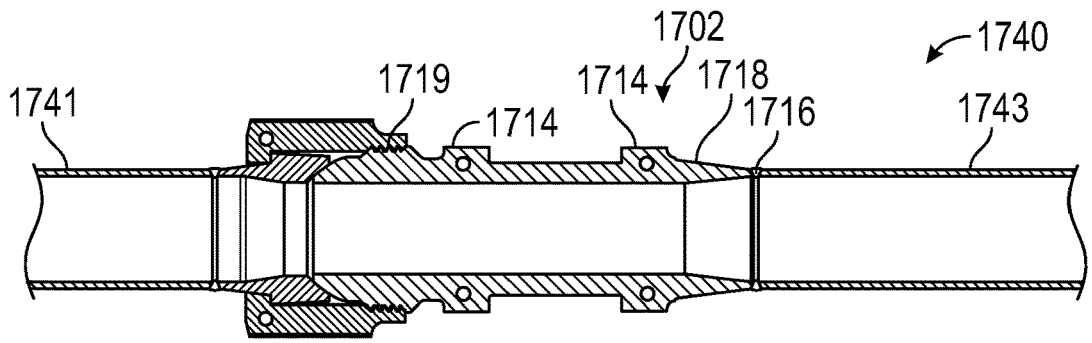
FIG. 17 is a cross-sectional view of another positioning fitting member coupled to a tubular structure, taken along a longitudinal centerline of the tubular structure, according to another embodiment of the present disclosure.

FIG. 17 is a cross-sectional view of another positioning fitting member 1702 coupled to a tube 1740, taken along a longitudinal centerline of the tube 1740, according to another embodiment of the present disclosure. The tube 1740 includes a first tube section 1741 and a second tube section 1743. The positioning fitting member 1702 may be used in any of the fastening assemblies detailed above. The positioning fitting member 1702 includes a plurality of ribs 1714 and a tapered surface 1718. The positioning fitting member 1702 also includes a threaded portion 1719. The positioning fitting member 1702 is welded at a weld notch 1716 to the second tube section 1743. The positioning fitting member 1702 is threaded by the threaded portion 1719 to a corresponding threaded portion of the first tube section 1741. In this way, the positioning fitting member 1702 functions as a coupling member to couple the first tube section 1741 and the second tube section 1743 and as a positioning fitting member as detailed above. Thus, the positioning fitting member 1702 is a one-piece machined fitting with one threaded end (e.g., the threaded portion 1719).

Figure 18:
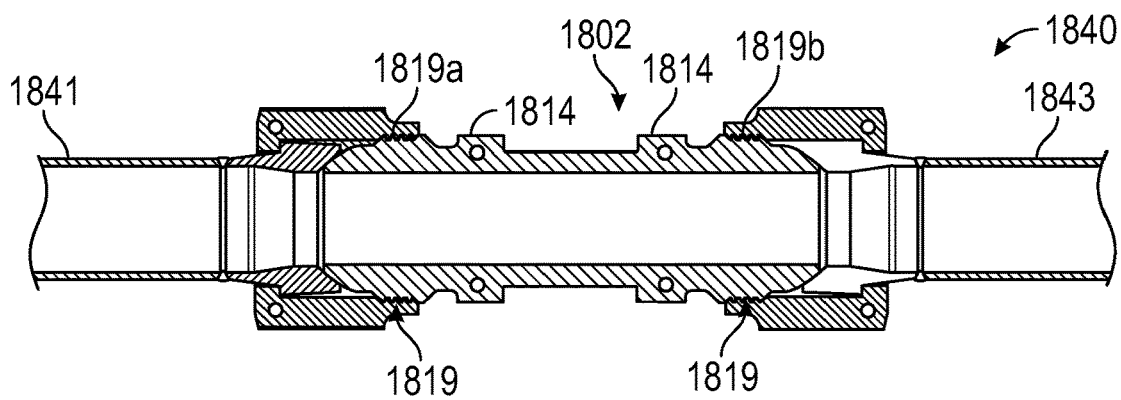
FIG. 18 is a cross-sectional view of another positioning fitting member coupled to a tubular structure, taken along a longitudinal centerline of the tubular structure, according to another embodiment of the present disclosure.

FIG. 18 is a cross-sectional view of another positioning fitting member 1802 coupled to a tube 1840, taken along a longitudinal centerline of the tube 1840, according to another embodiment of the present disclosure. The tube 1840 includes a first tube section 1841 and a second tube section 1843. The positioning fitting member 1802 may be used in any of the fastening assemblies detailed above. The positioning fitting member 1802 includes a plurality of ribs 1814 and a plurality of threaded portions 1819 disposed at opposing ends of the positioning fitting member 1802. The positioning fitting member 1802 does not include tapered surfaces of weld notches as the positioning fitting member 1802 is not welded or brazed to the tube 1840. The positioning fitting member 1802 is threaded by a first threaded portion 1819a to a corresponding threaded portion of the first tube section 1841. The positioning fitting member 1802 is threaded by a second threaded portion 1819b to a corresponding threaded portion of the second tube section 1843. In this way, the positioning fitting member 1802 functions as a coupling member to couple the first tube section 1841 and the second tube section 1843, and as a positioning fitting member as detailed above. Thus, the positioning fitting member 1802 is a one-piece machined fitting with two threaded ends (e.g., the first threaded portion 1819a and the second threaded portion 1819b).

Figure 19:
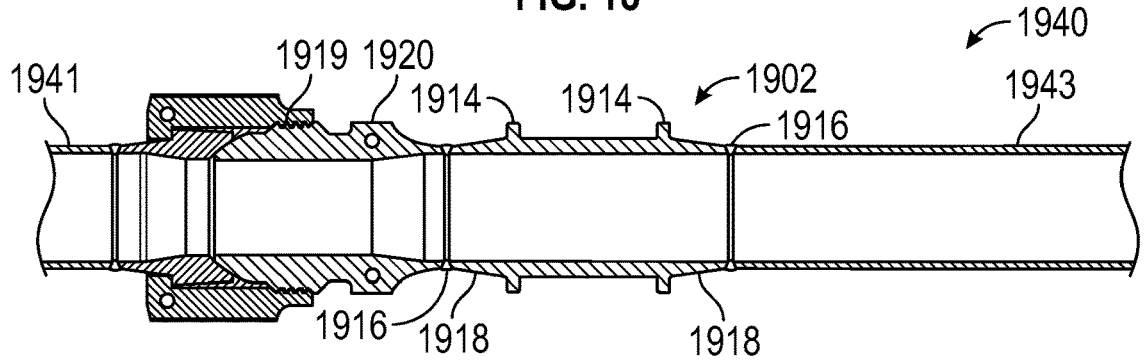
FIG. 19 is a cross-sectional view of another positioning fitting member coupled to a tubular structure, taken along a longitudinal centerline of the tubular structure, according to another embodiment of the present disclosure.

FIG. 19 is a cross-sectional view of another positioning fitting member 1902 coupled to a tube 1940, taken along a longitudinal centerline of the tube 1940, according to another embodiment of the present disclosure. The tube 1940 includes a first tube section 1941 and a second tube section 1943. The positioning fitting member 1902 may be used in any of the fastening assemblies detailed above. In particular, the positioning fitting member 1902 is used in applications in which the tubes and the clamping elements are entirely metallic. Thus, the positioning fitting member 1902 includes a clamping surface with a greater thickness, as detailed above. The positioning fitting member 1902 includes a plurality of ribs 1914, a plurality of weld notches 1916, and a plurality of tapered surface 1918. The positioning fitting member 1902 is welded at a weld notch 1916 to the second tube section 1943. The positioning fitting member 1902 is welded at a weld notch 1916 to a coupling member 1920. The coupling member 1920 includes a threaded portion 1919. The coupling member 1920 is threaded by the threaded portion 1919 to a corresponding threaded portion of the first tube section 1941. In this way, the positioning fitting member 1902 and the coupling member 1920 are separate components that are coupled together and that couple the first tube section 1941 and the second tube section 1943. Thus, the positioning fitting member 1902 and the coupling member 1920 are considered to be a welded fitting with one threaded end (e.g., the threaded portion 1919).

Figure 20:
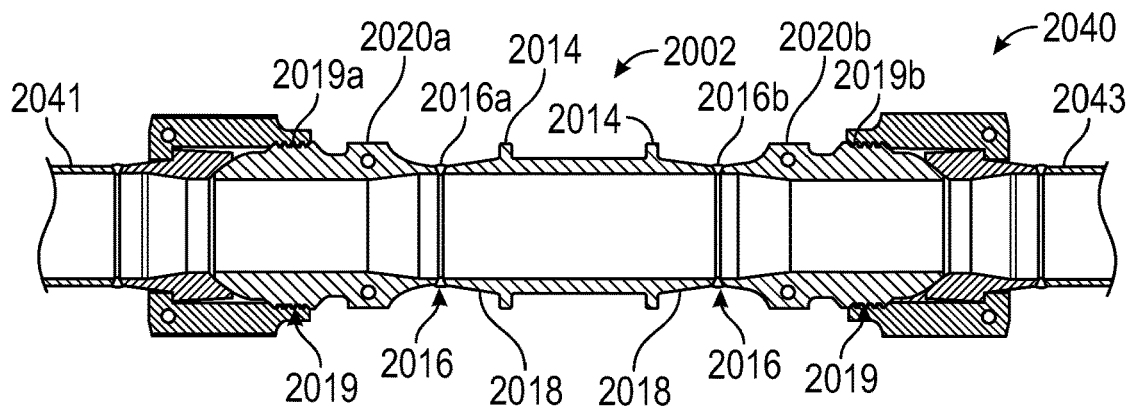
FIG. 20 is a cross-sectional view of another positioning fitting member coupled to a tubular structure, taken along a longitudinal centerline of the tubular structure, according to another embodiment of the present disclosure.

FIG. 20 is a cross-sectional view of another positioning fitting member 2002 coupled to a tube 2040, taken along a longitudinal centerline of the tube 2040, according to another embodiment of the present disclosure. The tube 2040 includes a first tube section 2041 and a second tube section 2043. The positioning fitting member 2002 may be used in any of the fastening assemblies detailed above. In particular, the positioning fitting member 2002 is used in applications in which the tubes and the clamping elements are entirely metallic. Thus, the positioning fitting member 2002 includes a clamping surface with a greater thickness, as detailed above. The positioning fitting member 2002 includes a plurality of ribs 2014, a plurality of weld notches 2016, and a plurality of tapered surface 2018. The positioning fitting member 2002 is welded at a first weld notch 2016a to a first coupling member 2020a. The positioning fitting member 2002 is welded at a second weld notch 2016b to a second coupling member 2020b. The positioning fitting member 2002 includes one or more threaded portions 2019. The first coupling member 2020a includes a first threaded portion 2019a and the second coupling member 2020b includes a second threaded portion 2019b. The first coupling member 2020a is threaded by the first threaded portion 2019a to a corresponding threaded portion of the first tube section 2041. The second coupling member 2020b is threaded by the second threaded portion 2019b to a corresponding threaded portion of the second tube section 2043. In this way, the positioning fitting member 2002 and the coupling members 2020a, 2020b are separate components that are coupled together and that couple the first tube section 2041 and the second tube section 2043. Thus, the positioning fitting member 2002 and the coupling members 2020a, 2020b are considered to be a welded fitting with two threaded ends (e.g., the first threaded portion 2019a and the second threaded portion 2019b).

FIG. 21 is a schematic, partial cut away, cross-sectional view of another positioning fitting member 2102, taken along a longitudinal centerline 2103 of the positioning fitting member 2102, according to another embodiment of the present disclosure. The positioning fitting member 2102 may be used in any of the fastening assemblies detailed above. In particular, the positioning fitting member 2102 includes many of the same features and functionality as the positioning fitting member 202 and may be used in the turbine engine 10 (FIG. 1).

The positioning fitting member 2102 includes a clamping surface 2112 extending between a plurality of ribs 2114 including a first rib 2114a and a second rib 2114b. The plurality of ribs 2114 each include an indent 2119. The indent 2119 provides for marking and differentiation between positioning fitting members of the same geometry, but made from different materials (e.g., a first positioning fitting member made from steel and a second positioning fitting member made from a nickel alloy). The indent 2119 also allows for the ribs 2114 to expand and contract due to, for example, heat or stress on the ribs 2114. The indent 2119 extends about a circumference of the ribs 2114 and defines a portion of an outer surface of the ribs 2114. The positioning fitting member 2102 also includes a plurality of weld notches 2116 including a first weld notch 2116a and a second weld notch 2116b. Each weld notch 2116 includes an inner radial surface 2117. The positioning fitting member 2102 includes a plurality of tapered surfaces 2118 including a first tapered surface 2118a and a second tapered surface 2118b. A diameter of the plurality of tapered surfaces 2118 at the plurality of ribs 2114 is greater than a diameter of the clamping surface 2112. In some examples, the diameter of the plurality of tapered surfaces 2118 at the plurality of ribs 2114 is equal to or less than the diameter of the clamping surface 2112, as detailed above.

FIG. 22 is a flow diagram of a method 2200 of bundling and fastening tubular structures in accordance with one embodiment of the present disclosure. The method 2200 of bundling tubular structures, such as the tubes detailed above, includes, in step 2205, providing a plurality of tubular structures. In step 2210, the method 2200 includes providing a positioning fitting member on at least one tubular structure of the plurality of tubular structures. In step 2215, the method 2200 includes bundling the plurality of tubular structures together. In step 2220, the method 2200 includes extending a clamping element around at least a portion of an outer surface of the plurality of tubular structures and around at least a portion of the positioning fitting member. In step 2225, the method 2200 includes fastening the clamping element with a removable fastening mechanism to fasten the plurality of tubular structures such that the positioning fitting member prevents the at least one tubular structure with the positioning fitting member from sliding or from moving axially beyond the clamping element.

The embodiments disclosed herein provide for a fastening assembly including a positioning fitting member and a removable clamping element. The fastening assemblies disclosed herein provide for an improved stress concentration compared to assemblies without the benefit of the present disclosure while maintaining the clamping element in the correct location or position and thus reducing wear. Accordingly, the fastening assemblies of the present disclosure improves reliability of a tube bundle assembly compared to assemblies without the benefit of the present disclosure and allows for a compact tube bundling.

Further aspects are provided by the subject matter of the following clauses.

A fastening assembly for a plurality of tubular structures comprises a positioning fitting member and a clamping element. The positioning fitting member is coupled to a first tubular structure of the plurality of tubular structures such that the positioning fitting member forms a part of an outer surface of the first tubular structure. The positioning fitting member comprises a plurality of ribs. The clamping element extends around the plurality of tubular structures and around at least a portion of the positioning fitting member to bundle and to secure the plurality of tubular structures together. The clamping element is positioned between the plurality of ribs.

The fastening assembly of the preceding clause, further comprising a removable fastening mechanism to fasten the clamping element.

The fastening assembly of any preceding clause, the clamping element including a first portion that extends around the portion of the positioning fitting member and a second portion that extends around an outer surface of a second tubular structure of the plurality of tubular structures such that the second tubular structure moves axially with respect to the first tubular structure.

The fastening assembly of any preceding clause, the positioning fitting member comprising a body including a shape that generally corresponds to a shape of the first tubular structure.

The fastening assembly of any preceding clause, the positioning fitting member comprising a bore, the first tubular structure disposed through the bore.

The fastening assembly of any preceding clause, the positioning fitting member comprising a clamping surface disposed between the plurality of ribs. The clamping element engages the clamping surface.

The fastening assembly of any preceding clause, the plurality of ribs extending radially outwardly from the clamping surface.

The fastening assembly of any preceding clause, the positioning fitting member comprising a tapered surface.

The fastening assembly of any preceding clause, the tapered surface being tapered from a first rib of the plurality of ribs to the outer surface of the first tubular structure.

The fastening assembly of any preceding clause, the positioning fitting member comprising a plurality of tapered surfaces.

The fastening assembly of any preceding clause, the clamping element being a loop clamp.

The fastening assembly of any preceding clause, the clamping element including a plurality of clamping elements.

The fastening assembly of any preceding clause, the clamping element including a cushion disposed therein.

The fastening assembly of any preceding clause, the cushion engaging the plurality of tubular structures.

The fastening assembly of any preceding clause, the clamping element including a plurality of radial surfaces, the plurality of radial surfaces contacting the plurality of ribs when first tubular structure slides or moves axially.

The fastening assembly of any preceding clause, the plurality of ribs of the positioning fitting member preventing the clamping element from sliding or moving axially beyond the plurality of ribs.

The fastening assembly of any preceding clause, the clamping element including a clamp body made of a metal, a composite, a polymer, a ceramic, alloys, or combinations thereof.

The fastening assembly of any preceding clause, further including a spacer element to spatially separate the plurality of tubular structures.

The fastening assembly of any preceding clause, the spacer element including a plurality of cradle brackets, the plurality of tubular structures engaging with the plurality of cradle brackets.

The fastening assembly of any preceding clause, the spacer element including a plurality of raised edges, the clamping element disposed between the plurality of raised edges.

The fastening assembly of any preceding clause, the spacer element being made of a metal, a composite, a polymer, a ceramic, or combinations thereof.

The fastening assembly of any preceding clause, the spacer element including a cushion coupled to the spacer element.

The fastening assembly of any preceding clause, the clamping element including a plurality of looped sections.

The fastening assembly of any preceding clause, the clamping element including a plurality of straight sections.

The fastening assembly of any preceding clause, the clamping element including a hinge to open and to close the clamping element.

The fastening assembly of any preceding clause, the positioning fitting member being a first positioning fitting member, and further including a second positioning fitting member coupled to a second tubular structure.

The fastening assembly of any preceding clause, a second tube of the plurality of tubes including a wear sleeve, and the clamping element engaging the wear sleeve.

The fastening assembly of any preceding clause, the clamping element including a lip to hold the cushion.

The fastening assembly of any preceding clause, the clamping element including a plurality of cradle surfaces disposed therein, the plurality of cradle surfaces including a shape generally corresponding to a shape of the plurality of tubular structures.

The fastening assembly of any preceding clause, further including a plurality of clamping elements, and a support bracket coupling the plurality of clamping elements together.

The fastening assembly of any preceding clause, further including a mounting bracket, the clamping element being secured to the mounting bracket to mount the plurality of tubular structures to the mounting brackets.

The fastening assembly of any preceding clause, the spacer element including a plurality of spacer elements.

The fastening assembly of any preceding clause, the positioning fitting member being chemically bonded to the first tubular structure.

The fastening assembly of any preceding clause, the positioning fitting member being brazed to the first tubular structure.

The fastening assembly of any preceding clause, the positioning fitting member being welded to the first tubular structure.

The fastening assembly of any preceding clause, the positioning fitting member including a weld notch.

The fastening assembly of any preceding clause, the positioning fitting member threaded to the first tubular structure by a threaded portion.

The fastening assembly of any preceding clause, the positioning fitting member being machined with a coupling element.

The fastening assembly of any preceding clause, the plurality of ribs each including an indent.

A turbine engine comprises a plurality of tubular structures and a fastening assembly. The fastening assembly comprises a positioning fitting member and a clamping element. The positioning fitting member is coupled to a first tubular structure of the plurality of tubular structures such that the positioning fitting member forms a part of an outer surface of the first tubular structure, the positioning fitting member comprising a plurality of ribs. The clamping element extends around the plurality of tubular structures and around at least a portion of the positioning fitting member to bundle and to secure the plurality of tubular structures together, the clamping element positioned between the plurality of ribs.

The turbine engine of the preceding clause, the fastening assembly further comprising a removable fastening mechanism to fasten the clamping element.

The turbine engine of any preceding clause, the clamping element including a first portion that extends around the portion of the positioning fitting member and a second portion that extends around an outer surface of a second tubular structure of the plurality of tubular structures such that the second tubular structure moves axially with respect to the first tubular structure.

The turbine engine of any preceding clause, the positioning fitting member comprising a body including a shape that generally corresponds to a shape of the first tubular structure.

The turbine engine of any preceding clause, the positioning fitting member comprising a bore, the first tubular structure disposed through the bore.

The turbine engine of any preceding clause, the positioning fitting member comprising a clamping surface disposed between the plurality of ribs, and the clamping element engages the clamping surface.

The turbine engine of any preceding clause, the plurality of ribs extending radially outwardly from the clamping surface.

The turbine engine of any preceding clause, the positioning fitting member comprising a tapered surface.

The turbine engine of any preceding clause, the tapered surface being tapered from a first rib of the plurality of ribs to the outer surface of the first tubular structure.

The turbine engine of any preceding clause, the positioning fitting member comprising a plurality of tapered surfaces.

The turbine engine of any preceding clause, the clamping element being a loop clamp.

The turbine engine of any preceding clause, the clamping element including a plurality of clamping elements.

The turbine engine of any preceding clause, the clamping element including a cushion disposed therein.

The turbine engine of any preceding clause, the cushion engaging the plurality of tubular structures.

The turbine engine of any preceding clause, the clamping element including a plurality of radial surfaces, the plurality of radial surfaces contacting the plurality of ribs when first tubular structure slides or moves axially.

The turbine engine of any preceding clause, the plurality of ribs of the positioning fitting member preventing the clamping element from sliding or moving axially beyond the plurality of ribs.

The turbine engine of any preceding clause, the clamping element including a clamp body made of a metal, a composite, a polymer, a ceramic, alloys, or combinations thereof.

The turbine engine of any preceding clause, further including a spacer element to spatially separate the plurality of tubular structures.

The turbine engine of any preceding clause, the spacer element including a plurality of cradle brackets, the plurality of tubular structures engage with the plurality of cradle brackets.

The turbine engine of any preceding clause, the spacer element including a plurality of raised edges, the clamping element disposed between the plurality of raised edges.

The turbine engine of any preceding clause, the spacer element being made of a metal, a composite, a polymer, a ceramic, or combinations thereof.

The turbine engine of any preceding clause, the spacer element including a cushion coupled to the spacer element.

The turbine engine of any preceding clause, the clamping element including a plurality of looped sections.

The turbine engine of any preceding clause, the clamping element including a plurality of straight sections.

The turbine engine of any preceding clause, the clamping element including a hinge to open and to close the clamping element.

The turbine engine of any preceding clause, the positioning fitting member being a first positioning fitting member, and further including a second positioning fitting member coupled to a second tubular structure.

The turbine engine of any preceding clause, a second tube of the plurality of tubes including a wear sleeve, and the clamping element engaging the wear sleeve.

The turbine engine of any preceding clause, the clamping element including a lip to hold the cushion.

The turbine engine of any preceding clause, the clamping element including a plurality of cradle surfaces disposed therein, the plurality of cradle surfaces including a shape generally corresponding to a shape of the plurality of tubular structures.

The turbine engine of any preceding clause, the fastening assembly further including a plurality of clamping elements, and a support bracket coupling the plurality of clamping elements together.

The turbine engine of any preceding clause, further including a mounting bracket, the clamping element being secured to the mounting bracket to mount the plurality of tubular structures to the mounting brackets.

The turbine engine of any preceding clause, the spacer element including a plurality of spacer elements.

The turbine engine of any preceding clause, the positioning fitting member being chemically bonded to the first tubular structure.

The turbine engine of any preceding clause, the positioning fitting member being brazed to the first tubular structure.

The turbine engine of any preceding clause, the positioning fitting member being welded to the first tubular structure.

The turbine engine of any preceding clause, the positioning fitting member including a weld notch.

The turbine engine of any preceding clause, the positioning fitting member being threaded to the first tubular structure by a threaded portion.

The turbine engine of any preceding clause, the positioning fitting member being machined with a coupling element.

The turbine engine of any preceding clause, the plurality of ribs each including an indent.

A method comprising providing a plurality of tubular structures, providing a positioning fitting member on at least one tubular structure of the plurality of tubular structures, bundling the plurality of tubular structures together, extending a clamping element around the plurality of tubular structures and around at least a portion of the positioning fitting member, fastening the clamping element with a removable fastening mechanism to fasten the plurality of tubular structures such that the positioning fitting member prevents the at least one tubular structure with the positioning fitting member from sliding or from moving axially beyond the clamping element.

The method of the preceding clause, further including allowing a second tubular structure to slide or to move axially with respect to the first tubular structure.

The method of any preceding clause, the positioning fitting member including a body having a shape that generally corresponds to shape of the first tubular structure.

The method of any preceding clause, further including disposing the positioning fitting member about an outer surface of the first tubular structure such that the first tubular structure is disposed within a bore of the positioning fitting member.

The method of any preceding clause, further including engaging the clamping element to a clamping surface of the positioning fitting member.

The method of any preceding clause, further including engaging the clamping element between a plurality of ribs of the positioning fitting member.

The method of any preceding clause, further including reducing stress from the positioning fitting member to the first tubular structure by a tapered surface of the positioning fitting member.

The method of any preceding clause, further including tapering the tapered surface from a first rib of the plurality of ribs to the outer surface of the first tubular structure.

The method of any preceding clause, the positioning fitting member including a plurality of tapered surfaces.

The method of any preceding clause, the clamping element being a loop clamp.

The method of any preceding clause, further including providing a plurality of clamping elements.

The method of any preceding clause, further including disposing a cushion within the clamping element.

The method of any preceding clause, further including engaging the plurality of tubular structures with the cushion.

The method of any preceding clause, further including causing the plurality of ribs to contact a plurality of radial surfaces of the clamping element when the first tubular structure slides or moves axially.

The method of any preceding clause, further including preventing the clamping element from sliding or moving axially beyond the plurality of ribs.

The method of any preceding clause, the clamping element including a clamp body made of a metal, a composite, a polymer, a ceramic, alloys, or combinations thereof.

The method of any preceding clause, further including spatially separating the plurality of tubular structures with a spacer element.

The method of any preceding clause, further including engaging the plurality of tubular structures with a plurality of cradle brackets of the spacer.

The method of any preceding clause, further including disposing the clamping element between a plurality of raised edges of the spacer element.

The method of any preceding clause, the spacer element being made of a metal, a composite, a polymer, a ceramic, or combinations thereof.

The method of any preceding clause, further including providing a cushion coupled to the spacer element.

The method of any preceding clause, further including providing the clamping element with a plurality of looped sections.

The method of any preceding clause, further including providing the clamping element with a plurality of straight sections.

The method of any preceding clause, further including providing the clamping element with a hinge to open and to close the clamping element.

The method of any preceding clause, the positioning fitting member being a first positioning fitting member, and further including providing a second positioning fitting member coupled to a second tubular structure.

The method of any preceding clause, further including providing a wear sleeve coupled to a second tube of the plurality of tubes, and engaging the clamping element with the wear sleeve.

The method of any preceding clause, further including providing a lip of the clamping element to hold the cushion.

The method of any preceding clause, the clamping element including a plurality of cradle surfaces disposed therein, and the plurality of cradle surfaces including a shape generally corresponding to a shape of the plurality of tubular structures.

The method of any preceding clause, the fastening assembly further including a plurality of clamping elements, and further including providing a support bracket coupling the plurality of clamping elements together.

The method of any preceding clause, further including securing the clamping element to a mounting bracket to mount the plurality of tubular structures to the mounting brackets.

The method of any preceding clause, further including providing a plurality of spacer elements.

The method of any preceding clause, the providing the positioning fitting member including chemically bonding the positioning fitting member to the first tubular structure.

The method of any preceding clause, the providing the positioning fitting member including brazing the positioning fitting member to the first tubular structure.

The method of any preceding clause, the providing the positioning fitting member including welding the positioning fitting member to the first tubular structure.

The method of any preceding clause, further including welding the positioning fitting member to the first tubular structure at a weld notch of the positioning fitting member.

The method of any preceding clause, further including threading the positioning fitting member to the first tubular structure.

The method of any preceding clause, further including machining the positioning fitting member with a coupling element.

The method of any preceding clause, further including providing an indent in each of the plurality of ribs.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A fastening assembly comprising:
a plurality of tubular structures;
a positioning fitting member coupled to a first tubular structure of the plurality of tubular structures such that the positioning fitting member is in line with the first tubular structure, the first tubular structure having an outer surface and an inner surface, wherein the positioning fitting member comprises:
a plurality of ribs;
an outer surface and an inner surface, the inner surface being radially aligned with the inner surface of the first tubular structure;
a clamping surface defined between the plurality of ribs; and
a tapered surface having a first end and a second end, the tapered surface extending from at least one of the plurality of ribs at the first end toward the first tubular structure to the second end, wherein the tapered surface defines a portion of the outer surface of the positioning fitting member, the tapered surface having a diameter that decreases from the first end to the second end such that the tapered surface provides a smooth transition from the positioning fitting member to the first tubular structure; and
one or more clamping elements including a first clamping element extending around at least a portion of the clamping surface of the positioning fitting member and a second clamping element extending around at least a portion of a second tubular structure of the plurality of tubular structures to bundle and to secure the plurality of tubular structures together such that the second tubular structure moves axially with respect to the first tubular structure, the first clamping element positioned between the plurality of ribs, wherein the second tubular structure is continuous and does not include a positioning fitting member.

2. The fastening assembly of claim 1, further comprising a removable fastening mechanism to fasten the one or more clamping elements.

3. The fastening assembly of claim 1, wherein the positioning fitting member comprises a body including a shape that generally corresponds to a shape of the first tubular structure.

4. The fastening assembly of claim 1, wherein the positioning fitting member comprises a bore, the first tubular structure disposed through the bore.

5. The fastening assembly of claim 1, wherein the plurality of ribs extends radially outwardly from the clamping surface.

6. The fastening assembly of claim 1, wherein the tapered surface is tapered from a first rib of the plurality of ribs to a distal end or to a proximal end of the positioning fitting member.

7. The fastening assembly of claim 1, wherein the positioning fitting member comprises a plurality of tapered surfaces.

8. A turbine engine comprising:
a core turbine engine comprising a compressor section, a combustion section, and a turbine section;
a plurality of tubular structures; and
a fastening assembly comprising:
a positioning fitting member coupled to a first tubular structure of the plurality of tubular structures such that the positioning fitting member is in line with the first tubular structure, the first tubular structure having an outer surface and an inner surface, wherein the positioning fitting member comprises:
a plurality of ribs;
an outer surface and an inner surface, the inner surface being radially aligned with the inner surface of the first tubular structure;
a clamping surface defined between the plurality of ribs; and
a tapered surface having a first end and a second end, the tapered surface extending from at least one of the plurality of ribs at the first end toward the first tubular structure to the second end, wherein the tapered surface defines a portion of the outer surface of the positioning fitting member, the tapered surface having a diameter that decreases from the first end to the second end such that the tapered surface provides a smooth transition from the positioning fitting member to the first tubular structure; and one or more clamping elements including a first clamping element extending around at least a portion of the clamping surface of the positioning fitting member and a second clamping element extending around at least a portion of a second tubular structure of the plurality of tubular structures to bundle and to secure the plurality of tubular structures together such that the second tubular structure moves axially with respect to the first tubular structure, the first clamping element positioned between the plurality of ribs, wherein the second tubular structure is continuous and does not include a positioning fitting member.

9. The turbine engine of claim 8, wherein the fastening assembly further comprises a removable fastening mechanism to fasten the one or more clamping elements.

10. The turbine engine of claim 8, wherein the positioning fitting member comprises a body including a shape that generally corresponds to a shape of the first tubular structure.

11. The turbine engine of claim 8, wherein the positioning fitting member comprises a bore, the first tubular structure disposed through the bore.

12. The turbine engine of claim 8, wherein the plurality of ribs extend radially outwardly from the clamping surface.

13. The turbine engine of claim 8, wherein the tapered surface is tapered from a first rib of the plurality of ribs to a distal end or to a proximal end of the positioning fitting member.

14. The turbine engine of claim 8, wherein the positioning fitting member comprises a plurality of tapered surfaces.

15. The fastening assembly of claim 1, wherein the first clamping element includes a looped section extending around at least a portion of the positioning fitting member and the second clamping element includes a looped section extending around the second tubular structure to bundle and to secure the plurality of tubular structures together, and the looped section of the first clamping element and the second clamping element includes a hinge extending from the looped section and allowing the looped section to be opened and closed.

16. The fastening assembly of claim 1, further comprising a cushion disposed within the first clamping element and defining an interior surface of the first clamping element, the cushion extending around and contacting the portion of the positioning fitting member to provide friction damping between the first clamping element and the positioning fitting member.

17. The fastening assembly of claim 1, wherein the positioning fitting member includes a weld notch that projects radially outward from the tapered surface and receives the first tubular structure therein.

18. The turbine engine of claim 8, wherein the positioning fitting member includes a weld notch that projects radially outward from the tapered surface and receives the first tubular structure therein.

19. The turbine engine of claim 8, wherein the first clamping element includes a looped section extending around at least a portion of the positioning fitting member and the second clamping element includes a looped section extending around the second tubular structure to bundle and to secure the plurality of tubular structures together, and the looped section of the first clamping element and the second clamping element includes a hinge extending from the looped section and allowing the looped section to be opened and closed.

20. The turbine engine of claim 8, further comprising a cushion disposed within the first clamping element and defining an interior surface of the first clamping element, the cushion extending around and contacting the portion of the positioning fitting member to provide friction damping between the first clamping element and the positioning fitting member.

\* \* \* \* \*

UNITED STATES PATENT AND TRADEMARK OFFICE
CERTIFICATE OF CORRECTION

| | |
|---|---|
| PATENT NO. | : 12,385,581 B2 |
| APPLICATION NO. | : 17/812034 |
| DATED | : August 12, 2025 |
| INVENTOR(S) | : Apolinario Barra Ruiz |

Page 1 of 1

It is certified that error appears in the above-identified patent and that said Letters Patent is hereby corrected as shown below:

In the Claims

Claim 1, Column 47, Line 60, change "the positioning fitting memberis in line with the first" to --the positioning fitting member is in line with the first--.

Signed and Sealed this
Seventh Day of October, 2025

John A. Squires
*Director of the United States Patent and Trademark Office*